(12) United States Patent
Vallabhaneni et al.

(10) Patent No.: US 11,119,865 B2
(45) Date of Patent: *Sep. 14, 2021

(54) CROSS-APPLICATION DATABASE RESTORE

(71) Applicant: Commvault Systems, Inc., Tinton Falls, NJ (US)

(72) Inventors: Brahmaiah Vallabhaneni, Marlboro, NJ (US); Paramasivam Kumarasamy, Morganville, NJ (US); Rahul S. Pawar, Marlboro, NJ (US); Henry Wallace Dornemann, Eatontown, NJ (US); Jun H. Ahn, Manalapan, NJ (US); Muthusamy Senthilnathan, Holmdel, NJ (US)

(73) Assignee: Commvault Systems, Inc., Tinton Falls, NJ (US)

( * ) Notice: Subject to any disclaimer, the term of this patent is extended or adjusted under 35 U.S.C. 154(b) by 152 days.

This patent is subject to a terminal disclaimer.

(21) Appl. No.: 16/235,158

(22) Filed: Dec. 28, 2018

(65) Prior Publication Data

US 2019/0220368 A1  Jul. 18, 2019

Related U.S. Application Data

(63) Continuation of application No. 14/717,930, filed on May 20, 2015, now Pat. No. 10,210,051.

(Continued)

(51) Int. Cl.
  *G06F 16/00* (2019.01)
  *G06F 11/14* (2006.01)
  (Continued)

(52) U.S. Cl.
  CPC ......... *G06F 11/1464* (2013.01); *G06F 3/061* (2013.01); *G06F 3/064* (2013.01);
  (Continued)

(58) Field of Classification Search
  CPC ......... G06F 17/30575; G06F 17/30073; G06F 17/302; G06F 17/303; G06F 17/30339;
  (Continued)

(56) References Cited

U.S. PATENT DOCUMENTS

| 4,084,231 A | 4/1978 | Capozzi et al. |
| 4,267,568 A | 5/1981 | Dechant et al. |

(Continued)

FOREIGN PATENT DOCUMENTS

| EP | 0259912 | 3/1988 |
| EP | 0405926 | 1/1991 |

(Continued)

OTHER PUBLICATIONS

"What is a Sharepoint List?" by Chris. Publication date unknown. Accessed archive from Sep. 27, 2012 on Jul. 30, 2015. <https://web.archive.org/web/201209270 12118/http://www.fastsharepoint.com/tutorials/SharePoi ntList>.

(Continued)

*Primary Examiner* — Monica M Pyo
(74) *Attorney, Agent, or Firm* — Knobbe Martens Olson & Bear LLP

(57) ABSTRACT

A system according to certain aspects improves the process of restoring database objects and converting those objects into another database file format. According to certain aspects, a database file is backed up in a block-level fashion. Instead of restoring the entire backup file, which can consume a large amount of time and computing resources, the information management system may restore a particular database object from a backup database file that is stored as multiple blocks or other granular units. Then, the information management system can extract the desired data from the restored block(s). By using block-level mapping and storage techniques described herein, the system can restore (Continued)

a database object in a backup database file without restoring the entire backup database file, thereby speeding up restore operations and reducing consumption of storage and processing resources. In addition, the information management system can convert the blocks, using a staging memory, to another database file format as desired.

16 Claims, 19 Drawing Sheets

Related U.S. Application Data

(60) Provisional application No. 62/106,109, filed on Jan. 21, 2015.

(51) Int. Cl.
| | | |
|---|---|---|
| *G06F 16/27* | (2019.01) | |
| *G06F 16/11* | (2019.01) | |
| *G06F 16/182* | (2019.01) | |
| *G06F 16/21* | (2019.01) | |
| *G06F 16/17* | (2019.01) | |
| *G06F 16/22* | (2019.01) | |
| *G06F 16/23* | (2019.01) | |
| *G06F 3/06* | (2006.01) | |
| *G06F 11/30* | (2006.01) | |
| *G06F 11/34* | (2006.01) | |

(52) U.S. Cl.
CPC .............. *G06F 3/065* (2013.01); *G06F 3/067* (2013.01); *G06F 3/0619* (2013.01); *G06F 3/0643* (2013.01); *G06F 11/14* (2013.01); *G06F 11/1448* (2013.01); *G06F 11/1451* (2013.01); *G06F 11/1458* (2013.01); *G06F 11/1469* (2013.01); *G06F 11/3034* (2013.01); *G06F 11/3476* (2013.01); *G06F 16/113* (2019.01); *G06F 16/1727* (2019.01); *G06F 16/184* (2019.01); *G06F 16/1827* (2019.01); *G06F 16/214* (2019.01); *G06F 16/2282* (2019.01); *G06F 16/2358* (2019.01); *G06F 16/27* (2019.01); *G06F 16/275* (2019.01); *G06F 2201/80* (2013.01); *G06F 2201/84* (2013.01)

(58) Field of Classification Search
CPC ......... G06F 17/30368; G06F 17/30581; G06F 16/27; G06F 16/2282; G06F 16/1827; G06F 16/275; G06F 16/1727; G06F 16/214; G06F 16/2358; G06F 16/113; G06F 16/184; G06F 3/061; G06F 3/0619; G06F 3/064; G06F 3/0643; G06F 3/065; G06F 3/067; G06F 11/14; G06F 11/1448; G06F 11/1451; G06F 11/1458; G06F 11/1469; G06F 11/3034; G06F 11/3476; G06F 2201/80; G06F 2201/84
USPC .......................................... 707/674–686, 635
See application file for complete search history.

(56) References Cited

U.S. PATENT DOCUMENTS

| | | |
|---|---|---|
| 4,283,787 A | 8/1981 | Chambers |
| 4,417,321 A | 11/1983 | Chang et al. |
| 4,641,274 A | 2/1987 | Swank |
| 4,654,819 A | 3/1987 | Stiffler et al. |
| 4,686,620 A | 8/1987 | Ng |
| 4,912,637 A | 3/1990 | Sheedy et al. |
| 4,995,035 A | 2/1991 | Cole et al. |
| 5,005,122 A | 4/1991 | Griffin et al. |
| 5,093,912 A | 3/1992 | Dong et al. |
| 5,133,065 A | 7/1992 | Cheffetz et al. |
| 5,193,154 A | 3/1993 | Kitajima et al. |
| 5,212,772 A | 5/1993 | Masters |
| 5,226,157 A | 7/1993 | Nakano et al. |
| 5,239,647 A | 8/1993 | Anglin et al. |
| 5,241,668 A | 8/1993 | Eastridge et al. |
| 5,241,670 A | 8/1993 | Eastridge et al. |
| 5,276,860 A | 1/1994 | Fortier et al. |
| 5,276,867 A | 1/1994 | Kenley et al. |
| 5,287,500 A | 2/1994 | Stoppani, Jr. |
| 5,301,286 A | 4/1994 | Rajani |
| 5,321,816 A | 6/1994 | Rogan et al. |
| 5,347,653 A | 9/1994 | Flynn et al. |
| 5,410,700 A | 4/1995 | Fecteau et al. |
| 5,420,996 A | 5/1995 | Aoyagi |
| 5,454,099 A | 9/1995 | Myers et al. |
| 5,559,991 A | 9/1996 | Kanfi |
| 5,642,496 A | 6/1997 | Kanfi |
| 5,758,337 A | 5/1998 | Hammond |
| 5,991,772 A | 11/1999 | Doherty et al. |
| 6,151,608 A | 11/2000 | Abrams |
| 6,199,074 B1 | 3/2001 | Kern et al. |
| 6,360,228 B1 | 3/2002 | Sundara et al. |
| 6,374,267 B1 | 4/2002 | Tam |
| 6,418,478 B1 | 7/2002 | Ignatius et al. |
| 6,460,043 B1 | 10/2002 | Tabbara et al. |
| 6,487,561 B1 | 11/2002 | Ofek et al. |
| 6,542,972 B2 | 4/2003 | Ignatius et al. |
| 6,658,436 B2 | 12/2003 | Oshinsky et al. |
| 6,678,700 B1 | 1/2004 | Moore et al. |
| 6,684,225 B1 | 1/2004 | Huras et al. |
| 6,721,767 B2 | 4/2004 | De Meno et al. |
| 6,760,723 B2 | 7/2004 | Oshinsky et al. |
| 6,920,537 B2 | 7/2005 | Ofek et al. |
| 7,003,641 B2 | 2/2006 | Prahlad et al. |
| 7,035,880 B1 | 4/2006 | Crescenti et al. |
| 7,107,298 B2 | 9/2006 | Prahlad |
| 7,113,964 B1 | 9/2006 | Bequet et al. |
| 7,130,970 B2 | 10/2006 | Devassy et al. |
| 7,162,496 B2 | 1/2007 | Amarendran et al. |
| 7,174,433 B2 | 2/2007 | Kottomtharayil et al. |
| 7,246,207 B2 | 7/2007 | Kottomtharayil et al. |
| 7,315,923 B2 | 1/2008 | Retnamma et al. |
| 7,343,453 B2 | 3/2008 | Prahlad et al. |
| 7,389,311 B1 | 6/2008 | Crescenti et al. |
| 7,395,282 B1 | 7/2008 | Crescenti et al. |
| 7,440,982 B2 | 10/2008 | Lu et al. |
| 7,454,569 B2 | 11/2008 | Kavuri et al. |
| 7,472,142 B2 | 12/2008 | Prahlad |
| 7,490,207 B2 | 2/2009 | Amarendran et al. |
| 7,500,053 B1 | 3/2009 | Kavuri et al. |
| 7,519,620 B2 | 4/2009 | Yokouchi |
| 7,529,782 B2 | 5/2009 | Prahlad et al. |
| 7,536,291 B1 | 5/2009 | Vijayan Retnamma et al. |
| 7,539,707 B2 | 5/2009 | Prahlad et al. |
| 7,543,125 B2 | 6/2009 | Gokhale |
| 7,546,324 B2 | 6/2009 | Prahlad et al. |
| 7,552,358 B1 | 6/2009 | Asgar-Deen et al. |
| 7,568,080 B2 | 7/2009 | Prahlad et al. |
| 7,603,386 B2 | 10/2009 | Amarendran et al. |
| 7,606,844 B2 | 10/2009 | Kottomtharayil |
| 7,613,752 B2 | 11/2009 | Prahlad et al. |
| 7,617,253 B2 | 11/2009 | Prahlad et al. |
| 7,617,262 B2 | 11/2009 | Prahlad et al. |
| 7,620,710 B2 | 11/2009 | Kottomtharayil et al. |
| 7,634,511 B1 | 12/2009 | Freiheit et al. |
| 7,636,743 B2 | 12/2009 | Erofeev |
| 7,651,593 B2 | 1/2010 | Prahlad et al. |
| 7,657,550 B2 | 2/2010 | Prahlad et al. |
| 7,660,807 B2 | 2/2010 | Prahlad et al. |
| 7,661,028 B2 | 2/2010 | Erofeev |
| 7,720,801 B2 | 5/2010 | Chen |
| 7,734,669 B2 | 6/2010 | Kottomtharayil et al. |
| 7,747,579 B2 | 6/2010 | Prahlad et al. |
| 7,769,890 B2 | 8/2010 | Littlefield |
| 7,778,974 B2 | 8/2010 | Compton et al. |
| 7,801,864 B2 | 9/2010 | Prahlad et al. |
| 7,809,914 B2 | 10/2010 | Kottomtharayil et al. |

(56) References Cited

U.S. PATENT DOCUMENTS

| | | |
|---|---|---|
| 7,836,022 B2 | 11/2010 | Gillespie |
| 7,840,539 B2 | 11/2010 | Mooney et al. |
| 7,860,824 B2 | 12/2010 | Suzuki et al. |
| 7,882,067 B2 | 2/2011 | Saika |
| 8,055,627 B2 | 11/2011 | Prahlad et al. |
| 8,065,278 B2 | 11/2011 | Beatty et al. |
| 8,073,969 B2 | 12/2011 | Littlefield |
| 8,131,964 B2 | 3/2012 | Retnamma et al. |
| 8,170,995 B2 | 5/2012 | Prahlad et al. |
| 8,229,954 B2 | 7/2012 | Kottomtharayil et al. |
| 8,244,681 B2 | 8/2012 | Laffin |
| 8,271,436 B2 | 9/2012 | D'Souza et al. |
| 8,285,681 B2 | 10/2012 | Prahlad et al. |
| 8,307,177 B2 | 11/2012 | Prahlad et al. |
| 8,315,981 B2 | 11/2012 | Prahlad |
| 8,352,422 B2 | 1/2013 | Prahlad et al. |
| 8,364,652 B2 | 1/2013 | Vijayan et al. |
| 8,370,542 B2 | 2/2013 | Lu et al. |
| 8,392,370 B1 | 3/2013 | Whitney et al. |
| 8,442,945 B1 | 5/2013 | Doerner |
| 8,442,952 B1* | 5/2013 | Armangau .......... G06F 16/1752 707/686 |
| 8,515,911 B1 | 8/2013 | Zhou et al. |
| 8,543,542 B2 | 9/2013 | D'Souza et al. |
| 8,572,046 B2* | 10/2013 | Becker ................ G06F 11/1458 707/682 |
| 8,578,120 B2 | 11/2013 | Attarde et al. |
| 8,589,347 B2 | 11/2013 | Erofeev |
| 8,606,752 B1* | 12/2013 | Beatty ................ G06F 16/2365 707/640 |
| 8,612,394 B2 | 12/2013 | Prahlad |
| 8,645,320 B2 | 2/2014 | Prahlad et al. |
| 8,650,169 B1 | 2/2014 | Jacobs et al. |
| 8,667,273 B1* | 3/2014 | Billstrom ............ H04L 63/0428 713/165 |
| 8,677,091 B2 | 3/2014 | Littlefield |
| 8,726,242 B2 | 5/2014 | Ngo |
| 8,745,003 B1 | 6/2014 | Patterson |
| 8,745,105 B2 | 6/2014 | Erofeev |
| 8,789,208 B1 | 7/2014 | Sundaram et al. |
| 8,805,786 B1 | 8/2014 | Natanzon |
| 8,874,519 B1 | 10/2014 | Payne |
| 8,935,492 B2 | 1/2015 | Gokhale et al. |
| 8,954,446 B2 | 2/2015 | Vijayan Retnamma et al. |
| 9,020,900 B2 | 4/2015 | Vijayan Retnamma et al. |
| 9,043,287 B2 | 5/2015 | Periyagaram et al. |
| 9,098,495 B2 | 8/2015 | Gokhale |
| 9,124,611 B2 | 9/2015 | Littlefield |
| 9,164,850 B2 | 10/2015 | Prahlad |
| 9,239,687 B2 | 1/2016 | Vijayan et al. |
| 9,244,779 B2 | 1/2016 | Littlefield |
| 9,275,086 B2 | 3/2016 | Kumarasamy et al. |
| 9,298,715 B2 | 3/2016 | Kumarasamy et al. |
| 9,400,803 B2 | 7/2016 | Littlefield |
| 9,558,072 B1 | 1/2017 | Mam |
| 9,659,076 B2 | 5/2017 | Kumarasamy et al. |
| 9,720,787 B2 | 8/2017 | Kumarasamy et al. |
| 9,766,987 B2 | 9/2017 | Kumarasamy et al. |
| 9,846,620 B2 | 12/2017 | Kumarasamy et al. |
| 9,904,598 B2 | 2/2018 | Kumarasamy |
| 10,108,687 B2 | 10/2018 | Dornemann et al. |
| 10,191,819 B2 | 1/2019 | Dornemann et al. |
| 10,210,051 B2 | 2/2019 | Vallabhaneni et al. |
| 10,223,211 B2 | 3/2019 | Kumarasamy et al. |
| 10,223,212 B2 | 3/2019 | Kumarasamy et al. |
| 10,303,550 B2 | 5/2019 | Kumarasamy |
| 2003/0182313 A1 | 9/2003 | Federwisch et al. |
| 2004/0059738 A1 | 3/2004 | Tarbell |
| 2004/0167941 A1 | 8/2004 | Prahald |
| 2005/0203887 A1 | 9/2005 | Joshi et al. |
| 2006/0015485 A1 | 1/2006 | Hofmann |
| 2006/0095481 A1 | 5/2006 | Singh et al. |
| 2006/0224846 A1 | 10/2006 | Amarendran et al. |
| 2006/0235904 A1 | 10/2006 | Kapur |
| 2007/0033237 A1 | 2/2007 | Prahald |
| 2007/0050777 A1 | 3/2007 | Hutchinson et al. |
| 2007/0083563 A1 | 4/2007 | Souder et al. |
| 2007/0143371 A1 | 6/2007 | Kottomtharayil |
| 2007/0174325 A1 | 7/2007 | Mooney et al. |
| 2007/0185915 A1 | 8/2007 | Prahlad et al. |
| 2007/0288490 A1 | 12/2007 | Longshaw |
| 2007/0288534 A1 | 12/2007 | Zak et al. |
| 2008/0014869 A1 | 1/2008 | Demirbasa et al. |
| 2008/0034018 A1 | 2/2008 | Cisler et al. |
| 2008/0144601 A1 | 6/2008 | Nurminen et al. |
| 2008/0147754 A1 | 6/2008 | Littlefield |
| 2008/0147836 A1 | 6/2008 | Littlefield |
| 2008/0147997 A1 | 6/2008 | Littlefield |
| 2008/0162590 A1 | 7/2008 | Kundu et al. |
| 2008/0172391 A1 | 7/2008 | Adelman et al. |
| 2009/0083338 A1 | 3/2009 | Evans et al. |
| 2009/0125692 A1* | 5/2009 | Yamamoto .......... G06F 11/1464 711/162 |
| 2009/0164532 A1 | 6/2009 | Pralad |
| 2009/0193206 A1 | 7/2009 | Ishii et al. |
| 2009/0319534 A1 | 12/2009 | Gokhale |
| 2010/0005259 A1 | 1/2010 | Prahlad et al. |
| 2010/0070448 A1 | 3/2010 | Omoigui |
| 2010/0070726 A1 | 3/2010 | Ngo et al. |
| 2010/0077165 A1 | 3/2010 | Lu et al. |
| 2010/0082552 A1 | 4/2010 | Beatty |
| 2010/0082553 A1 | 4/2010 | Beatty et al. |
| 2010/0082554 A1 | 4/2010 | Beatty et al. |
| 2010/0082672 A1 | 4/2010 | Kottomtharayil et al. |
| 2010/0191702 A1 | 7/2010 | Hofmann |
| 2010/0223373 A1 | 9/2010 | Littlefield |
| 2010/0250549 A1 | 9/2010 | Muller et al. |
| 2010/0332401 A1 | 12/2010 | Prahlad |
| 2010/0332453 A1 | 12/2010 | Prahlad et al. |
| 2010/0332479 A1 | 12/2010 | Prahlad |
| 2011/0010440 A1 | 1/2011 | Kottomtharayil et al. |
| 2011/0035359 A1 | 2/2011 | Bendakovsky et al. |
| 2011/0035419 A1 | 2/2011 | Littlefield |
| 2011/0035621 A1 | 2/2011 | Littlefield |
| 2011/0125714 A1 | 5/2011 | Manson |
| 2011/0138225 A1 | 6/2011 | Gunabalasubramaniam et al. |
| 2011/0161295 A1 | 6/2011 | Ngo |
| 2011/0231698 A1 | 9/2011 | Ziati et al. |
| 2012/0036108 A1 | 2/2012 | Prahlad |
| 2012/0084523 A1 | 4/2012 | Littlefield |
| 2012/0150818 A1 | 6/2012 | Vijayan Retnamma et al. |
| 2012/0150826 A1 | 6/2012 | Vijayan Retnamma et al. |
| 2012/0330911 A1 | 12/2012 | Gruenheid et al. |
| 2013/0198165 A1 | 8/2013 | Cheng et al. |
| 2013/0238562 A1 | 9/2013 | Kumarasamy et al. |
| 2013/0275696 A1 | 10/2013 | Hayasaka et al. |
| 2013/0339298 A1 | 12/2013 | Muller et al. |
| 2014/0046900 A1 | 2/2014 | Kumarasamy et al. |
| 2014/0095816 A1 | 4/2014 | Hsu et al. |
| 2014/0108352 A1 | 4/2014 | Ahrens et al. |
| 2014/0108355 A1 | 4/2014 | Prahlad |
| 2014/0181028 A1 | 6/2014 | Prahlad et al. |
| 2014/0201170 A1 | 7/2014 | Viyayan et al. |
| 2014/0201250 A1 | 7/2014 | Littlefield |
| 2014/0297699 A1 | 10/2014 | Fujishima et al. |
| 2014/0317063 A1 | 10/2014 | Patterson |
| 2015/0066852 A1 | 3/2015 | Beard et al. |
| 2015/0269144 A1 | 9/2015 | Littlefield |
| 2015/0278034 A1 | 10/2015 | Barnes et al. |
| 2016/0004721 A1 | 1/2016 | Iyer |
| 2016/0034481 A1 | 2/2016 | Kumarasamy et al. |
| 2016/0041880 A1 | 2/2016 | Mitkar et al. |
| 2016/0142483 A1 | 5/2016 | Nallathambi et al. |
| 2016/0147472 A1 | 5/2016 | Littlefield |
| 2016/0210306 A1 | 7/2016 | Kumarasamy et al. |
| 2016/0350391 A1 | 12/2016 | Vijayan et al. |
| 2017/0168903 A1 | 6/2017 | Chen |
| 2017/0177251 A1 | 6/2017 | Chen |
| 2017/0185488 A1 | 6/2017 | Kumarasamy et al. |
| 2017/0193003 A1 | 7/2017 | Vijayan et al. |
| 2017/0206221 A1 | 7/2017 | Kumarasamy et al. |
| 2017/0235647 A1 | 8/2017 | Kilaru et al. |
| 2017/0242871 A1 | 8/2017 | Kilaru et al. |
| 2017/0300548 A1 | 10/2017 | Kumarasamy et al. |

(56) References Cited

U.S. PATENT DOCUMENTS

| | | |
|---|---|---|
| 2018/0089038 A1 | 3/2018 | Kumarasamy et al. |
| 2018/0129567 A1 | 5/2018 | Kumarasamy |
| 2019/0129799 A1 | 5/2019 | Kumarasamy |
| 2019/0196916 A1 | 6/2019 | Kumarasamy et al. |
| 2019/0213087 A1 | 7/2019 | Kumarasamy et al. |
| 2019/0227883 A1 | 7/2019 | Kumarasamy et al. |
| 2019/0227990 A1 | 7/2019 | Kumarasamy et al. |
| 2019/0278664 A1 | 9/2019 | Dornemann et al. |
| 2020/0293408 A1 | 9/2020 | Mutha et al. |

FOREIGN PATENT DOCUMENTS

| | | |
|---|---|---|
| EP | 0467546 | 1/1992 |
| EP | 0541281 | 5/1993 |
| EP | 0774715 | 5/1997 |
| EP | 0809184 | 11/1997 |
| EP | 0899662 | 3/1999 |
| EP | 0981090 | 2/2000 |
| WO | WO 95/13580 | 5/1995 |
| WO | WO 99/12098 | 3/1999 |
| WO | WO 2006/052872 | 5/2006 |

OTHER PUBLICATIONS

Arneson, "Mass Storage Archiving in Network Environments" IEEE, Oct. 31-Nov. 1998, pp. 45-50.

Cabrera, et al. "ADSM: A Multi-Platform, Scalable, Back-up and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.

Catalogic Software Solutions Sheet, "Universal Data Protection Built on NetApp," 2013.

Commvault, "Commvault Simpana Intellisnap Snapshot Management Technology: Capabilities and Benefits", 16 pages, 2014.

Commvault, "Commvault Snapshot Backup & Recovery", 9 pages, 2015.

Commvault Systems, Inc., "Simpana Intellisnap Technology, Make Snaps Work", 2 pages, 2014.

Commvault Systems, Inc., "Synthetic Full Backups" ), 3 pages, 1997-2015.

Eitel, "Backup and Storage Management in Distributed Heterogeneous Environments," IEEE, 1994, pp. 124-126.

Huff, KL, "Data Set Usage Sequence Number," IBM Technical Disclosure Bulletin, vol. 24, No. 5, Oct. 1981 New York, US, pp. 2404-2406.

Nagy, Tibor, Table Level Recovery for Selected SQL Server Tables, Edgewood Solutions, LLC, https:/www.mssqltips.com/sqlservertip/2814/table-level-recovery-for-selected-sql-server-tables, May 12, 2017, pp. 1-10.

Rosenblum et al., "The Design and Implementation of a Log-Structure File System," Operating Systems Review SIGOPS, vol. 25, No. 5, May 1991, New York, US, pp. 1-15.

Vallabhaneni, et al., U.S. Appl. No. 14/717,930 Published as 2016/0210342 A1 Now Pat. 102010051, May 20, 2015, Cross-Application Database Restore.

\* cited by examiner

CROSS-APPLICATION DATABASE RESTORE

INCORPORATION BY REFERENCE TO ANY PRIORITY APPLICATIONS

This disclosure is a continuation of U.S. patent application Ser. No. 14/717,930, filed on May 20, 2015, which claims the benefit of priority under 35 U.S.C. § 119(e) of U.S. Provisional Application No. 62/106,109, filed on Jan. 21, 2015, the entirety of which is incorporated herein by reference. Any and all applications, if any, for which a foreign or domestic priority claim is identified in the Application Data Sheet of the present application are hereby incorporated by reference under 37 CFR 1.57.

BACKGROUND

Businesses worldwide recognize the commercial value of their data and seek reliable, cost-effective ways to protect the information stored on their computer networks while minimizing impact on productivity. Protecting information is often part of a routine process that is performed within an organization. A company might back up critical computing systems such as databases, file servers, web servers, and so on as part of a daily, weekly, or monthly maintenance schedule. The company may similarly protect computing systems used by each of its employees, such as those used by an accounting department, marketing department, engineering department, and so forth.

Given the rapidly expanding volume of data under management, companies also continue to seek innovative techniques for managing data growth, in addition to protecting data. For instance, companies often implement migration techniques for moving data to lower cost storage over time and data reduction techniques for reducing redundant data, pruning lower priority data, etc. Enterprises also increasingly view their stored data as a valuable asset. Along these lines, customers are looking for solutions that not only protect and manage, but also leverage their data. For instance, solutions providing data analysis capabilities, information management, improved data presentation and access features, and the like, are in increasing demand.

SUMMARY

According to certain aspects, a database file is backed up in a block-level fashion, which in some embodiments is an image-level backup. Some systems access a database object (e.g., a table) in a backed up database file by first restoring the entire backup file, which can consume a large amount of time and computing resources. In order to address these and other challenges, an information management system according to certain aspects implements database backup using block-level mapping of database objects. For example, the information management system may restore a particular database object from a backup database file that is stored as multiple blocks or other granular units. A block can include a large number of database blocks. At the time backup, the database data can be divided into one or more blocks and copied to secondary storage on a block-by-block basis. This can allow the information management system to restore only the block(s) that include the data for the requested database object, instead of restoring the entire backup database file. Then, the information management system can extract the desired data from the restored block(s). By using block-level mapping and storage techniques described herein, the system can restore a database object in a backed up database file without restoring the entire backup database file, thereby speeding up restore operations and reducing consumption of storage and processing resources.

Database application data may need to be restored to another database application that is different than the source database that originally generated the data. For example, data generated by an Oracle database may need to be restored to an SQL Server. Restoring a database file to a different database application may be performed for various reasons, such as where there are a limited number of available licenses for the source database application, for reporting reasons such as where a uniform reporting format is desired, quality assurance (QA) purposes, migration purposes (e.g., migration to a different database application, cloud, etc.), etc. However, in many cases, only a portion of a database file may need to be restored. For example, only a table or a few tables may need to be restored to generate a report. Accordingly, the information management system may implement database restore at a more granular level. For example, the information management system can extract a database object from a backup database file and convert the database object to the format of a database application that is different than the source database application used to generate the database object.

In some cases, database data may be archived to secondary storage to make more storage space available in primary storage. Such archived database data can be pruned from primary storage. When the user tries to access an object archived database data (e.g., a table or record), some systems may restore the entire archived file containing the desired data in order to restore only the desired data. However, the archived database data the user is trying to access is often only a portion of the archived file. Accordingly, similar to backup database files, an information management system according to certain aspects archives and restores database objects using blocks.

In certain embodiments, the information management system allows access to archived database data, without using the Network File System (NFS) protocol. The system can allocate disk storage for archive files and perform volume-level backup of the whole volume (e.g., obtain a snapshot of the volume). The volume-level backup files can be stored in secondary storage in relatively large blocks. The system can then allow the volume-level backup files to be mounted locally to the database application as pseudo volumes. When the database application accesses the data in a volume-level backup file, the system can restore the block(s) that include the accessed data to the database archive server.

According to some embodiments, a data storage system for protecting database files is provided. The system may include a client computing device. The client computing device can include at least one hardware processor. The client computing device can also include a database application executing on the processor and configured to output a database file for storage in one or more primary storage devices in a primary storage subsystem, the database file including a plurality of database objects, the database application outputting the database file as a series of application-level blocks. The client computing device may also include a data agent executing on the processor and configured to divide the database file into a plurality of first blocks having a first granularity larger than a second granularity of the application-level blocks such that each of the first blocks spans a plurality of the application-level blocks. The system can also include one or more secondary storage controller computers comprising computer hardware configured to: in response to instructions to create a secondary copy of the database file: copy the plurality of first blocks to one or more secondary storage devices in a secondary storage subsystem to create a secondary copy of the database file; and create a table that provides a mapping between the copied plurality of first blocks and corresponding locations on the one or more secondary storage devices.

According to certain aspects, the size of a block of the plurality of the first blocks may be based on the size of a read operation by the database application. In one embodiment, the size of the block is a multiple of the size of an application-level block. The table may be stored in one or more indexes associated with the one or more secondary storage controller computers. Each copied block of the plurality of first blocks can have a unique identifier (ID). The table may include columns relating to at least: the secondary copy of the database file, a block in the secondary copy of the database file, a backup file identifier for a location of the block in the secondary storage subsystem, and a backup file offset for the location of the block in the secondary storage subsystem. The data agent can be further configured to request restore of a database object from the secondary copy of the database file. In some embodiments, the secondary copy of the database file is provided as a file system in a user interface, and the database object is accessed through the file system. The system may further comprise a second data agent executing on a computing device that is different from the client computing device, and the second data agent may be configured to divide the database file into the plurality of first blocks. In one embodiment, the computing device is one of the one or more secondary storage controller computers.

According to other embodiments, a method of protecting database files is provided. The method can include, with a data agent executing on at least one processor of a client computing device, the client computing device comprising a database application executing on the processor and configured to output a database file for storage in one or more primary storage devices in a primary storage subsystem, the database file including a plurality of database objects, the database application outputting the database file as a series of application-level blocks: dividing the database file into a plurality of first blocks having a first granularity larger than a second granularity of the application-level blocks such that each of the first blocks spans a plurality of the application-level blocks. The method can also include, with one or more secondary storage controller computers comprising computer hardware: in response to instructions to create a secondary copy of the database file: copying the plurality of first blocks to one or more secondary storage devices in a secondary storage subsystem to create a secondary copy of the database file; and creating a table that provides a mapping between the copied plurality of first blocks and corresponding locations on the one or more secondary storage devices.

According to certain aspects, the size of a block of the plurality of the first blocks may be based on the size of a read operation by the database application. In one embodiment, the size of the block is a multiple of the size of an application-level block. The table may be stored in one or more indexes associated with the one or more secondary storage controller computers. Each copied block of the plurality of first blocks can have a unique identifier (ID). The table may include columns relating to at least: the secondary copy of the database file, a block in the secondary copy of the database file, a backup file identifier for a location of the block in the secondary storage subsystem, and a backup file offset for the location of the block in the secondary storage subsystem. The method can further comprise, using the data agent, requesting restore of a database object from the secondary copy of the database file. In some embodiments, the secondary copy of the database file is provided as a file system in a user interface, and the database object is accessed through the file system.

According to certain embodiments, a data storage system for protecting structured data is provided. The system may include a computing device comprising computer hardware and having a data agent executing thereon. The computing device can be configured to divide a structured data file residing on one or more storage devices in a first storage subsystem into a plurality of first blocks, wherein the structured data file includes data generated by a first application executing on one or more computing devices and the database file includes one or more data objects. The computing device can also be configured to create a table that provides a mapping between the plurality of first blocks and corresponding offsets of the database file. The system may also include one or more storage controller computers comprising hardware configured to, in response to instructions to create a copy of the structured file from the one or more storage devices in the first storage subsystem, copy the plurality of first blocks to one or more storage devices in a second storage subsystem to create the copy of the structured file.

According to some embodiments, a system for backing up and restoring database data is provided. The system may include a computing device comprising computer hardware, the computing device having a data agent executing thereon. The computing device may be configured to intercept a request from a database application executing on the computing device to read a portion of a database file, where a secondary copy of the database file resides on one or more secondary storage devices in a secondary storage subsystem and is organized on the one or more secondary storage devices as a plurality of first blocks, wherein the portion corresponds to a subset of one or more database objects of a plurality of database objects represented by the database file, wherein the request includes one or more database file offsets corresponding to the requested portion. The computing device may also be configured to map the one or more database file offsets to a subset of the first blocks that correspond to the one or more requested database objects based on the one or more database file offsets included in the request. The computing device can be further configured to issue a request for the subset of the first blocks. The system may also include one or more secondary storage controller computers comprising hardware configured to: in response to the request for the subset of the first blocks: access a table that maps the plurality of first blocks to storage locations on the one or more secondary storage devices; using the table, locate the subset of the first blocks on the one or more secondary storage devices and retrieve the subset of the first blocks from the one or more secondary storage devices; and forward the retrieved first blocks for storage in one or more primary storage devices associated with the computing device.

According to certain aspects, the computing device may be configured to map the one or more database file offsets to the subset of the first blocks that correspond to the one or more requested database objects at least in part by dividing the one or more database file offsets by the size of a block of the plurality of first blocks. In one embodiment, the computing device is a client computing device residing in a primary storage subsystem. In another embodiment, the computing device is one of the one or more secondary storage controller computers. The table may be stored in one or more indexes associated with the one or more secondary storage controller computers. Each block of the plurality of first blocks can have a unique identifier (ID) associated with the block. In some embodiments, the request for the subset of the first blocks includes the unique IDs of at least some blocks in the subset of the first blocks. In other embodiments, the table includes the unique IDs of the plurality of first blocks. The database file may be organized by the database application as a plurality of application-level blocks, and each block of the plurality of first blocks may include multiple ones of the application-level blocks. In one embodiment, the computing device is further configured to: extract application-level blocks corresponding to the requested portion from the retrieved first blocks based on the one or more database file offsets; and forward the extracted application-level blocks to the database application. In another embodiment, the size of a block of the plurality of the first blocks is based on the size of a read operation by the database application. In yet another embodiment, the size of a block of the plurality of the first blocks is a multiple of the size of an application-level block of the plurality of application-level blocks. The computing device may be further configured to present the secondary copy of the database file as a file system in a user interface, and the request to read the portion may be generated in response to selection of the one or more database objects that correspond to the portion within the user interface. In some embodiments, the secondary copy is browsed using the database application. In other embodiments, the one or more database objects that correspond to the portion are selected by a query.

According to other embodiments, a method of backing up and restoring database data is provided. The method can include, using a computing device comprising computer hardware, the computing device having a data agent executing thereon: intercepting a request from a database application executing on the computing device to read a portion of a database file, where a secondary copy of the database file resides on one or more secondary storage devices in a secondary storage subsystem and is organized on the one or more secondary storage devices as a plurality of first blocks, wherein the portion corresponds to a subset of one or more database objects of a plurality of database objects represented by the database file, wherein the request includes one or more database file offsets corresponding to the requested portion; mapping the one or more database file offsets to a subset of the first blocks that correspond to the one or more requested database objects based on the one or more database file offsets included in the request; and issuing a request for the subset of the first blocks. The method can also include, using one or more secondary storage controller computers comprising hardware: in response to the request for the subset of the first blocks: accessing a table that maps the plurality of first blocks to storage locations on the one or more secondary storage devices; using the table, locating the subset of the first blocks on the one or more secondary storage devices and retrieve the subset of the first blocks from the one or more secondary storage devices; and forwarding the retrieved first blocks for storage in one or more primary storage devices associated with the computing device.

According to certain aspects, said mapping the one or more database file offsets to the subset of the first blocks that correspond to the one or more requested database objects may comprise dividing the one or more database file offsets by the size of a block of the plurality of first blocks. In one embodiment, the computing device is a client computing device residing in a primary storage subsystem. In another embodiment, the computing device is one of the one or more secondary storage controller computers. The table may be stored in one or more indexes associated with the one or more secondary storage controller computers. Each block of the plurality of first blocks can have a unique identifier (ID) associated with the block. In some embodiments, the request for the subset of the first blocks includes the unique IDs of at least some blocks in the subset of the first blocks. The database file may be organized by the database application as a plurality of application-level blocks, and each block of the plurality of first blocks may include multiple ones of the application-level blocks, and the method can further comprise: extracting application-level blocks corresponding to the requested portion from the retrieved first blocks based on the one or more database file offsets; and forwarding the extracted application-level blocks to the database application. The method can further comprise presenting the secondary copy of the database file as a file system in a user interface, and the request to read the portion may be generated in response to selection of the one or more database objects that correspond to the portion within the user interface.

According to certain embodiments, a system for converting database data from one database application format to another database application format is provided. The system can include a first computing device comprising computer hardware. The first computing device may be configured to, in response to a request to access at least one first database object of a plurality of database objects represented by a database file generated by a first database application, the database file including a plurality of data blocks, the first database application residing on a computing device within a primary storage subsystem, identify a subset of the plurality of data blocks which correspond to the first database object. The first computing device may be further configured to issue a request to retrieve the subset of data blocks from one or more secondary storage devices which reside in a secondary storage subsystem and which store a secondary copy of the database file, the secondary copy of the database file including secondary copies of the plurality of data blocks. The system may include a second computing device comprising computer hardware. The system may also include one or more secondary storage controller computers comprising computer hardware. The one or more secondary storage controller computers may be configured to receive the request to retrieve the subset of data blocks. The one or more secondary storage controller computers can be further configured to access a stored table that provides a mapping between the secondary copies of the plurality of data blocks and corresponding locations of the secondary copies of the plurality of data blocks in the one or more secondary storage devices. The one or more secondary storage controller computers can additionally be configured to retrieve the subset of data blocks from the one or more secondary storage devices. The one or more secondary storage controller computers may also be configured to forward the retrieved subset of data blocks to the second computing device. The second computing device can be configured to receive each of the requested data blocks, the received data blocks retrieved from the one or more secondary storage devices. The second computing device may also be configured to convert the received data blocks to a format usable by a second database application different than the first database application. The second computing device may be further configured to forward the converted data blocks for use by an instance of the second database application.

According to certain aspects, the at least one first database object may comprise multiple database objects, and the system may further comprise a staging memory which receives and store the requested data blocks prior to their conversion, wherein at least some of the requested data blocks are accessed from the staging memory for conversion before others of the requested data blocks are received and stored by the staging memory. In one embodiment, the second computing device is in communication with the staging memory and accesses data blocks directly from the staging memory for performing the conversion. In another embodiment, a third computing device in communication with the staging memory forwards data blocks from the staging memory to the second computing device for performing the conversion. The table may be stored in an index associated with the one or more secondary storage controller computers. The database file can be organized by the first database application as a plurality of application-level blocks, each of the plurality of data blocks can include multiple application-level blocks, an index associated with the first database application can provide a mapping between the plurality of database objects and corresponding application-level blocks, and the request to access the at least one first database object can be generated by consulting the index and include one or more offsets in the database file corresponding to the at least one first database object. In some embodiments, the second computing device is configured to convert the received data blocks to the format usable by the second database application at least in part by: extracting application-level blocks included in the received data blocks which correspond to the first database object based on the one or more offsets indicating the first database object; and converting the identified application-level blocks to the format usable by the second database application. The one or more secondary storage devices may include one or more tapes, and the secondary copy of the database file may be stored on the one or more tapes. The first computing device can be further configured to present the secondary copy of the database file as a file system in a user interface, and the request to access the at least one first database object can be generated in response to selection of the at least one first database object in the user interface.

According to some embodiments, a method of converting database data from one database application format to another database application format is provided. The method may include, using a first computing device comprising computer hardware: in response to a request to access at least one first database object of a plurality of database objects represented by a database file generated by a first database application, the database file including a plurality of data blocks, the first database application residing on a computing device within a primary storage subsystem, identifying a subset of the plurality of data blocks which correspond to the first database object; and issuing a request to retrieve the subset of data blocks from one or more secondary storage devices which reside in a secondary storage subsystem and which store a secondary copy of the database file, the secondary copy of the database file including secondary copies of the plurality of data blocks. The method can also include, using one or more secondary storage controller computers comprising computer hardware: receiving the request to retrieve the subset of data blocks; accessing a stored table that provides a mapping between the secondary copies of the plurality of data blocks and corresponding locations of the secondary copies of the plurality of data blocks in the one or more secondary storage devices; retrieving the subset of data blocks from the one or more secondary storage devices; and forwarding the retrieved subset of data blocks to a second computing device comprising computer hardware. The method can further include, using the second computing device: receiving each of the requested data blocks, the received data blocks retrieved from the one or more secondary storage devices; converting the received data blocks to a format usable by a second database application different than the first database application; and forwarding the converted data blocks for use by an instance of the second database application.

According to certain aspects, the at least one first database object may comprise multiple database objects, and the requested data blocks may be received and stored in a staging memory prior to their conversion, wherein at least some of the requested data blocks are accessed from the staging memory for conversion before others of the requested data blocks are received and stored by the staging memory. In one embodiment, the second computing device is in communication with the staging memory and accesses data blocks directly from the staging memory for performing the conversion. In another embodiment, a third computing device in communication with the staging memory forwards data blocks from the staging memory to the second computing device for performing the conversion. The table may be stored in an index associated with the one or more secondary storage controller computers. The database file can be organized by the first database application as a plurality of application-level blocks, each of the plurality of data blocks can include multiple application-level blocks, an index associated with the first database application can provide a mapping between the plurality of database objects and corresponding application-level blocks, and the request to access the at least one first database object can be generated by consulting the index and include one or more offsets in the database file corresponding to the at least one first database object. In some embodiments, said converting the received data blocks to a format usable by a second database application comprises: extracting application-level blocks included in the received data blocks which correspond to the first database object based on the one or more offsets indicating the first database object; and converting the identified application-level blocks to the format usable by the second database application. The one or more secondary storage devices may include one or more tapes, and the secondary copy of the database file may be stored on the one or more tapes.

According to other embodiments, a system for converting structured data from one software application format to another software application format is provided. The system can include a first computing device comprising computer hardware. The first computing device may be configured to, in response to a request to access at least one first object of a plurality of objects represented by a structured file generated by a first software application, the structured file including a plurality of data blocks, the first software application residing on a computing device within a first storage subsystem, identify a subset of the plurality of data blocks which correspond to the first object. The first computing device may be further configured to issue a request to retrieve the subset of data blocks from one or more storage devices which reside in a second storage subsystem and which store a secondary copy of the structured file, the secondary copy of the structured file including secondary copies of the plurality of data blocks. The system may also include a second computing device comprising computer hardware. The system may further include one or more secondary storage controller computers comprising computer hardware. The one or more secondary storage controller computers can be configured to receive the request to retrieve the subset of data blocks. The one or more secondary storage controller computers may also be configured to access a stored table that provides a mapping between the secondary copies of the plurality of data blocks and corresponding locations of the secondary copies of the plurality of data blocks in the one or more storage devices. The one or more secondary storage controller computers can be further configured to retrieve the subset of data blocks from the one or more storage devices. The one or more secondary storage controller computers may additionally be configured to forward the retrieved subset of data blocks to the second computing device. The second computing device can be configured to receive each of the requested data blocks, the received data blocks retrieved from the one or more storage devices. The second computing device may be configured to convert the received data blocks to a format usable by a second software application different than the first software application. The second computing device can be further configured to forward the converted data blocks for use by an instance of the second software application.

According to certain embodiments, an information management system for archiving and restoring database data is provided. The system can include a data agent comprising computer hardware. The data agent may be configured to process a database file residing on one or more first storage devices to identify a subset of data in the database file for archiving, the database file generated by a database application executing on a client computing device comprising computer hardware. The data agent may also be configured to extract the subset of the data from the database file and store the subset of the data in an archive file on the one or more first storage devices, the archive file contained within a first volume. The data agent may be further configured to delete the subset of the data from the database file. The data agent can additionally be configured to create a snapshot of the first volume, the snapshot of the first volume being stored on the one or more first storage devices. The data agent can be further configured to divide the snapshot of the first volume into a plurality of blocks having a common size. The system may also include at least one secondary storage controller computer comprising hardware and residing in a secondary storage subsystem, the secondary storage controller computer configured to, as part of a secondary copy operation in which the snapshot of the first volume is copied to one or more secondary storage devices in the secondary storage subsystem: receive the plurality of blocks over a network connection; copy the plurality of blocks to the one or more secondary storage devices to create a secondary copy of the first volume; and create a table that provides a mapping between the copied plurality of blocks and corresponding locations in the one or more secondary storage devices.

According to some embodiments, an information management system for archiving and restoring database data is provided. The system may include a data agent comprising computer hardware. The data agent may be configured to process a database file residing on one or more primary storage devices in a primary storage subsystem to identify a subset of data in the database file for archiving, the database file generated by a database application executing on a client computing device comprising computer hardware. The data agent can also be configured to extract the subset of the data from the database file and store the subset of the data in an archive file on one or more of the primary storage devices as a plurality of blocks having a common size. The data agent may be further configured to delete the subset of the data from the database file. The system can also include at least one secondary storage controller computer comprising hardware and residing in a secondary storage subsystem, the secondary storage controller computer configured to, as part of a secondary copy operation in which the archive file is copied to one or more secondary storage devices in the secondary storage subsystem: receive the plurality of blocks over a network connection; copy the plurality of blocks to the one or more secondary storage devices to create a secondary copy of the archive file; and create a table that provides a mapping between the copied plurality of blocks and corresponding locations in the one or more secondary storage devices, wherein the archive file is deleted from the primary storage devices subsequent to the creation of the secondary copy of the archive file.

According to certain aspects, the archive file may be organized as one or more database blocks and a block of the plurality blocks may include multiple database blocks. The data agent may be further configured to: intercept a read operation by the database application to access one or more database blocks in the secondary copy of the archive file; determine an offset of the one or more database blocks accessed by the read operation; identify a block that corresponds to the offset; and send a request to the at least one secondary storage controller computer to restore the identified block from the one or more secondary storage devices in the secondary storage subsystem; and the at least one secondary storage controller computer may be further configured to: in response to receiving the request to restore the identified block: access the table to determine the location of the identified block in the one or more secondary storage devices in the secondary storage subsystem; and restore the requested block from the one or more secondary storage devices in the secondary storage subsystem to the primary storage subsystem. The system may further comprise a database archive server executing on a second computing device that is different from the client computing device on which the database application executes, the database archive server including a staging memory, wherein the secondary copy of the archive file is accessed through the user interface of the database archive server for the read operation, and wherein the at least one secondary storage controller computer is configured to restore the requested block at least in part by storing the requested block in the staging memory of the database archive server and forwarding the stored block in the staging memory to at least one of the one or more primary storage devices in the primary storage subsystem associated with the client computing device. The secondary copy of the archive file can be provided as a file system in the user interface of the database archive server, and the one or more database blocks in the read operation can be accessed through the file system. The secondary copy of the archive file may be provided as the file system in the user interface of the database archive server using a Network File System (NFS) protocol. A Network File System (NFS) server executing on the at least one secondary storage controller computer may be configured to assign, as part of the secondary copy operation in which the archive file is copied to the one or more secondary storage devices, a second filepath for accessing the secondary copy of the archive file using the NFS protocol, wherein the second filepath is different from a filepath of the archive file. The data agent can execute on the at least one secondary storage controller computer on which the NFS server executes. The data agent may be configured to extract the subset of the data from the database file and store the subset of the data in the archive file at least in part by instructing the database application to extract the subset of the data and create the archive file.

According to other embodiments, a method of archiving and restoring database data is provided. The method may include, using a data agent comprising computer hardware: processing a database file residing on one or more primary storage devices in a primary storage subsystem to identify a subset of the data in the database file for archiving, the database file generated by a database application executing on a client computing device comprising computer hardware; extracting the subset of the data from the database file and storing the subset of the data in an archive file on one or more of the primary storage devices as a plurality of blocks having a common size; and deleting the subset of the data from the database file. The method may also include, using at least one secondary storage controller computer comprising hardware and residing in a secondary storage subsystem, as part of a secondary copy operation in which the archive file is copied to one or more secondary storage devices in the secondary storage subsystem: receiving the plurality of blocks over a network connection; copying the plurality of blocks to the one or more secondary storage devices to create a secondary copy of the archive file; and creating a table that provides a mapping between the copied plurality of blocks and corresponding locations in the one or more secondary storage devices, wherein the archive file is deleted from the primary storage devices subsequent to the creation of the secondary copy of the archive file.

According to certain aspects, the archive file may be organized as one or more database blocks and a block of the plurality blocks may include multiple database blocks. The method may further comprise: using the data agent: intercepting a read operation by the database application to access one or more database blocks in the secondary copy of the archive file; determining an offset of the one or more database blocks accessed by the read operation; identifying a block that corresponds to the offset; and sending a request to the at least one secondary storage controller computer to restore the identified block from the one or more secondary storage devices in the secondary storage subsystem; and using the at least one secondary storage controller computer: in response to receiving the request to restore the identified block: accessing the table to determine the location of the identified block in the one or more secondary storage devices in the secondary storage subsystem; and restoring the requested block from the one or more secondary storage devices in the secondary storage subsystem to the primary storage subsystem. The secondary copy of the archive file can be accessed through the user interface of a database archive server for the read operation, the database archive server executing on a second computing device comprising hardware that is different from the client computing device on which the database application executes, the database archive server including a staging memory, and said restoring the requested block can comprise storing the requested block in the staging memory of the database archive server and forwarding the stored block in the staging memory to at least one of the one or more primary storage devices in the primary storage subsystem associated with the client computing device. The secondary copy of the archive file can be provided as a file system in the user interface of the database archive server and the one or more database blocks in the read operation can be accessed through the file system. The secondary copy of the archive file may be provided as the file system in the user interface of the database archive server using a Network File System (NFS) protocol. The method may further comprise: using a Network File System (NFS) server executing on the at least one secondary storage controller computer: assigning, as part of the secondary copy operation in which the archive file is copied to the one or more secondary storage devices, a second filepath for accessing the secondary copy of the archive file using the NFS protocol, wherein the second filepath is different from a filepath of the archive file. The data agent can execute on the at least one secondary storage controller computer on which the NFS server executes. Said extracting the subset of the data from the database file and storing the subset of the data in the archive file may comprise, using the data agent, instructing the database application to extract the subset of the data and create the archive file.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

DETAILED DESCRIPTION

Systems and methods are disclosed for protecting and restoring database data, including systems and methods for protecting database data at the block level, and restoring database data at the object-level. Examples of such systems and methods are described in further detail herein, in reference to FIGS. 2-6. Components and functionality for implementing any of the above features may be configured and/or incorporated into information management systems such as those described herein in FIGS. 1A-1H.

Certain techniques disclosed herein are described for the purposes of illustration in the context of working with relational database files, including techniques for backing up database files in a block-level fashion, restoring database file data (e.g., tables, records, or other objects) on an object-level basis, converting database data from one database format to another database format, etc. However, it should be appreciated that the techniques described herein are applicable to other types of data. For instance, the techniques described herein as being applicable to database files are equally applicable to other types of structured data, including spreadsheet files.

Information Management System Overview

With the increasing importance of protecting and leveraging data, organizations simply cannot afford to take the risk of losing critical data. Moreover, runaway data growth and other modern realities make protecting and managing data an increasingly difficult task. There is therefore a need for efficient, powerful, and user-friendly solutions for protecting and managing data.

Depending on the size of the organization, there are typically many data production sources which are under the purview of tens, hundreds, or even thousands of employees or other individuals. In the past, individual employees were sometimes responsible for managing and protecting their data. A patchwork of hardware and software point solutions has been applied in other cases. These solutions were often provided by different vendors and had limited or no interoperability.

Figure 1A:
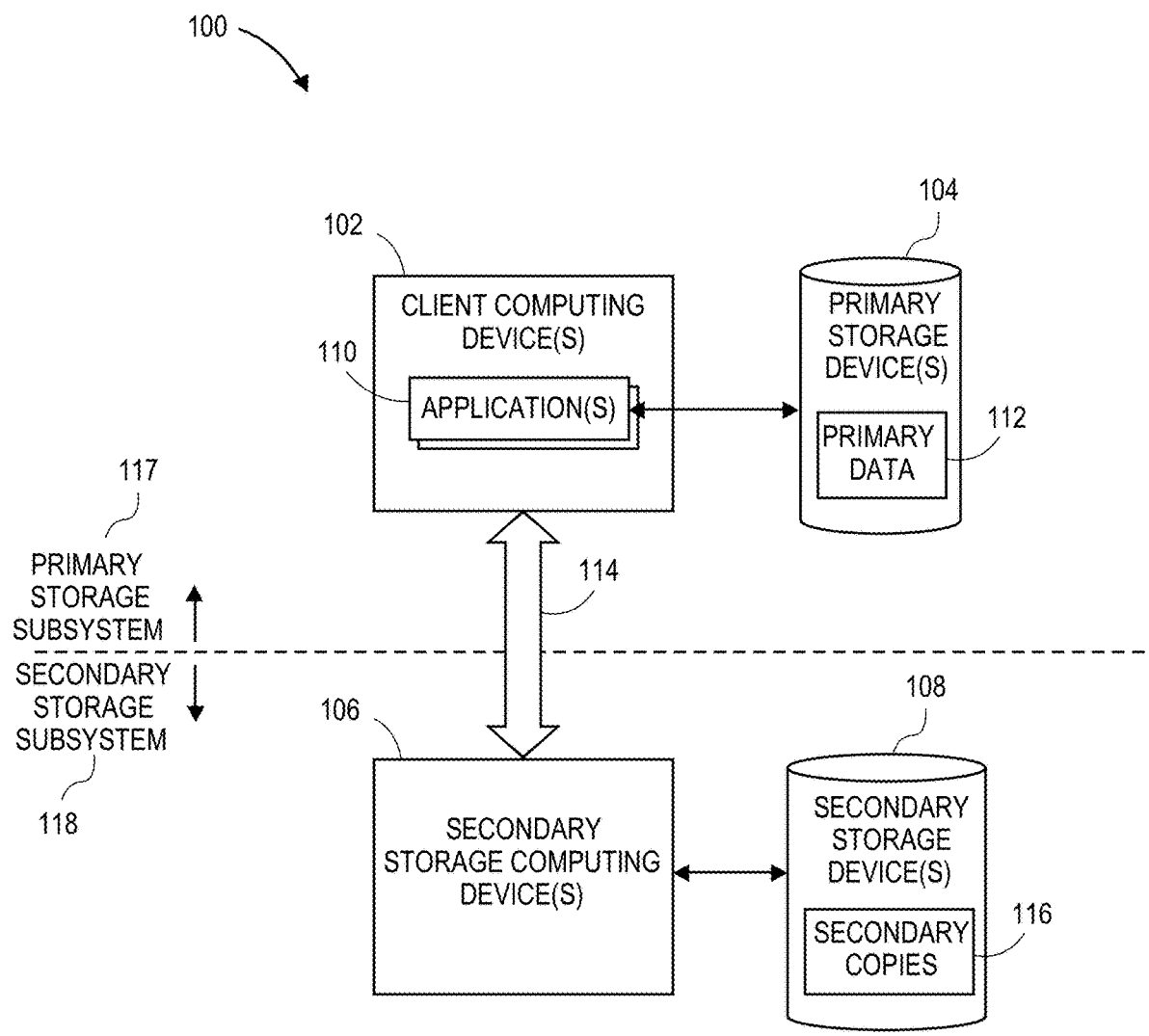
FIG. 1A is a block diagram illustrating an exemplary information management system.

Certain embodiments described herein provide systems and methods capable of addressing these and other shortcomings of prior approaches by implementing unified, organization-wide information management. FIG. 1A shows one such information management system 100, which generally includes combinations of hardware and software configured to protect and manage data and metadata, which is generated and used by the various computing devices in information management system 100. The organization that employs the information management system 100 may be a corporation or other business entity, non-profit organization, educational institution, household, governmental agency, or the like.

Generally, the systems and associated components described herein may be compatible with and/or provide some or all of the functionality of the systems and corresponding components described in one or more of the following U.S. patents and patent application publications assigned to CommVault Systems, Inc., each of which is hereby incorporated in its entirety by reference herein:

U.S. Pat. No. 7,035,880, entitled "Modular Backup and Retrieval System Used in Conjunction With a Storage Area Network";

U.S. Pat. No. 7,107,298, entitled "System And Method For Archiving Objects In An Information Store";

U.S. Pat. No. 7,246,207, entitled "System and Method for Dynamically Performing Storage Operations in a Computer Network";

U.S. Pat. No. 7,315,923, entitled "System And Method For Combining Data Streams In Pipelined Storage Operations In A Storage Network";

U.S. Pat. No. 7,343,453, entitled "Hierarchical Systems and Methods for Providing a Unified View of Storage Information";

U.S. Pat. No. 7,395,282, entitled "Hierarchical Backup and Retrieval System";

U.S. Pat. No. 7,529,782, entitled "System and Methods for Performing a Snapshot and for Restoring Data";

U.S. Pat. No. 7,617,262, entitled "System and Methods for Monitoring Application Data in a Data Replication System";

U.S. Pat. No. 7,747,579, entitled "Metabase for Facilitating Data Classification";

U.S. Pat. No. 8,156,086, entitled "Systems And Methods For Stored Data Verification";

U.S. Pat. No. 8,170,995, entitled "Method and System for Offline Indexing of Content and Classifying Stored Data";

U.S. Pat. No. 8,229,954, entitled "Managing Copies Of Data";

U.S. Pat. No. 8,230,195, entitled "System And Method For Performing Auxiliary Storage Operations";

U.S. Pat. No. 8,285,681, entitled "Data Object Store and Server for a Cloud Storage Environment, Including Data Deduplication and Data Management Across Multiple Cloud Storage Sites";

U.S. Pat. No. 8,307,177, entitled "Systems And Methods For Management Of Virtualization Data";

U.S. Pat. No. 8,364,652, entitled "Content-Aligned, Block-Based Deduplication";

U.S. Pat. No. 8,578,120, entitled "Block-Level Single Instancing";

U.S. Pat. Pub. No. 2006/0224846, entitled "System and Method to Support Single Instance Storage Operations";

U.S. Pat. Pub. No. 2009/0319534, entitled "Application-Aware and Remote Single Instance Data Management";

U.S. Pat. Pub. No. 2012/0150818, entitled "Client-Side Repository in a Networked Deduplicated Storage System"; and U.S. Pat. Pub. No. 2012/0150826, entitled "Distributed Deduplicated Storage System".

The information management system 100 can include a variety of different computing devices. For instance, as will be described in greater detail herein, the information management system 100 can include one or more client computing devices 102 and secondary storage computing devices 106.

Computing devices can include, without limitation, one or more: workstations, personal computers, desktop computers, or other types of generally fixed computing systems such as mainframe computers and minicomputers. Other computing devices can include mobile or portable computing devices, such as one or more laptops, tablet computers, personal data assistants, mobile phones (such as smartphones), and other mobile or portable computing devices such as embedded computers, set top boxes, vehicle-mounted devices, wearable computers, etc. Computing devices can include servers, such as mail servers, file servers, database servers, and web servers.

In some cases, a computing device includes virtualized and/or cloud computing resources. For instance, one or more virtual machines may be provided to the organization by a third-party cloud service vendor. Or, in some embodiments, computing devices can include one or more virtual machine(s) running on a physical host computing device (or "host machine") operated by the organization. As one example, the organization may use one virtual machine as a database server and another virtual machine as a mail server, both virtual machines operating on the same host machine.

A virtual machine includes an operating system and associated virtual resources, and is hosted simultaneously with another operating system on a physical host computer (or host machine). A hypervisor (typically software, and also known in the art as a virtual machine monitor or a virtual machine manager or "VMM") sits between the virtual machine and the hardware of the physical host machine. One example of hypervisor as virtualization software is ESX Server, by VMware, Inc. of Palo Alto, Calif.; other examples include Microsoft Virtual Server and Microsoft Windows Server Hyper-V, both by Microsoft Corporation of Redmond, Wash., and Sun xVM by Oracle America Inc. of Santa Clara, Calif. In some embodiments, the hypervisor may be firmware or hardware or a combination of software and/or firmware and/or hardware.

The hypervisor provides to each virtual operating system virtual resources, such as a virtual processor, virtual memory, a virtual network device, and a virtual disk. Each virtual machine has one or more virtual disks. The hypervisor typically stores the data of virtual disks in files on the file system of the physical host machine, called virtual machine disk files (in the case of VMware virtual servers) or virtual hard disk image files (in the case of Microsoft virtual servers). For example, VMware's ESX Server provides the Virtual Machine File System (VMFS) for the storage of virtual machine disk files. A virtual machine reads data from and writes data to its virtual disk much the same way that an actual physical machine reads data from and writes data to an actual disk.

Examples of techniques for implementing information management techniques in a cloud computing environment are described in U.S. Pat. No. 8,285,681, which is incorporated by reference herein. Examples of techniques for implementing information management techniques in a virtualized computing environment are described in U.S. Pat. No. 8,307,177, also incorporated by reference herein.

The information management system 100 can also include a variety of storage devices, including primary storage devices 104 and secondary storage devices 108, for example. Storage devices can generally be of any suitable type including, without limitation, disk drives, hard-disk arrays, semiconductor memory (e.g., solid state storage devices), network attached storage (NAS) devices, tape libraries or other magnetic, non-tape storage devices, optical media storage devices, DNA/RNA-based memory technology, combinations of the same, and the like. In some embodiments, storage devices can form part of a distributed file system. In some cases, storage devices are provided in a cloud (e.g., a private cloud or one operated by a third-party vendor). A storage device in some cases comprises a disk array or portion thereof.

The illustrated information management system 100 includes one or more client computing device 102 having at least one application 110 executing thereon, and one or more primary storage devices 104 storing primary data 112. The client computing device(s) 102 and the primary storage devices 104 may generally be referred to in some cases as a primary storage subsystem 117. A computing device in an information management system 100 that has a data agent 142 installed and operating on it is generally referred to as a client computing device 102 (or, in the context of a component of the information management system 100 simply as a "client").

Depending on the context, the term "information management system" can refer to generally all of the illustrated hardware and software components. Or, in other instances, the term may refer to only a subset of the illustrated components.

For instance, in some cases, the information management system 100 generally refers to a combination of specialized components used to protect, move, manage, manipulate, analyze, and/or process data and metadata generated by the client computing devices 102. However, the information management system 100 in some cases does not include the underlying components that generate and/or store the primary data 112, such as the client computing devices 102 themselves, the applications 110 and operating system operating on the client computing devices 102, and the primary storage devices 104. As an example, "information management system" may sometimes refer to one or more of the following components and corresponding data structures: storage managers, data agents, and media agents. These components will be described in further detail below.

Client Computing Devices

There are typically a variety of sources in an organization that produce data to be protected and managed. As just one illustrative example, in a corporate environment such data sources can be employee workstations and company servers such as a mail server, a web server, a database server, a transaction server, or the like. In the information management system 100, the data generation sources include the one or more client computing devices 102.

The client computing devices 102 may include any of the types of computing devices described above, without limitation, and in some cases the client computing devices 102 are associated with one or more users and/or corresponding user accounts, of employees or other individuals.

The information management system 100 generally addresses and handles the data management and protection needs for the data generated by the client computing devices 102. However, the use of this term does not imply that the client computing devices 102 cannot be "servers" in other respects. For instance, a particular client computing device 102 may act as a server with respect to other devices, such as other client computing devices 102. As just a few examples, the client computing devices 102 can include mail servers, file servers, database servers, and web servers.

Each client computing device 102 may have one or more applications 110 (e.g., software applications) executing thereon which generate and manipulate the data that is to be protected from loss and managed. The applications 110 generally facilitate the operations of an organization (or multiple affiliated organizations), and can include, without limitation, mail server applications (e.g., Microsoft Exchange Server), file server applications, mail client applications (e.g., Microsoft Exchange Client), database applications (e.g., SQL, Oracle, SAP, Lotus Notes Database), word processing applications (e.g., Microsoft Word), spreadsheet applications, financial applications, presentation applications, graphics and/or video applications, browser applications, mobile applications, entertainment applications, and so on.

The client computing devices 102 can have at least one operating system (e.g., Microsoft Windows, Mac OS X, iOS, IBM z/OS, Linux, other Unix-based operating systems, etc.) installed thereon, which may support or host one or more file systems and other applications 110.

The client computing devices 102 and other components in information management system 100 can be connected to one another via one or more communication pathways 114. For example, a first communication pathway 114 may connect (or communicatively couple) client computing device 102 and secondary storage computing device 106; a second communication pathway 114 may connect storage manager 140 and client computing device 102; and a third communication pathway 114 may connect storage manager 140 and secondary storage computing device 106, etc. (see, e.g., FIG. 1A and FIG. 1C). The communication pathways 114 can include one or more networks or other connection types including one or more of the following, without limitation: the Internet, a wide area network (WAN), a local area network (LAN), a Storage Area Network (SAN), a Fibre Channel connection, a Small Computer System Interface (SCSI) connection, a virtual private network (VPN), a token ring or TCP/IP based network, an intranet network, a point-to-point link, a cellular network, a wireless data transmission system, a two-way cable system, an interactive kiosk network, a satellite network, a broadband network, a baseband network, a neural network, a mesh network, an ad hoc network, other appropriate wired, wireless, or partially wired/wireless computer or telecommunications networks, combinations of the same or the like. The communication pathways 114 in some cases may also include application programming interfaces (APIs) including, e.g., cloud service provider APIs, virtual machine management APIs, and hosted service provider APIs. The underlying infrastructure of communication paths 114 may be wired and/or wireless, analog and/or digital, or any combination thereof; and the facilities used may be private, public, third-party provided, or any combination thereof, without limitation.

Primary Data and Exemplary Primary Storage Devices

Primary data 112 according to some embodiments is production data or other "live" data generated by the operating system and/or applications 110 operating on a client computing device 102. The primary data 112 is generally stored on the primary storage device(s) 104 and is organized via a file system supported by the client computing device 102. For instance, the client computing device(s) 102 and corresponding applications 110 may create, access, modify, write, delete, and otherwise use primary data 112. In some cases, some or all of the primary data 112 can be stored in cloud storage resources (e.g., primary storage device 104 may be a cloud-based resource).

Primary data 112 is generally in the native format of the source application 110. According to certain aspects, primary data 112 is an initial or first (e.g., created before any other copies or before at least one other copy) stored copy of data generated by the source application 110. Primary data 112 in some cases is created substantially directly from data generated by the corresponding source applications 110.

The primary storage devices 104 storing the primary data 112 may be relatively fast and/or expensive technology (e.g., a disk drive, a hard-disk array, solid state memory, etc.). In addition, primary data 112 may be highly changeable and/or may be intended for relatively short term retention (e.g., hours, days, or weeks).

According to some embodiments, the client computing device 102 can access primary data 112 from the primary storage device 104 by making conventional file system calls via the operating system. Primary data 112 may include structured data (e.g., database files), unstructured data (e.g., documents), and/or semi-structured data. Some specific examples are described below with respect to FIG. 1B.

It can be useful in performing certain tasks to organize the primary data 112 into units of different granularities. In general, primary data 112 can include files, directories, file system volumes, data blocks, extents, or any other hierarchies or organizations of data objects. As used herein, a "data object" can refer to both (1) any file that is currently addressable by a file system or that was previously addressable by the file system (e.g., an archive file) and (2) a subset of such a file (e.g., a data block).

As will be described in further detail, it can also be useful in performing certain functions of the information management system 100 to access and modify metadata within the primary data 112. Metadata generally includes information about data objects or characteristics associated with the data objects. For simplicity herein, it is to be understood that, unless expressly stated otherwise, any reference to primary data 112 generally also includes its associated metadata, but references to the metadata do not include the primary data.

Metadata can include, without limitation, one or more of the following: the data owner (e.g., the client or user that generates the data), the last modified time (e.g., the time of the most recent modification of the data object), a data object name (e.g., a file name), a data object size (e.g., a number of bytes of data), information about the content (e.g., an indication as to the existence of a particular search term), user-supplied tags, to/from information for email (e.g., an email sender, recipient, etc.), creation date, file type (e.g., format or application type), last accessed time, application type (e.g., type of application that generated the data object), location/network (e.g., a current, past or future location of the data object and network pathways to/from the data object), geographic location (e.g., GPS coordinates), frequency of change (e.g., a period in which the data object is modified), business unit (e.g., a group or department that generates, manages or is otherwise associated with the data object), aging information (e.g., a schedule, such as a time period, in which the data object is migrated to secondary or long term storage), boot sectors, partition layouts, file location within a file folder directory structure, user permissions, owners, groups, access control lists [ACLs]), system metadata (e.g., registry information), combinations of the same or other similar information related to the data object.

In addition to metadata generated by or related to file systems and operating systems, some of the applications 110 and/or other components of the information management system 100 maintain indices of metadata for data objects, e.g., metadata associated with individual email messages. Thus, each data object may be associated with corresponding metadata. The use of metadata to perform classification and other functions is described in greater detail below.

Each of the client computing devices 102 are generally associated with and/or in communication with one or more of the primary storage devices 104 storing corresponding primary data 112. A client computing device 102 may be considered to be "associated with" or "in communication with" a primary storage device 104 if it is capable of one or more of: routing and/or storing data (e.g., primary data 112)

to the particular primary storage device 104, coordinating the routing and/or storing of data to the particular primary storage device 104, retrieving data from the particular primary storage device 104, coordinating the retrieval of data from the particular primary storage device 104, and modifying and/or deleting data retrieved from the particular primary storage device 104.

The primary storage devices 104 can include any of the different types of storage devices described above, or some other kind of suitable storage device. The primary storage devices 104 may have relatively fast I/O times and/or are relatively expensive in comparison to the secondary storage devices 108. For example, the information management system 100 may generally regularly access data and metadata stored on primary storage devices 104, whereas data and metadata stored on the secondary storage devices 108 is accessed relatively less frequently.

Primary storage device 104 may be dedicated or shared. In some cases, each primary storage device 104 is dedicated to an associated client computing device 102. For instance, a primary storage device 104 in one embodiment is a local disk drive of a corresponding client computing device 102. In other cases, one or more primary storage devices 104 can be shared by multiple client computing devices 102, e.g., via a network such as in a cloud storage implementation. As one example, a primary storage device 104 can be a disk array shared by a group of client computing devices 102, such as one of the following types of disk arrays: EMC Clariion, EMC Symmetrix, EMC Celerra, Dell EqualLogic, IBM XIV, NetApp FAS, HP EVA, and HP 3PAR.

The information management system 100 may also include hosted services (not shown), which may be hosted in some cases by an entity other than the organization that employs the other components of the information management system 100. For instance, the hosted services may be provided by various online service providers to the organization. Such service providers can provide services including social networking services, hosted email services, or hosted productivity applications or other hosted applications). Hosted services may include software-as-a-service (SaaS), platform-as-a-service (PaaS), application service providers (ASPs), cloud services, or other mechanisms for delivering functionality via a network. As it provides services to users, each hosted service may generate additional data and metadata under management of the information management system 100, e.g., as primary data 112. In some cases, the hosted services may be accessed using one of the applications 110. As an example, a hosted mail service may be accessed via browser running on a client computing device 102. The hosted services may be implemented in a variety of computing environments. In some cases, they are implemented in an environment having a similar arrangement to the information management system 100, where various physical and logical components are distributed over a network.

Secondary Copies and Exemplary Secondary Storage Devices

The primary data 112 stored on the primary storage devices 104 may be compromised in some cases, such as when an employee deliberately or accidentally deletes or overwrites primary data 112 during their normal course of work. Or the primary storage devices 104 can be damaged, lost, or otherwise corrupted. For recovery and/or regulatory compliance purposes, it is therefore useful to generate copies of the primary data 112. Accordingly, the information management system 100 includes one or more secondary storage computing devices 106 and one or more secondary storage devices 108 configured to create and store one or more secondary copies 116 of the primary data 112 and associated metadata. The secondary storage computing devices 106 and the secondary storage devices 108 may sometimes be referred to as a secondary storage subsystem 118.

Creation of secondary copies 116 can help in search and analysis efforts and meet other information management goals, such as: restoring data and/or metadata if an original version (e.g., of primary data 112) is lost (e.g., by deletion, corruption, or disaster); allowing point-in-time recovery; complying with regulatory data retention and electronic discovery (e-discovery) requirements; reducing utilized storage capacity; facilitating organization and search of data; improving user access to data files across multiple computing devices and/or hosted services; and implementing data retention policies.

The client computing devices 102 access or receive primary data 112 and communicate the data, e.g., over one or more communication pathways 114, for storage in the secondary storage device(s) 108.

A secondary copy 116 can comprise a separate stored copy of application data that is derived from one or more earlier-created, stored copies (e.g., derived from primary data 112 or another secondary copy 116). Secondary copies 116 can include point-in-time data, and may be intended for relatively long-term retention (e.g., weeks, months or years), before some or all of the data is moved to other storage or is discarded.

In some cases, a secondary copy 116 is a copy of application data created and stored subsequent to at least one other stored instance (e.g., subsequent to corresponding primary data 112 or to another secondary copy 116), in a different storage device than at least one previous stored copy, and/or remotely from at least one previous stored copy. In some other cases, secondary copies can be stored in the same storage device as primary data 112 and/or other previously stored copies. For example, in one embodiment a disk array capable of performing hardware snapshots stores primary data 112 and creates and stores hardware snapshots of the primary data 112 as secondary copies 116. Secondary copies 116 may be stored in relatively slow and/or low cost storage (e.g., magnetic tape). A secondary copy 116 may be stored in a backup or archive format, or in some other format different than the native source application format or other primary data format.

In some cases, secondary copies 116 are indexed so users can browse and restore at another point in time. After creation of a secondary copy 116 representative of certain primary data 112, a pointer or other location indicia (e.g., a stub) may be placed in primary data 112, or be otherwise associated with primary data 112 to indicate the current location on the secondary storage device(s) 108 of secondary copy 116.

Since an instance of a data object or metadata in primary data 112 may change over time as it is modified by an application 110 (or hosted service or the operating system), the information management system 100 may create and manage multiple secondary copies 116 of a particular data object or metadata, each representing the state of the data object in primary data 112 at a particular point in time. Moreover, since an instance of a data object in primary data 112 may eventually be deleted from the primary storage device 104 and the file system, the information management system 100 may continue to manage point-in-time representations of that data object, even though the instance in primary data 112 no longer exists.

For virtualized computing devices the operating system and other applications 110 of the client computing device(s) 102 may execute within or under the management of virtualization software (e.g., a VMM), and the primary storage device(s) 104 may comprise a virtual disk created on a physical storage device. The information management system 100 may create secondary copies 116 of the files or other data objects in a virtual disk file and/or secondary copies 116 of the entire virtual disk file itself (e.g., of an entire .vmdk file).

Secondary copies 116 may be distinguished from corresponding primary data 112 in a variety of ways, some of which will now be described. First, as discussed, secondary copies 116 can be stored in a different format (e.g., backup, archive, or other non-native format) than primary data 112. For this or other reasons, secondary copies 116 may not be directly useable by the applications 110 of the client computing device 102, e.g., via standard system calls or otherwise without modification, processing, or other intervention by the information management system 100.

Secondary copies 116 are also in some embodiments stored on a secondary storage device 108 that is inaccessible to the applications 110 running on the client computing devices 102 (and/or hosted services). Some secondary copies 116 may be "offline copies," in that they are not readily available (e.g., not mounted to tape or disk). Offline copies can include copies of data that the information management system 100 can access without human intervention (e.g., tapes within an automated tape library, but not yet mounted in a drive), and copies that the information management system 100 can access only with at least some human intervention (e.g., tapes located at an offsite storage site).

The Use of Intermediate Devices for Creating Secondary Copies

Creating secondary copies can be a challenging task. For instance, there can be hundreds or thousands of client computing devices 102 continually generating large volumes of primary data 112 to be protected. Also, there can be significant overhead involved in the creation of secondary copies 116. Moreover, secondary storage devices 108 may be special purpose components, and interacting with them can require specialized intelligence.

In some cases, the client computing devices 102 interact directly with the secondary storage device 108 to create the secondary copies 116. However, in view of the factors described above, this approach can negatively impact the ability of the client computing devices 102 to serve the applications 110 and produce primary data 112. Further, the client computing devices 102 may not be optimized for interaction with the secondary storage devices 108.

Thus, in some embodiments, the information management system 100 includes one or more software and/or hardware components which generally act as intermediaries between the client computing devices 102 and the secondary storage devices 108. In addition to off-loading certain responsibilities from the client computing devices 102, these intermediate components can provide other benefits. For instance, as discussed further below with respect to FIG. 1D, distributing some of the work involved in creating secondary copies 116 can enhance scalability.

The intermediate components can include one or more secondary storage computing devices 106 as shown in FIG. 1A and/or one or more media agents, which can be software modules operating on corresponding secondary storage computing devices 106 (or other appropriate computing devices). Media agents are discussed below (e.g., with respect to FIGS. 1C-1E).

The secondary storage computing device(s) 106 can comprise any of the computing devices described above, without limitation. In some cases, the secondary storage computing device(s) 106 include specialized hardware and/or software componentry for interacting with the secondary storage devices 108.

To create a secondary copy 116 involving the copying of data from the primary storage subsystem 117 to the secondary storage subsystem 118, the client computing device 102 in some embodiments communicates the primary data 112 to be copied (or a processed version thereof) to the designated secondary storage computing device 106, via the communication pathway 114. The secondary storage computing device 106 in turn conveys the received data (or a processed version thereof) to the secondary storage device 108. In some such configurations, the communication pathway 114 between the client computing device 102 and the secondary storage computing device 106 comprises a portion of a LAN, WAN or SAN. In other cases, at least some client computing devices 102 communicate directly with the secondary storage devices 108 (e.g., via Fibre Channel or SCSI connections). In some other cases, one or more secondary copies 116 are created from existing secondary copies, such as in the case of an auxiliary copy operation, described in greater detail below.

Exemplary Primary Data and an Exemplary Secondary Copy

Figure 1B:
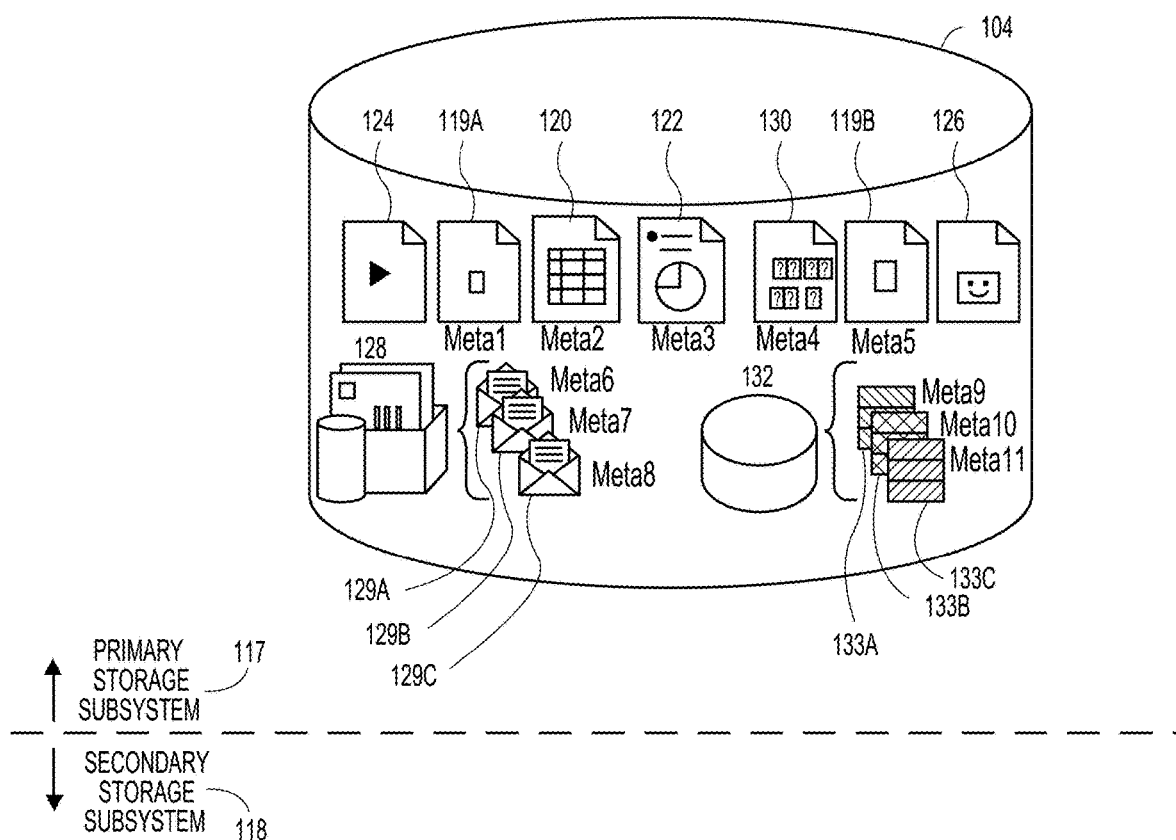
FIG. 1B is a detailed view of a primary storage device, a secondary storage device, and some examples of primary data and secondary copy data.
Figure 1B:
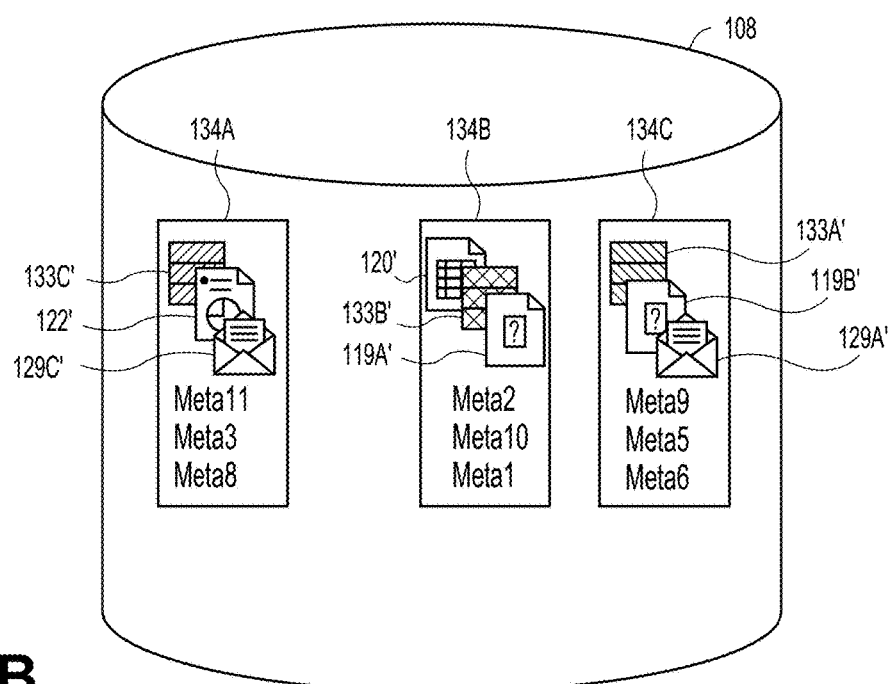

FIG. 1B is a detailed view showing some specific examples of primary data stored on the primary storage device(s) 104 and secondary copy data stored on the secondary storage device(s) 108, with other components in the system removed for the purposes of illustration. Stored on the primary storage device(s) 104 are primary data objects including word processing documents 119A-B, spreadsheets 120, presentation documents 122, video files 124, image files 126, email mailboxes 128 (and corresponding email messages 129A-C), html/xml or other types of markup language files 130, databases 132 and corresponding tables or other data structures 133A-133O).

Some or all primary data objects are associated with corresponding metadata (e.g., "Meta1-11"), which may include file system metadata and/or application specific metadata. Stored on the secondary storage device(s) 108 are secondary copy data objects 134A-C which may include copies of or otherwise represent corresponding primary data objects and metadata.

As shown, the secondary copy data objects 134A-C can individually represent more than one primary data object. For example, secondary copy data object 134A represents three separate primary data objects 133C, 122, and 129C (represented as 133C', 122', and 129C', respectively, and accompanied by the corresponding metadata Meta11, Meta3, and Meta8, respectively). Moreover, as indicated by the prime mark ('), a secondary copy object may store a representation of a primary data object and/or metadata differently than the original format, e.g., in a compressed, encrypted, deduplicated, or other modified format. Likewise, secondary data object 134B represents primary data objects 120, 133B, and 119A as 120', 133B', and 119A', respectively and accompanied by corresponding metadata Meta2, Meta10, and Meta1, respectively. Also, secondary data object 134C represents primary data objects 133A, 119B, and 129A as 133A', 119B', and 129A', respectively, accompanied by corresponding metadata Meta9, Meta5, and Meta6, respectively.

Exemplary Information Management System Architecture

The information management system 100 can incorporate a variety of different hardware and software components, which can in turn be organized with respect to one another in many different configurations, depending on the embodiment. There are critical design choices involved in specifying the functional responsibilities of the components and the role of each component in the information management system 100. For instance, as will be discussed, such design choices can impact performance as well as the adaptability of the information management system 100 to data growth or other changing circumstances.

Figure 1C:
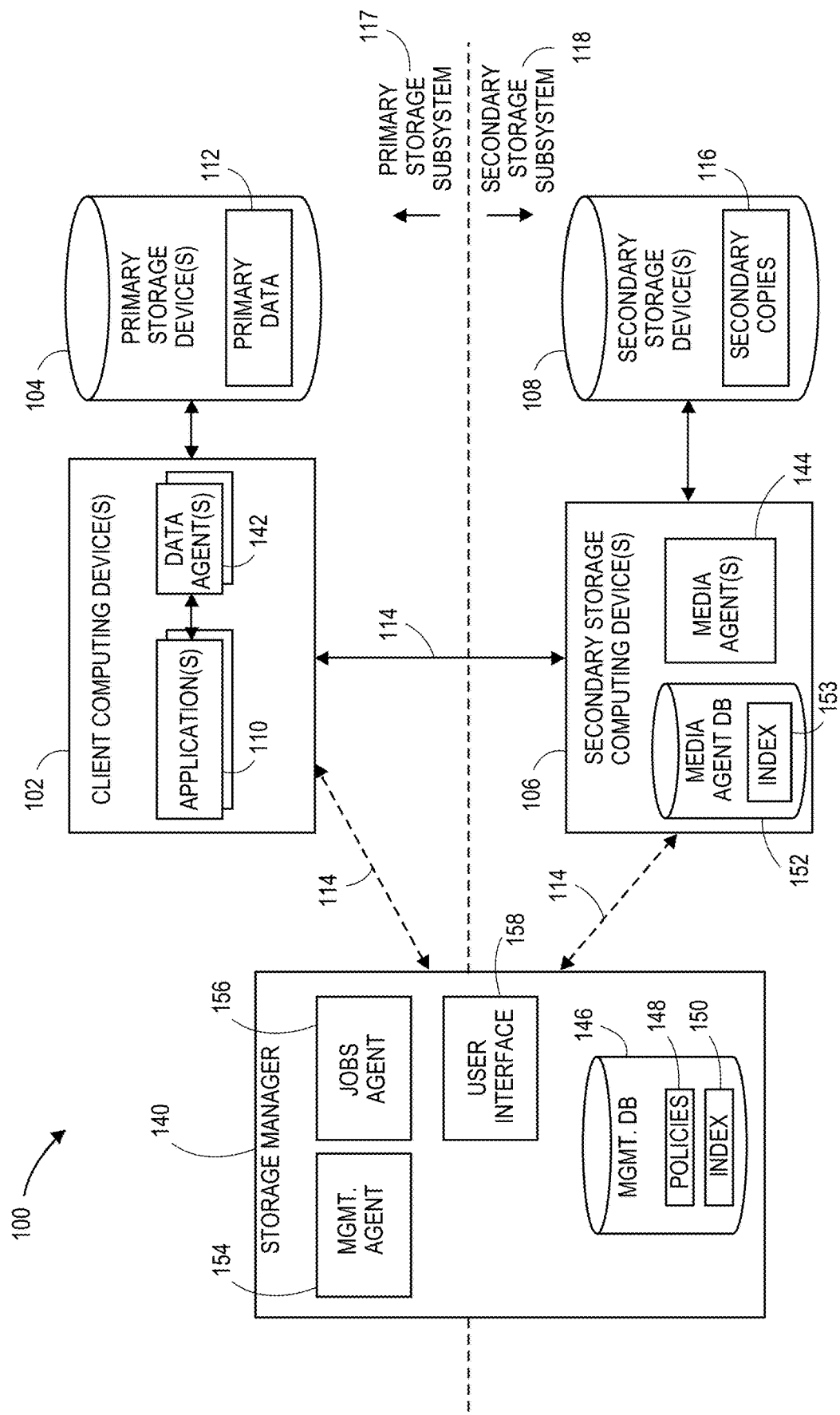
FIG. 1C is a block diagram of an exemplary information management system including a storage manager, one or more data agents, and one or more media agents.

FIG. 1C shows an information management system 100 designed according to these considerations and which includes: storage manager 140, a centralized storage and/or information manager that is configured to perform certain control functions, one or more data agents 142 executing on the client computing device(s) 102 configured to process primary data 112, and one or more media agents 144 executing on the one or more secondary storage computing devices 106 for performing tasks involving the secondary storage devices 108. While distributing functionality amongst multiple computing devices can have certain advantages, in other contexts it can be beneficial to consolidate functionality on the same computing device. As such, in various other embodiments, one or more of the components shown in FIG. 1C as being implemented on separate computing devices are implemented on the same computing device. In one configuration, a storage manager 140, one or more data agents 142, and one or more media agents 144 are all implemented on the same computing device. In another embodiment, one or more data agents 142 and one or more media agents 144 are implemented on the same computing device, while the storage manager 140 is implemented on a separate computing device, etc. without limitation.

Storage Manager

As noted, the number of components in the information management system 100 and the amount of data under management can be quite large. Managing the components and data is therefore a significant task, and a task that can grow in an often unpredictable fashion as the quantity of components and data scale to meet the needs of the organization. For these and other reasons, according to certain embodiments, responsibility for controlling the information management system 100, or at least a significant portion of that responsibility, is allocated to the storage manager 140. By distributing control functionality in this manner, the storage manager 140 can be adapted independently according to changing circumstances. Moreover, a computing device for hosting the storage manager 140 can be selected to best suit the functions of the storage manager 140. These and other advantages are described in further detail below with respect to FIG. 1D.

The storage manager 140 may be a software module or other application, which, in some embodiments operates in conjunction with one or more associated data structures, e.g., a dedicated database (e.g., management database 146). In some embodiments, storage manager 140 is a computing device comprising circuitry for executing computer instructions and performs the functions described herein. The storage manager generally initiates, performs, coordinates and/or controls storage and other information management operations performed by the information management system 100, e.g., to protect and control the primary data 112 and secondary copies 116 of data and metadata. In general, storage manager 100 may be said to manage information management system 100, which includes managing the constituent components, e.g., data agents and media agents, etc.

As shown by the dashed arrowed lines 114 in FIG. 1C, the storage manager 140 may communicate with and/or control some or all elements of the information management system 100, such as the data agents 142 and media agents 144. Thus, in certain embodiments, control information originates from the storage manager 140 and status reporting is transmitted to storage manager 140 by the various managed components, whereas payload data and payload metadata is generally communicated between the data agents 142 and the media agents 144 (or otherwise between the client computing device(s) 102 and the secondary storage computing device(s) 106), e.g., at the direction of and under the management of the storage manager 140. Control information can generally include parameters and instructions for carrying out information management operations, such as, without limitation, instructions to perform a task associated with an operation, timing information specifying when to initiate a task associated with an operation, data path information specifying what components to communicate with or access in carrying out an operation, and the like. Payload data, on the other hand, can include the actual data involved in the storage operation, such as content data written to a secondary storage device 108 in a secondary copy operation. Payload metadata can include any of the types of metadata described herein, and may be written to a storage device along with the payload content data (e.g., in the form of a header).

In other embodiments, some information management operations are controlled by other components in the information management system 100 (e.g., the media agent(s) 144 or data agent(s) 142), instead of or in combination with the storage manager 140.

According to certain embodiments, the storage manager 140 provides one or more of the following functions:
  initiating execution of secondary copy operations;
  managing secondary storage devices 108 and inventory/capacity of the same;
  reporting, searching, and/or classification of data in the information management system 100;
  allocating secondary storage devices 108 for secondary storage operations;
  monitoring completion of and providing status reporting related to secondary storage operations;
  tracking age information relating to secondary copies 116, secondary storage devices 108, and comparing the age information against retention guidelines;
  tracking movement of data within the information management system 100;
  tracking logical associations between components in the information management system 100;
  protecting metadata associated with the information management system 100; and
  implementing operations management functionality.

The storage manager 140 may maintain a database 146 (or "storage manager database 146" or "management database 146") of management-related data and information management policies 148. The database 146 may include a management index 150 (or "index 150") or other data structure that stores logical associations between components of the system, user preferences and/or profiles (e.g., preferences regarding encryption, compression, or deduplication of primary or secondary copy data, preferences regarding the scheduling, type, or other aspects of primary or secondary copy or other operations, mappings of particular information management users or user accounts to certain computing devices or other components, etc.), management tasks, media containerization, or other useful data. For example, the storage manager 140 may use the index 150 to track logical associations between media agents 144 and secondary storage devices 108 and/or movement of data from primary storage devices 104 to secondary storage devices 108. For instance, the index 150 may store data associating a client computing device 102 with a particular media agent 144 and/or secondary storage device 108, as specified in an information management policy 148 (e.g., a storage policy, which is defined in more detail below).

Administrators and other people may be able to configure and initiate certain information management operations on an individual basis. But while this may be acceptable for some recovery operations or other relatively less frequent tasks, it is often not workable for implementing on-going organization-wide data protection and management. Thus, the information management system 100 may utilize information management policies 148 for specifying and executing information management operations (e.g., on an automated basis). Generally, an information management policy 148 can include a data structure or other information source that specifies a set of parameters (e.g., criteria and rules) associated with storage or other information management operations.

The storage manager database 146 may maintain the information management policies 148 and associated data, although the information management policies 148 can be stored in any appropriate location. For instance, an information management policy 148 such as a storage policy may be stored as metadata in a media agent database 152 or in a secondary storage device 108 (e.g., as an archive copy) for use in restore operations or other information management operations, depending on the embodiment. Information management policies 148 are described further below.

According to certain embodiments, the storage manager database 146 comprises a relational database (e.g., an SQL database) for tracking metadata, such as metadata associated with secondary copy operations (e.g., what client computing devices 102 and corresponding data were protected). This and other metadata may additionally be stored in other locations, such as at the secondary storage computing devices 106 or on the secondary storage devices 108, allowing data recovery without the use of the storage manager 140 in some cases.

As shown, the storage manager 140 may include a jobs agent 156, a user interface 158, and a management agent 154, all of which may be implemented as interconnected software modules or application programs.

The jobs agent 156 in some embodiments initiates, controls, and/or monitors the status of some or all storage or other information management operations previously performed, currently being performed, or scheduled to be performed by the information management system 100. For instance, the jobs agent 156 may access information management policies 148 to determine when and how to initiate and control secondary copy and other information management operations, as will be discussed further.

The user interface 158 may include information processing and display software, such as a graphical user interface ("GUI"), an application program interface ("API"), or other interactive interface(s) through which users and system processes can retrieve information about the status of information management operations (e.g., storage operations) or issue instructions to the information management system 100 and its constituent components. Via the user interface 158, users may optionally issue instructions to the components in the information management system 100 regarding performance of storage and recovery operations. For example, a user may modify a schedule concerning the number of pending secondary copy operations. As another example, a user may employ the GUI to view the status of pending storage operations or to monitor the status of certain components in the information management system 100 (e.g., the amount of capacity left in a storage device).

An "information management cell" (or "storage operation cell" or "cell") may generally include a logical and/or physical grouping of a combination of hardware and software components associated with performing information management operations on electronic data, typically one storage manager 140 and at least one client computing device 102 (comprising data agent(s) 142) and at least one media agent 144. For instance, the components shown in FIG. 1C may together form an information management cell. Multiple cells may be organized hierarchically. With this configuration, cells may inherit properties from hierarchically superior cells or be controlled by other cells in the hierarchy (automatically or otherwise). Alternatively, in some embodiments, cells may inherit or otherwise be associated with information management policies, preferences, information management metrics, or other properties or characteristics according to their relative position in a hierarchy of cells. Cells may also be delineated and/or organized hierarchically according to function, geography, architectural considerations, or other factors useful or desirable in performing information management operations. A first cell may represent a geographic segment of an enterprise, such as a Chicago office, and a second cell may represent a different geographic segment, such as a New York office. Other cells may represent departments within a particular office. Where delineated by function, a first cell may perform one or more first types of information management operations (e.g., one or more first types of secondary or other copies), and a second cell may perform one or more second types of information management operations (e.g., one or more second types of secondary or other copies).

The storage manager 140 may also track information that permits it to select, designate, or otherwise identify content indices, deduplication databases, or similar databases or resources or data sets within its information management cell (or another cell) to be searched in response to certain queries. Such queries may be entered by the user via interaction with the user interface 158. In general, the management agent 154 allows multiple information management cells to communicate with one another. For example, the information management system 100 in some cases may be one information management cell of a network of multiple cells adjacent to one another or otherwise logically related in a WAN or LAN. With this arrangement, the cells may be connected to one another through respective management agents 154.

For instance, the management agent 154 can provide the storage manager 140 with the ability to communicate with other components within the information management system 100 (and/or other cells within a larger information management system) via network protocols and application programming interfaces ("APIs") including, e.g., HTTP, HTTPS, FTP, REST, virtualization software APIs, cloud service provider APIs, and hosted service provider APIs. Inter-cell communication and hierarchy is described in greater detail in e.g., U.S. Pat. Nos. 7,747,579 and 7,343,453, which are incorporated by reference herein.

Data Agents

As discussed, a variety of different types of applications 110 can operate on a given client computing device 102, including operating systems, database applications, e-mail applications, and virtual machines, just to name a few. And, as part of the process of creating and restoring secondary copies 116, the client computing devices 102 may be tasked with processing and preparing the primary data 112 from these various different applications 110. Moreover, the nature of the processing/preparation can differ across clients and application types, e.g., due to inherent structural and formatting differences among applications 110.

The one or more data agent(s) 142 are therefore advantageously configured in some embodiments to assist in the performance of information management operations based on the type of data that is being protected, at a client-specific and/or application-specific level.

The data agent 142 may be a software module or component that is generally responsible for managing, initiating, or otherwise assisting in the performance of information management operations in information management system 100, generally as directed by storage manager 140. For instance, the data agent 142 may take part in performing data storage operations such as the copying, archiving, migrating, and/or replicating of primary data 112 stored in the primary storage device(s) 104. The data agent 142 may receive control information from the storage manager 140, such as commands to transfer copies of data objects, metadata, and other payload data to the media agents 144.

In some embodiments, a data agent 142 may be distributed between the client computing device 102 and storage manager 140 (and any other intermediate components) or may be deployed from a remote location or its functions approximated by a remote process that performs some or all of the functions of data agent 142. In addition, a data agent 142 may perform some functions provided by a media agent 144, or may perform other functions such as encryption and deduplication.

As indicated, each data agent 142 may be specialized for a particular application 110, and the system can employ multiple application-specific data agents 142, each of which may perform information management operations (e.g., perform backup, migration, and data recovery) associated with a different application 110. For instance, different individual data agents 142 may be designed to handle Microsoft Exchange data, Lotus Notes data, Microsoft Windows file system data, Microsoft Active Directory Objects data, SQL Server data, SharePoint data, Oracle database data, SAP database data, virtual machines and/or associated data, and other types of data.

A file system data agent, for example, may handle data files and/or other file system information. If a client computing device 102 has two or more types of data, a specialized data agent 142 may be used for each data type to copy, archive, migrate, and restore the client computing device 102 data. For example, to backup, migrate, and/or restore all of the data on a Microsoft Exchange server, the client computing device 102 may use a Microsoft Exchange Mailbox data agent 142 to back up the Exchange mailboxes, a Microsoft Exchange Database data agent 142 to back up the Exchange databases, a Microsoft Exchange Public Folder data agent 142 to back up the Exchange Public Folders, and a Microsoft Windows File System data agent 142 to back up the file system of the client computing device 102. In such embodiments, these specialized data agents 142 may be treated as four separate data agents 142 even though they operate on the same client computing device 102.

Other embodiments may employ one or more generic data agents 142 that can handle and process data from two or more different applications 110, or that can handle and process multiple data types, instead of or in addition to using specialized data agents 142. For example, one generic data agent 142 may be used to back up, migrate and restore Microsoft Exchange Mailbox data and Microsoft Exchange Database data while another generic data agent may handle Microsoft Exchange Public Folder data and Microsoft Windows File System data.

Each data agent 142 may be configured to access data and/or metadata stored in the primary storage device(s) 104 associated with the data agent 142 and process the data as appropriate. For example, during a secondary copy operation, the data agent 142 may arrange or assemble the data and metadata into one or more files having a certain format (e.g., a particular backup or archive format) before transferring the file(s) to a media agent 144 or other component. The file(s) may include a list of files or other metadata. Each data agent 142 can also assist in restoring data or metadata to primary storage devices 104 from a secondary copy 116. For instance, the data agent 142 may operate in conjunction with the storage manager 140 and one or more of the media agents 144 to restore data from secondary storage device(s) 108.

Media Agents

As indicated above with respect to FIG. 1A, off-loading certain responsibilities from the client computing devices 102 to intermediate components such as the media agent(s) 144 can provide a number of benefits including improved client computing device 102 operation, faster secondary copy operation performance, and enhanced scalability. In one specific example which will be discussed below in further detail, the media agent 144 can act as a local cache of copied data and/or metadata that it has stored to the secondary storage device(s) 108, providing improved restore capabilities.

Generally speaking, a media agent 144 may be implemented as a software module that manages, coordinates, and facilitates the transmission of data, as directed by the storage manager 140, between a client computing device 102 and one or more secondary storage devices 108. Whereas the storage manager 140 controls the operation of the information management system 100, the media agent 144 generally provides a portal to secondary storage devices 108. For instance, other components in the system interact with the media agents 144 to gain access to data stored on the secondary storage devices 108, whether it be for the purposes of reading, writing, modifying, or deleting data. Moreover, as will be described further, media agents 144 can generate and store information relating to characteristics of the stored data and/or metadata, or can generate and store other types of information that generally provides insight into the contents of the secondary storage devices 108.

Media agents 144 can comprise separate nodes in the information management system 100 (e.g., nodes that are separate from the client computing devices 102, storage manager 140, and/or secondary storage devices 108). In general, a node within the information management system 100 can be a logically and/or physically separate component, and in some cases is a component that is individually addressable or otherwise identifiable. In addition, each media agent 144 may operate on a dedicated secondary storage computing device 106 in some cases, while in other embodiments a plurality of media agents 144 operate on the same secondary storage computing device 106.

A media agent 144 (and corresponding media agent database 152) may be considered to be "associated with" a particular secondary storage device 108 if that media agent 144 is capable of one or more of: routing and/or storing data to the particular secondary storage device 108, coordinating the routing and/or storing of data to the particular secondary storage device 108, retrieving data from the particular secondary storage device 108, coordinating the retrieval of data from a particular secondary storage device 108, and modifying and/or deleting data retrieved from the particular secondary storage device 108.

While media agent(s) 144 are generally associated with one or more secondary storage devices 108, one or more media agents 144 in certain embodiments are physically separate from the secondary storage devices 108. For instance, the media agents 144 may operate on secondary storage computing devices 106 having different housings or packages than the secondary storage devices 108. In one example, a media agent 144 operates on a first server computer and is in communication with a secondary storage device(s) 108 operating in a separate, rack-mounted RAID-based system.

Where the information management system 100 includes multiple media agents 144 (see, e.g., FIG. 1D), a first media agent 144 may provide failover functionality for a second, failed media agent 144. In addition, media agents 144 can be dynamically selected for storage operations to provide load balancing. Failover and load balancing are described in greater detail below.

In operation, a media agent 144 associated with a particular secondary storage device 108 may instruct the secondary storage device 108 to perform an information management operation. For instance, a media agent 144 may instruct a tape library to use a robotic arm or other retrieval means to load or eject a certain storage media, and to subsequently archive, migrate, or retrieve data to or from that media, e.g., for the purpose of restoring the data to a client computing device 102. As another example, a secondary storage device 108 may include an array of hard disk drives or solid state drives organized in a RAID configuration, and the media agent 144 may forward a logical unit number (LUN) and other appropriate information to the array, which uses the received information to execute the desired storage operation. The media agent 144 may communicate with a secondary storage device 108 via a suitable communications link, such as a SCSI or Fiber Channel link.

As shown, each media agent 144 may maintain an associated media agent database 152. The media agent database 152 may be stored in a disk or other storage device (not shown) that is local to the secondary storage computing device 106 on which the media agent 144 operates. In other cases, the media agent database 152 is stored remotely from the secondary storage computing device 106.

The media agent database 152 can include, among other things, an index 153 (see, e.g., FIG. 1C), which comprises information generated during secondary copy operations and other storage or information management operations. The index 153 provides a media agent 144 or other component with a fast and efficient mechanism for locating secondary copies 116 or other data stored in the secondary storage devices 108. In some cases, the index 153 does not form a part of and is instead separate from the media agent database 152.

A media agent index 153 or other data structure associated with the particular media agent 144 may include information about the stored data. For instance, for each secondary copy 116, the index 153 may include metadata such as a list of the data objects (e.g., files/subdirectories, database objects, mailbox objects, etc.), a path to the secondary copy 116 on the corresponding secondary storage device 108, location information indicating where the data objects are stored in the secondary storage device 108, when the data objects were created or modified, etc. Thus, the index 153 includes metadata associated with the secondary copies 116 that is readily available for use without having to be first retrieved from the secondary storage device 108. In yet further embodiments, some or all of the information in index 153 may instead or additionally be stored along with the secondary copies of data in a secondary storage device 108. In some embodiments, the secondary storage devices 108 can include sufficient information to perform a "bare metal restore", where the operating system of a failed client computing device 102 or other restore target is automatically rebuilt as part of a restore operation.

Because the index 153 maintained in the media agent database 152 may operate as a cache, it can also be referred to as "an index cache." In such cases, information stored in the index cache 153 typically comprises data that reflects certain particulars about storage operations that have occurred relatively recently. After some triggering event, such as after a certain period of time elapses, or the index cache 153 reaches a particular size, the index cache 153 may be copied or migrated to a secondary storage device(s) 108. This information may need to be retrieved and uploaded back into the index cache 153 or otherwise restored to a media agent 144 to facilitate retrieval of data from the secondary storage device(s) 108. In some embodiments, the cached information may include format or containerization information related to archives or other files stored on the storage device(s) 108. In this manner, the index cache 153 allows for accelerated restores.

In some alternative embodiments the media agent 144 generally acts as a coordinator or facilitator of storage operations between client computing devices 102 and corresponding secondary storage devices 108, but does not actually write the data to the secondary storage device 108. For instance, the storage manager 140 (or the media agent 144) may instruct a client computing device 102 and secondary storage device 108 to communicate with one another directly. In such a case the client computing device 102 transmits the data directly or via one or more intermediary components to the secondary storage device 108 according to the received instructions, and vice versa. In some such cases, the media agent 144 may still receive, process, and/or maintain metadata related to the storage operations. Moreover, in these embodiments, the payload data can flow through the media agent 144 for the purposes of populating the index cache 153 maintained in the media agent database 152, but not for writing to the secondary storage device 108.

The media agent 144 and/or other components such as the storage manager 140 may in some cases incorporate additional functionality, such as data classification, content indexing, deduplication, encryption, compression, and the like. Further details regarding these and other functions are described below.

Distributed, Scalable Architecture

As described, certain functions of the information management system 100 can be distributed amongst various physical and/or logical components in the system. For instance, one or more of the storage manager 140, data agents 142, and media agents 144 may operate on computing devices that are physically separate from one another. This architecture can provide a number of benefits.

For instance, hardware and software design choices for each distributed component can be targeted to suit its particular function. The secondary computing devices 106 on which the media agents 144 operate can be tailored for interaction with associated secondary storage devices 108 and provide fast index cache operation, among other specific tasks. Similarly, the client computing device(s) 102 can be selected to effectively service the applications 110 thereon, in order to efficiently produce and store primary data 112.

Moreover, in some cases, one or more of the individual components in the information management system 100 can be distributed to multiple, separate computing devices. As one example, for large file systems where the amount of data stored in the management database 146 is relatively large, the database 146 may be migrated to or otherwise reside on a specialized database server (e.g., an SQL server) separate from a server that implements the other functions of the storage manager 140. This distributed configuration can provide added protection because the database 146 can be protected with standard database utilities (e.g., SQL log shipping or database replication) independent from other functions of the storage manager 140. The database 146 can be efficiently replicated to a remote site for use in the event of a disaster or other data loss at the primary site. Or the database 146 can be replicated to another computing device within the same site, such as to a higher performance machine in the event that a storage manager host device can no longer service the needs of a growing information management system 100.

Figure 1D:
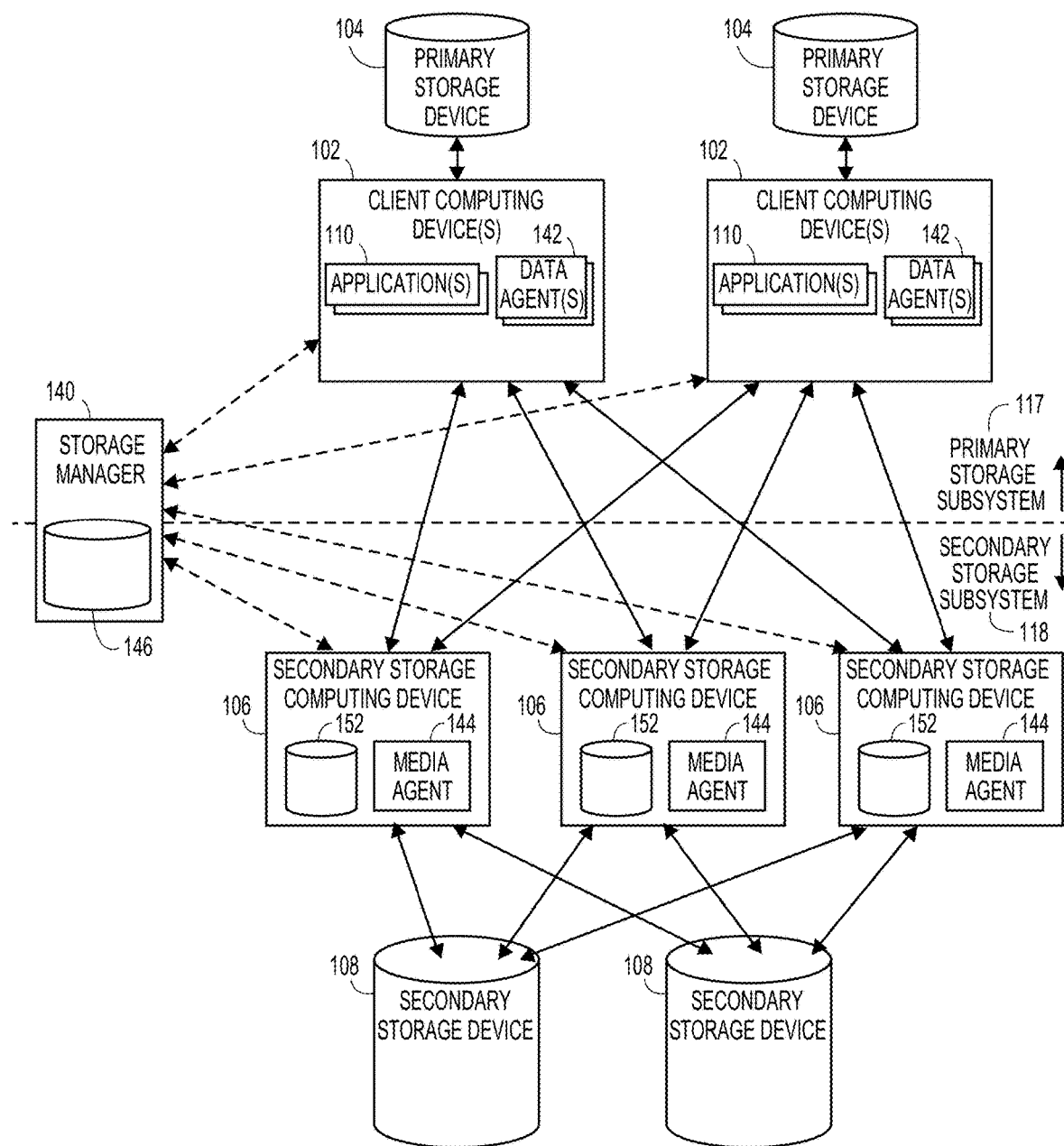
FIG. 1D is a block diagram illustrating a scalable information management system.

The distributed architecture also provides both scalability and efficient component utilization. FIG. 1D shows an embodiment of the information management system 100 including a plurality of client computing devices 102 and associated data agents 142 as well as a plurality of secondary storage computing devices 106 and associated media agents 144.

Additional components can be added or subtracted based on the evolving needs of the information management system 100. For instance, depending on where bottlenecks are identified, administrators can add additional client computing devices 102, secondary storage computing devices 106 (and corresponding media agents 144), and/or secondary storage devices 108. Moreover, where multiple fungible components are available, load balancing can be implemented to dynamically address identified bottlenecks. As an example, the storage manager 140 may dynamically select which media agents 144 and/or secondary storage devices 108 to use for storage operations based on a processing load analysis of the media agents 144 and/or secondary storage devices 108, respectively.

Moreover, each client computing device 102 in some embodiments can communicate with, among other components, any of the media agents 144, e.g., as directed by the storage manager 140. And each media agent 144 may be able to communicate with, among other components, any of the secondary storage devices 108, e.g., as directed by the storage manager 140. Thus, operations can be routed to the secondary storage devices 108 in a dynamic and highly flexible manner, to provide load balancing, failover, and the like. Further examples of scalable systems capable of dynamic storage operations, and of systems capable of performing load balancing and fail over are provided in U.S. Pat. No. 7,246,207, which is incorporated by reference herein.

In alternative configurations, certain components are not distributed and may instead reside and execute on the same computing device. For example, in some embodiments, one or more data agents 142 and the storage manager 140 operate on the same client computing device 102. In another embodiment, one or more data agents 142 and one or more media agents 144 operate on a single computing device.

Exemplary Types of Information Management Operations

In order to protect and leverage stored data, the information management system 100 can be configured to perform a variety of information management operations. As will be described, these operations can generally include secondary copy and other data movement operations, processing and data manipulation operations, analysis, reporting, and management operations. The operations described herein may be performed on any type of computing device, e.g., between two computers connected via a LAN, to a mobile client telecommunications device connected to a server via a WLAN, to any manner of client computing device coupled to a cloud storage target, etc., without limitation.

Data Movement Operations

Data movement operations according to certain embodiments are generally operations that involve the copying or migration of data (e.g., payload data) between different locations in the information management system 100 in an original/native and/or one or more different formats. For example, data movement operations can include operations in which stored data is copied, migrated, or otherwise transferred from one or more first storage devices to one or more second storage devices, such as from primary storage device(s) 104 to secondary storage device(s) 108, from secondary storage device(s) 108 to different secondary storage device(s) 108, from secondary storage devices 108 to primary storage devices 104, or from primary storage device(s) 104 to different primary storage device(s) 104.

Data movement operations can include by way of example, backup operations, archive operations, information lifecycle management operations such as hierarchical storage management operations, replication operations (e.g., continuous data replication operations), snapshot operations, deduplication or single-instancing operations, auxiliary copy operations, and the like. As will be discussed, some of these operations involve the copying, migration or other movement of data, without actually creating multiple, distinct copies. Nonetheless, some or all of these operations are referred to as "copy" operations for simplicity.

Backup Operations

A backup operation creates a copy of a version of data (e.g., one or more files or other data units) in primary data 112 at a particular point in time. Each subsequent backup copy may be maintained independently of the first. Further, a backup copy in some embodiments is generally stored in a form that is different than the native format, e.g., a backup format. This can be in contrast to the version in primary data 112 from which the backup copy is derived, and which may instead be stored in a native format of the source application(s) 110. In various cases, backup copies can be stored in a format in which the data is compressed, encrypted, deduplicated, and/or otherwise modified from the original application format. For example, a backup copy may be stored in a backup format that facilitates compression and/or efficient long-term storage.

Backup copies can have relatively long retention periods as compared to primary data 112, and may be stored on media with slower retrieval times than primary data 112 and certain other types of secondary copies 116. On the other hand, backups may have relatively shorter retention periods than some other types of secondary copies 116, such as archive copies (described below). Backups may sometimes be stored at an offsite location.

Backup operations can include full backups, differential backups, incremental backups, "synthetic full" backups, and/or creating a "reference copy." A full backup (or "standard full backup") in some embodiments is generally a complete image of the data to be protected. However, because full backup copies can consume a relatively large amount of storage, it can be useful to use a full backup copy as a baseline and only store changes relative to the full backup copy for subsequent backup copies.

For instance, a differential backup operation (or cumulative incremental backup operation) tracks and stores changes that have occurred since the last full backup. Differential backups can grow quickly in size, but can provide relatively efficient restore times because a restore can be completed in some cases using only the full backup copy and the latest differential copy.

An incremental backup operation generally tracks and stores changes since the most recent backup copy of any type, which can greatly reduce storage utilization. In some cases, however, restore times can be relatively long in comparison to full or differential backups because completing a restore operation may involve accessing a full backup in addition to multiple incremental backups.

Synthetic full backups generally consolidate data without directly backing up data from the client computing device. A synthetic full backup is created from the most recent full backup (i.e., standard or synthetic) and subsequent incremental and/or differential backups. The resulting synthetic full backup is identical to what would have been created had the last backup for the subclient been a standard full backup. Unlike standard full, incremental, and differential backups, a synthetic full backup does not actually transfer data from a client computer to the backup media, because it operates as a backup consolidator. A synthetic full backup extracts the index data of each participating subclient. Using this index data and the previously backed up user data images, it builds new full backup images, one for each subclient. The new backup images consolidate the index and user data stored in the related incremental, differential, and previous full backups, in some embodiments creating an archive file at the subclient level.

Any of the above types of backup operations can be at the volume-level, file-level, or block-level. Volume level backup operations generally involve the copying of a data volume (e.g., a logical disk or partition) as a whole. In a file-level backup, the information management system 100 may generally track changes to individual files, and includes copies of files in the backup copy. In the case of a block-level backup, files are broken into constituent blocks, and changes are tracked at the block-level. Upon restore, the information management system 100 reassembles the blocks into files in a transparent fashion.

Far less data may actually be transferred and copied to the secondary storage devices 108 during a file-level copy than a volume-level copy. Likewise, a block-level copy may involve the transfer of less data than a file-level copy, resulting in faster execution times. However, restoring a relatively higher-granularity copy can result in longer restore times. For instance, when restoring a block-level copy, the process of locating constituent blocks can sometimes result in longer restore times as compared to file-level backups. Similar to backup operations, the other types of secondary copy operations described herein can also be implemented at either the volume-level, file-level, or block-level.

For example, in some embodiments, a reference copy may comprise copy(ies) of selected objects from backed up data, typically to help organize data by keeping contextual information from multiple sources together, and/or help retain specific data for a longer period of time, such as for legal hold needs. A reference copy generally maintains data integrity, and when the data is restored, it may be viewed in the same format as the source data. In some embodiments, a reference copy is based on a specialized client, individual subclient and associated information management policies (e.g., storage policy, retention policy, etc.) that are administered within information management system 100.

Archive Operations

Because backup operations generally involve maintaining a version of the copied data in primary data 112 and also maintaining backup copies in secondary storage device(s) 108, they can consume significant storage capacity. To help reduce storage consumption, an archive operation according to certain embodiments creates a secondary copy 116 by both copying and removing source data. Or, seen another way, archive operations can involve moving some or all of the source data to the archive destination. Thus, data satisfying criteria for removal (e.g., data of a threshold age or size) may be removed from source storage. The source data may be primary data 112 or a secondary copy 116, depending on the situation. As with backup copies, archive copies can be stored in a format in which the data is compressed, encrypted, deduplicated, and/or otherwise modified from the format of the original application or source copy. In addition, archive copies may be retained for relatively long periods of time (e.g., years) and, in some cases, are never deleted. Archive copies are generally retained for longer periods of time than backup copies, for example. In certain embodiments, archive copies may be made and kept for extended periods in order to meet compliance regulations.

Moreover, when primary data 112 is archived, in some cases the corresponding primary data 112 or a portion thereof is deleted when creating the archive copy. Thus, archiving can serve the purpose of freeing up space in the primary storage device(s) 104 and easing the demand on computational resources on client computing device 102. Similarly, when a secondary copy 116 is archived, the secondary copy 116 may be deleted, and an archive copy can therefore serve the purpose of freeing up space in secondary storage device(s) 108. In contrast, source copies often remain intact when creating backup copies. Examples of compatible data archiving operations are provided in U.S. Pat. No. 7,107,298, which is incorporated by reference herein.

Snapshot Operations

Snapshot operations can provide a relatively lightweight, efficient mechanism for protecting data. From an end-user viewpoint, a snapshot may be thought of as an "instant" image of the primary data 112 at a given point in time, and may include state and/or status information relative to an application that creates/manages the primary data 112. In one embodiment, a snapshot may generally capture the directory structure of an object in primary data 112 such as a file or volume or other data set at a particular moment in time and may also preserve file attributes and contents. A snapshot in some cases is created relatively quickly, e.g., substantially instantly, using a minimum amount of file space, but may still function as a conventional file system backup.

A "hardware snapshot" (or "hardware-based snapshot") operation can be a snapshot operation where a target storage device (e.g., a primary storage device 104 or a secondary storage device 108) performs the snapshot operation in a self-contained fashion, substantially independently, using hardware, firmware and/or software operating on the storage device itself. For instance, the storage device may be capable of performing snapshot operations upon request, generally without intervention or oversight from any of the other components in the information management system 100. In this manner, hardware snapshots can off-load other components of information management system 100 from processing involved in snapshot creation and management.

A "software snapshot" (or "software-based snapshot") operation, on the other hand, can be a snapshot operation in which one or more other components in information management system 100 (e.g., client computing devices 102, data agents 142, etc.) implement a software layer that manages the snapshot operation via interaction with the target storage device. For instance, the component executing the snapshot management software layer may derive a set of pointers and/or data that represents the snapshot. The snapshot management software layer may then transmit the same to the target storage device, along with appropriate instructions for writing the snapshot.

Some types of snapshots do not actually create another physical copy of all the data as it existed at the particular point in time, but may simply create pointers that are able to map files and directories to specific memory locations (e.g., to specific disk blocks) where the data resides, as it existed at the particular point in time. For example, a snapshot copy may include a set of pointers derived from the file system or from an application. In some other cases, the snapshot may be created at the block-level, such that creation of the snapshot occurs without awareness of the file system. Each pointer points to a respective stored data block, so that collectively, the set of pointers reflect the storage location and state of the data object (e.g., file(s) or volume(s) or data set(s)) at a particular point in time when the snapshot copy was created.

An initial snapshot may use only a small amount of disk space needed to record a mapping or other data structure representing or otherwise tracking the blocks that correspond to the current state of the file system. Additional disk space is usually required only when files and directories are modified later on. Furthermore, when files are modified, typically only the pointers which map to blocks are copied, not the blocks themselves. In some embodiments, for example in the case of "copy-on-write" snapshots, when a block changes in primary storage, the block is copied to secondary storage or cached in primary storage before the block is overwritten in primary storage, and the pointer to that block is changed to reflect the new location of that block. The snapshot mapping of file system data may also be updated to reflect the changed block(s) at that particular point in time. In some other cases, a snapshot includes a full physical copy of all or substantially all of the data represented by the snapshot. Further examples of snapshot operations are provided in U.S. Pat. No. 7,529,782, which is incorporated by reference herein.

A snapshot copy in many cases can be made quickly and without significantly impacting primary computing resources because large amounts of data need not be copied or moved. In some embodiments, a snapshot may exist as a virtual file system, parallel to the actual file system. Users in some cases gain read-only access to the record of files and directories of the snapshot. By electing to restore primary data 112 from a snapshot taken at a given point in time, users may also return the current file system to the state of the file system that existed when the snapshot was taken.

Replication Operations

Another type of secondary copy operation is a replication operation. Some types of secondary copies 116 are used to periodically capture images of primary data 112 at particular points in time (e.g., backups, archives, and snapshots). However, it can also be useful for recovery purposes to protect primary data 112 in a more continuous fashion, by replicating the primary data 112 substantially as changes occur. In some cases a replication copy can be a mirror copy, for instance, where changes made to primary data 112 are mirrored or substantially immediately copied to another location (e.g., to secondary storage device(s) 108). By copying each write operation to the replication copy, two storage systems are kept synchronized or substantially synchronized so that they are virtually identical at approximately the same time. Where entire disk volumes are mirrored, however, mirroring can require significant amount of storage space and utilizes a large amount of processing resources.

According to some embodiments storage operations are performed on replicated data that represents a recoverable state, or "known good state" of a particular application running on the source system. For instance, in certain embodiments, known good replication copies may be viewed as copies of primary data 112. This feature allows the system to directly access, copy, restore, backup or otherwise manipulate the replication copies as if the data were the "live" primary data 112. This can reduce access time, storage utilization, and impact on source applications 110, among other benefits. Based on known good state information, the information management system 100 can replicate sections of application data that represent a recoverable state rather than rote copying of blocks of data. Examples of compatible replication operations (e.g., continuous data replication) are provided in U.S. Pat. No. 7,617,262, which is incorporated by reference herein.

Deduplication/Single-Instancing Operations

Another type of data movement operation is deduplication or single-instance storage, which is useful to reduce the amount of non-primary data. For instance, some or all of the above-described secondary storage operations can involve deduplication in some fashion. New data is read, broken down into portions (e.g., sub-file level blocks, files, etc.) of a selected granularity, compared with blocks that are already in secondary storage, and only the new blocks are stored. Blocks that already exist are represented as pointers to the already stored data.

In order to streamline the comparison process, the information management system 100 may calculate and/or store signatures (e.g., hashes or cryptographically unique IDs) corresponding to the individual data blocks in a database and compare the signatures instead of comparing entire data blocks. In some cases, only a single instance of each element is stored, and deduplication operations may therefore be referred to interchangeably as "single-instancing" operations. Depending on the implementation, however, deduplication or single-instancing operations can store more than one instance of certain data blocks, but nonetheless significantly reduce data redundancy. Depending on the embodiment, deduplication blocks can be of fixed or variable length. Using variable length blocks can provide enhanced deduplication by responding to changes in the data stream, but can involve complex processing. In some cases, the information management system 100 utilizes a technique for dynamically aligning deduplication blocks (e.g., fixed-length blocks) based on changing content in the data stream, as described in U.S. Pat. No. 8,364,652, which is incorporated by reference herein.

The information management system 100 can perform deduplication in a variety of manners at a variety of locations in the information management system 100. For instance, in some embodiments, the information management system 100 implements "target-side" deduplication by deduplicating data (e.g., secondary copies 116) stored in the secondary storage devices 108. In some such cases, the media agents 144 are generally configured to manage the deduplication process. For instance, one or more of the media agents 144 maintain a corresponding deduplication database that stores deduplication information (e.g., datablock signatures). Examples of such a configuration are provided in U.S. Pat. Pub. No. 2012/0150826, which is incorporated by reference herein. Instead of or in combination with "target-side" deduplication, deduplication can also be performed on the "source-side" (or "client-side"), e.g., to reduce the amount of traffic between the media agents 144 and the client computing device(s) 102 and/or reduce redundant data stored in the primary storage devices 104. According to various implementations, one or more of the storage devices of the target-side and/or source-side of an operation can be cloud-based storage devices. Thus, the target-side and/or source-side deduplication can be cloud-based deduplication. In particular, as discussed previously, the storage manager 140 may communicate with other components within the information management system 100 via network protocols and cloud service provider APIs to facilitate cloud-based deduplication/single instancing. Examples of such deduplication techniques are provided in U.S. Pat. Pub. No. 2012/0150818, which is incorporated by reference herein. Some other compatible deduplication/single instancing techniques are described in U.S. Pat. Pub. Nos. 2006/0224846 and 2009/0319534, which are incorporated by reference herein.

Information Lifecycle Management and Hierarchical Storage Management Operations

In some embodiments, files and other data over their lifetime move from more expensive, quick access storage to less expensive, slower access storage. Operations associated with moving data through various tiers of storage are sometimes referred to as information lifecycle management (ILM) operations.

One type of ILM operation is a hierarchical storage management (HSM) operation. A HSM operation is generally an operation for automatically moving data between classes of storage devices, such as between high-cost and low-cost storage devices. For instance, an HSM operation may involve movement of data from primary storage devices 104 to secondary storage devices 108, or between tiers of secondary storage devices 108. With each tier, the storage devices may be progressively relatively cheaper, have relatively slower access/restore times, etc. For example, movement of data between tiers may occur as data becomes less important over time.

In some embodiments, an HSM operation is similar to an archive operation in that creating an HSM copy may (though not always) involve deleting some of the source data, e.g., according to one or more criteria related to the source data. For example, an HSM copy may include data from primary data 112 or a secondary copy 116 that is larger than a given size threshold or older than a given age threshold and that is stored in a backup format.

Often, and unlike some types of archive copies, HSM data that is removed or aged from the source is replaced by a logical reference pointer or stub. The reference pointer or stub can be stored in the primary storage device 104 (or other source storage device, such as a secondary storage device 108) to replace the deleted source data and to point to or otherwise indicate the new location in a secondary storage device 108.

According to one example, files are generally moved between higher and lower cost storage depending on how often the files are accessed. When a user requests access to the HSM data that has been removed or migrated, the information management system 100 uses the stub to locate the data and may make recovery of the data appear transparent, even though the HSM data may be stored at a location different from other source data. In this manner, the data appears to the user (e.g., in file system browsing windows and the like) as if it still resides in the source location (e.g., in a primary storage device 104). The stub may also include some metadata associated with the corresponding data, so that a file system and/or application can provide some information about the data object and/or a limited-functionality version (e.g., a preview) of the data object.

An HSM copy may be stored in a format other than the native application format (e.g., where the data is compressed, encrypted, deduplicated, and/or otherwise modified from the original native application format). In some cases, copies which involve the removal of data from source storage and the maintenance of stub or other logical reference information on source storage may be referred to generally as "on-line archive copies". On the other hand, copies which involve the removal of data from source storage without the maintenance of stub or other logical reference information on source storage may be referred to as "off-line archive copies". Examples of HSM and ILM techniques are provided in U.S. Pat. No. 7,343,453, which is incorporated by reference herein.

Auxiliary Copy and Disaster Recovery Operations

An auxiliary copy is generally a copy operation in which a copy is created of an existing secondary copy 116. For instance, an initial secondary copy 116 may be generated using or otherwise be derived from primary data 112 (or other data residing in the secondary storage subsystem 118), whereas an auxiliary copy is generated from the initial secondary copy 116. Auxiliary copies can be used to create additional standby copies of data and may reside on different secondary storage devices 108 than the initial secondary copies 116. Thus, auxiliary copies can be used for recovery purposes if initial secondary copies 116 become unavailable. Exemplary compatible auxiliary copy techniques are described in further detail in U.S. Pat. No. 8,230,195, which is incorporated by reference herein.

The information management system 100 may also perform disaster recovery operations that make or retain disaster recovery copies, often as secondary, high-availability disk copies. The information management system 100 may create secondary disk copies and store the copies at disaster recovery locations using auxiliary copy or replication operations, such as continuous data replication technologies. Depending on the particular data protection goals, disaster recovery locations can be remote from the client computing devices 102 and primary storage devices 104, remote from some or all of the secondary storage devices 108, or both.

Data Analysis, Reporting, and Management Operations

Data analysis, reporting, and management operations can be different than data movement operations in that they do not necessarily involve the copying, migration or other transfer of data (e.g., primary data 112 or secondary copies 116) between different locations in the system. For instance, data analysis operations may involve processing (e.g., offline processing) or modification of already stored primary data 112 and/or secondary copies 116. However, in some embodiments data analysis operations are performed in conjunction with data movement operations. Some data analysis operations include content indexing operations and classification operations which can be useful in leveraging the data under management to provide enhanced search and other features. Other data analysis operations such as compression and encryption can provide data reduction and security benefits, respectively.

Classification Operations/Content Indexing

In some embodiments, the information management system 100 analyzes and indexes characteristics, content, and metadata associated with the primary data 112 and/or secondary copies 116. The content indexing can be used to identify files or other data objects having pre-defined content (e.g., user-defined keywords or phrases, other keywords/phrases that are not defined by a user, etc.), and/or metadata (e.g., email metadata such as "to", "from", "cc", "bcc", attachment name, received time, etc.).

The information management system 100 generally organizes and catalogues the results in a content index, which may be stored within the media agent database 152, for example. The content index can also include the storage locations of (or pointer references to) the indexed data in the primary data 112 or secondary copies 116, as appropriate. The results may also be stored, in the form of a content index database or otherwise, elsewhere in the information management system 100 (e.g., in the primary storage devices 104, or in the secondary storage device 108). Such index data provides the storage manager 140 or another component with an efficient mechanism for locating primary data 112 and/or secondary copies 116 of data objects that match particular criteria.

For instance, search criteria can be specified by a user through user interface 158 of the storage manager 140. In some cases, the information management system 100 analyzes data and/or metadata in secondary copies 116 to create an "off-line" content index, without significantly impacting the performance of the client computing devices 102. Depending on the embodiment, the system can also implement "on-line" content indexing, e.g., of primary data 112. Examples of compatible content indexing techniques are provided in U.S. Pat. No. 8,170,995, which is incorporated by reference herein.

One or more components can be configured to scan data and/or associated metadata for classification purposes to populate a database (or other data structure) of information, which can be referred to as a "data classification database" or a "metabase". Depending on the embodiment, the data classification database(s) can be organized in a variety of different ways, including centralization, logical sub-divisions, and/or physical sub-divisions. For instance, one or more centralized data classification databases may be associated with different subsystems or tiers within the information management system 100. As an example, there may be a first centralized metabase associated with the primary storage subsystem 117 and a second centralized metabase associated with the secondary storage subsystem 118. In other cases, there may be one or more metabases associated with individual components, e.g., client computing devices 102 and/or media agents 144. In some embodiments, a data classification database (metabase) may reside as one or more data structures within management database 146, or may be otherwise associated with storage manager 140.

In some cases, the metabase(s) may be included in separate database(s) and/or on separate storage device(s) from primary data 112 and/or secondary copies 116, such that operations related to the metabase do not significantly impact performance on other components in the information management system 100. In other cases, the metabase(s) may be stored along with primary data 112 and/or secondary copies 116. Files or other data objects can be associated with identifiers (e.g., tag entries, etc.) in the media agent 144 (or other indices) to facilitate searches of stored data objects. Among a number of other benefits, the metabase can also allow efficient, automatic identification of files or other data objects to associate with secondary copy or other information management operations (e.g., in lieu of scanning an entire file system). Examples of compatible metabases and data classification operations are provided in U.S. Pat. Nos. 8,229,954 and 7,747,579, which are incorporated by reference herein.

Encryption Operations

The information management system 100 in some cases is configured to process data (e.g., files or other data objects, secondary copies 116, etc.), according to an appropriate encryption algorithm (e.g., Blowfish, Advanced Encryption Standard [AES], Triple Data Encryption Standard [3-DES], etc.) to limit access and provide data security in the information management system 100. The information management system 100 in some cases encrypts the data at the client level, such that the client computing devices 102 (e.g., the data agents 142) encrypt the data prior to forwarding the data to other components, e.g., before sending the data to media agents 144 during a secondary copy operation. In such cases, the client computing device 102 may maintain or have access to an encryption key or passphrase for decrypting the data upon restore. Encryption can also occur when creating copies of secondary copies, e.g., when creating auxiliary copies or archive copies. In yet further embodiments, the secondary storage devices 108 can implement built-in, high performance hardware encryption.

Management and Reporting Operations

Certain embodiments leverage the integrated, ubiquitous nature of the information management system 100 to provide useful system-wide management and reporting functions. Examples of some compatible management and reporting techniques are provided in U.S. Pat. No. 7,343,453, which is incorporated by reference herein.

Operations management can generally include monitoring and managing the health and performance of information management system 100 by, without limitation, performing error tracking, generating granular storage/performance metrics (e.g., job success/failure information, deduplication efficiency, etc.), generating storage modeling and costing information, and the like. As an example, a storage manager 140 or other component in the information management system 100 may analyze traffic patterns and suggest and/or automatically route data via a particular route to minimize congestion. In some embodiments, the system can generate predictions relating to storage operations or storage operation information. Such predictions, which may be based on a trending analysis, may predict various network operations or resource usage, such as network traffic levels, storage media use, use of bandwidth of communication links, use of media agent components, etc. Further examples of traffic analysis, trend analysis, prediction generation, and the like are described in U.S. Pat. No. 7,343,453, which is incorporated by reference herein.

In some configurations, a master storage manager 140 may track the status of storage operation cells in a hierarchy, such as the status of jobs, system components, system resources, and other items, by communicating with storage managers 140 (or other components) in the respective storage operation cells. Moreover, the master storage manager 140 may track the status of its associated storage operation cells and information management operations by receiving periodic status updates from the storage managers 140 (or other components) in the respective cells regarding jobs, system components, system resources, and other items. In some embodiments, a master storage manager 140 may store status information and other information regarding its associated storage operation cells and other system information in its index 150 (or other location).

The master storage manager 140 or other component may also determine whether certain storage-related criteria or other criteria are satisfied, and perform an action or trigger event (e.g., data migration) in response to the criteria being satisfied, such as where a storage threshold is met for a particular volume, or where inadequate protection exists for certain data. For instance, in some embodiments, data from one or more storage operation cells is used to dynamically and automatically mitigate recognized risks, and/or to advise users of risks or suggest actions to mitigate these risks. For example, an information management policy may specify certain requirements (e.g., that a storage device should maintain a certain amount of free space, that secondary copies should occur at a particular interval, that data should be aged and migrated to other storage after a particular period, that data on a secondary volume should always have a certain level of availability and be restorable within a given time period, that data on a secondary volume may be mirrored or otherwise migrated to a specified number of other volumes, etc.). If a risk condition or other criterion is triggered, the system may notify the user of these conditions and may suggest (or automatically implement) an action to mitigate or otherwise address the risk. For example, the system may indicate that data from a primary copy 112 should be migrated to a secondary storage device 108 to free space on the primary storage device 104. Examples of the use of risk factors and other triggering criteria are described in U.S. Pat. No. 7,343,453, which is incorporated by reference herein.

In some embodiments, the system 100 may also determine whether a metric or other indication satisfies particular storage criteria and, if so, perform an action. For example, as previously described, a storage policy or other definition might indicate that a storage manager 140 should initiate a particular action if a storage metric or other indication drops below or otherwise fails to satisfy specified criteria such as a threshold of data protection. Examples of such metrics are described in U.S. Pat. No. 7,343,453, which is incorporated by reference herein.

In some embodiments, risk factors may be quantified into certain measurable service or risk levels for ease of comprehension. For example, certain applications and associated data may be considered to be more important by an enterprise than other data and services. Financial compliance data, for example, may be of greater importance than marketing materials, etc. Network administrators may assign priority values or "weights" to certain data and/or applications, corresponding to the relative importance. The level of compliance of storage operations specified for these applications may also be assigned a certain value. Thus, the health, impact, and overall importance of a service may be determined, such as by measuring the compliance value and calculating the product of the priority value and the compliance value to determine the "service level" and comparing it to certain operational thresholds to determine whether it is acceptable. Further examples of the service level determination are provided in U.S. Pat. No. 7,343,453, which is incorporated by reference herein.

The system 100 may additionally calculate data costing and data availability associated with information management operation cells according to an embodiment of the invention. For instance, data received from the cell may be used in conjunction with hardware-related information and other information about system elements to determine the cost of storage and/or the availability of particular data in the system. Exemplary information generated could include how fast a particular department is using up available storage space, how long data would take to recover over a particular system pathway from a particular secondary storage device, costs over time, etc. Moreover, in some embodiments, such information may be used to determine or predict the overall cost associated with the storage of certain information. The cost associated with hosting a certain application may be based, at least in part, on the type of media on which the data resides, for example. Storage devices may be assigned to a particular cost categories, for example. Further examples of costing techniques are described in U.S. Pat. No. 7,343,453, which is incorporated by reference herein.

Any of the above types of information (e.g., information related to trending, predictions, job, cell or component status, risk, service level, costing, etc.) can generally be provided to users via the user interface 158 in a single, integrated view or console (not shown). The console may support a reporting capability that allows for the generation of a variety of reports, which may be tailored to a particular aspect of information management. Report types may include: scheduling, event management, media management and data aging. Available reports may also include backup history, data aging history, auxiliary copy history, job history, library and drive, media in library, restore history, and storage policy, etc., without limitation. Such reports may be specified and created at a certain point in time as a system analysis, forecasting, or provisioning tool. Integrated reports may also be generated that illustrate storage and performance metrics, risks and storage costing information. Moreover, users may create their own reports based on specific needs.

The integrated user interface 158 can include an option to show a "virtual view" of the system that graphically depicts the various components in the system using appropriate icons. As one example, the user interface 158 may provide a graphical depiction of one or more primary storage devices 104, the secondary storage devices 108, data agents 142 and/or media agents 144, and their relationship to one another in the information management system 100. The operations management functionality can facilitate planning and decision-making. For example, in some embodiments, a user may view the status of some or all jobs as well as the status of each component of the information management system 100. Users may then plan and make decisions based on this data. For instance, a user may view high-level information regarding storage operations for the information management system 100, such as job status, component status, resource status (e.g., communication pathways, etc.), and other information. The user may also drill down or use other means to obtain more detailed information regarding a particular component, job, or the like. Further examples of some reporting techniques and associated interfaces providing an integrated view of an information management system are provided in U.S. Pat. No. 7,343,453, which is incorporated by reference herein.

The information management system 100 can also be configured to perform system-wide e-discovery operations in some embodiments. In general, e-discovery operations provide a unified collection and search capability for data in the system, such as data stored in the secondary storage devices 108 (e.g., backups, archives, or other secondary copies 116). For example, the information management system 100 may construct and maintain a virtual repository for data stored in the information management system 100 that is integrated across source applications 110, different storage device types, etc. According to some embodiments, e-discovery utilizes other techniques described herein, such as data classification and/or content indexing.

Information Management Policies

As indicated previously, an information management policy 148 can include a data structure or other information source that specifies a set of parameters (e.g., criteria and rules) associated with secondary copy and/or other information management operations.

One type of information management policy 148 is a storage policy. According to certain embodiments, a storage policy generally comprises a data structure or other information source that defines (or includes information sufficient to determine) a set of preferences or other criteria for performing information management operations. Storage policies can include one or more of the following items: (1) what data will be associated with the storage policy; (2) a destination to which the data will be stored; (3) datapath information specifying how the data will be communicated to the destination; (4) the type of storage operation to be performed; and (5) retention information specifying how long the data will be retained at the destination (see, e.g., FIG. 1E).

As an illustrative example, data associated with a storage policy can be logically organized into groups. In some cases, these logical groupings can be referred to as "sub-clients". A sub-client may represent static or dynamic associations of portions of a data volume. Sub-clients may represent mutually exclusive portions. Thus, in certain embodiments, a portion of data may be given a label and the association is stored as a static entity in an index, database or other storage location. Sub-clients may also be used as an effective administrative scheme of organizing data according to data type, department within the enterprise, storage preferences, or the like. Depending on the configuration, sub-clients can correspond to files, folders, virtual machines, databases, etc. In one exemplary scenario, an administrator may find it preferable to separate e-mail data from financial data using two different sub-clients.

A storage policy can define where data is stored by specifying a target or destination storage device (or group of storage devices). For instance, where the secondary storage device 108 includes a group of disk libraries, the storage policy may specify a particular disk library for storing the sub-clients associated with the policy. As another example, where the secondary storage devices 108 include one or more tape libraries, the storage policy may specify a particular tape library for storing the sub-clients associated with the storage policy, and may also specify a drive pool and a tape pool defining a group of tape drives and a group of tapes, respectively, for use in storing the sub-client data. While information in the storage policy can be statically assigned in some cases, some or all of the information in the storage policy can also be dynamically determined based on criteria, which can be set forth in the storage policy. For instance, based on such criteria, a particular destination storage device(s) (or other parameter of the storage policy) may be determined based on characteristics associated with the data involved in a particular storage operation, device availability (e.g., availability of a secondary storage device 108 or a media agent 144), network status and conditions (e.g., identified bottlenecks), user credentials, and the like).

Datapath information can also be included in the storage policy. For instance, the storage policy may specify network pathways and components to utilize when moving the data to the destination storage device(s). In some embodiments, the storage policy specifies one or more media agents 144 for conveying data associated with the storage policy between the source (e.g., one or more host client computing devices 102) and destination (e.g., a particular target secondary storage device 108).

A storage policy can also specify the type(s) of operations associated with the storage policy, such as a backup, archive, snapshot, auxiliary copy, or the like. Retention information can specify how long the data will be kept, depending on organizational needs (e.g., a number of days, months, years, etc.)

Another type of information management policy 148 is a scheduling policy, which specifies when and how often to perform operations. Scheduling parameters may specify with what frequency (e.g., hourly, weekly, daily, event-based, etc.) or under what triggering conditions secondary copy or other information management operations will take place. Scheduling policies in some cases are associated with particular components, such as particular logical groupings of data associated with a storage policy (e.g., a sub-client), client computing device 102, and the like. In one configuration, a separate scheduling policy is maintained for particular logical groupings of data on a client computing device 102. The scheduling policy specifies that those logical groupings are to be moved to secondary storage devices 108 every hour according to storage policies associated with the respective sub-clients.

When adding a new client computing device 102, administrators can manually configure information management policies 148 and/or other settings, e.g., via the user interface 158. However, this can be an involved process resulting in delays, and it may be desirable to begin data protection operations quickly, without awaiting human intervention. Thus, in some embodiments, the information management system 100 automatically applies a default configuration to client computing device 102. As one example, when one or more data agent(s) 142 are installed on one or more client computing devices 102, the installation script may register the client computing device 102 with the storage manager 140, which in turn applies the default configuration to the new client computing device 102. In this manner, data protection operations can begin substantially immediately. The default configuration can include a default storage policy, for example, and can specify any appropriate information sufficient to begin data protection operations. This can include a type of data protection operation, scheduling information, a target secondary storage device 108, data path information (e.g., a particular media agent 144), and the like.

Other types of information management policies 148 are possible, including one or more audit (or security) policies. An audit policy is a set of preferences, rules and/or criteria that protect sensitive data in the information management system 100. For example, an audit policy may define "sensitive objects" as files or objects that contain particular keywords (e.g., "confidential," or "privileged") and/or are associated with particular keywords (e.g., in metadata) or particular flags (e.g., in metadata identifying a document or email as personal, confidential, etc.). An audit policy may further specify rules for handling sensitive objects. As an example, an audit policy may require that a reviewer approve the transfer of any sensitive objects to a cloud storage site, and that if approval is denied for a particular sensitive object, the sensitive object should be transferred to a local primary storage device 104 instead. To facilitate this approval, the audit policy may further specify how a secondary storage computing device 106 or other system component should notify a reviewer that a sensitive object is slated for transfer.

Another type of information management policy 148 is a provisioning policy. A provisioning policy can include a set of preferences, priorities, rules, and/or criteria that specify how client computing devices 102 (or groups thereof) may utilize system resources, such as available storage on cloud storage and/or network bandwidth. A provisioning policy specifies, for example, data quotas for particular client computing devices 102 (e.g., a number of gigabytes that can be stored monthly, quarterly or annually). The storage manager 140 or other components may enforce the provisioning policy. For instance, the media agents 144 may enforce the policy when transferring data to secondary storage devices 108. If a client computing device 102 exceeds a quota, a budget for the client computing device 102 (or associated department) is adjusted accordingly or an alert may trigger.

While the above types of information management policies 148 have been described as separate policies, one or more of these can be generally combined into a single information management policy 148. For instance, a storage policy may also include or otherwise be associated with one or more scheduling, audit, or provisioning policies or operational parameters thereof. Moreover, while storage policies are typically associated with moving and storing data, other policies may be associated with other types of information management operations. The following is a non-exhaustive list of items the information management policies 148 may specify:
- schedules or other timing information, e.g., specifying when and/or how often to perform information management operations;
- the type of copy 116 (e.g., type of secondary copy) and/or copy format (e.g., snapshot, backup, archive, HSM, etc.);
- a location or a class or quality of storage for storing secondary copies 116 (e.g., one or more particular secondary storage devices 108);
- preferences regarding whether and how to encrypt, compress, deduplicate, or otherwise modify or transform secondary copies 116;
- which system components and/or network pathways (e.g., preferred media agents 144) should be used to perform secondary storage operations;
- resource allocation among different computing devices or other system components used in performing information management operations (e.g., bandwidth allocation, available storage capacity, etc.);
- whether and how to synchronize or otherwise distribute files or other data objects across multiple computing devices or hosted services; and
- retention information specifying the length of time primary data 112 and/or secondary copies 116 should be retained, e.g., in a particular class or tier of storage devices, or within the information management system 100.

Policies can additionally specify or depend on a variety of historical or current criteria that may be used to determine which rules to apply to a particular data object, system component, or information management operation, such as:
- frequency with which primary data 112 or a secondary copy 116 of a data object or metadata has been or is predicted to be used, accessed, or modified;
- time-related factors (e.g., aging information such as time since the creation or modification of a data object);
- deduplication information (e.g., hashes, data blocks, deduplication block size, deduplication efficiency or other metrics);
- an estimated or historic usage or cost associated with different components (e.g., with secondary storage devices 108);
- the identity of users, applications 110, client computing devices 102 and/or other computing devices that created, accessed, modified, or otherwise utilized primary data 112 or secondary copies 116;
- a relative sensitivity (e.g., confidentiality, importance) of a data object, e.g., as determined by its content and/or metadata;
- the current or historical storage capacity of various storage devices;
- the current or historical network capacity of network pathways connecting various components within the storage operation cell;
- access control lists or other security information; and
- the content of a particular data object (e.g., its textual content) or of metadata associated with the data object.

Exemplary Storage Policy and Secondary Storage Operations

Figure 1E:
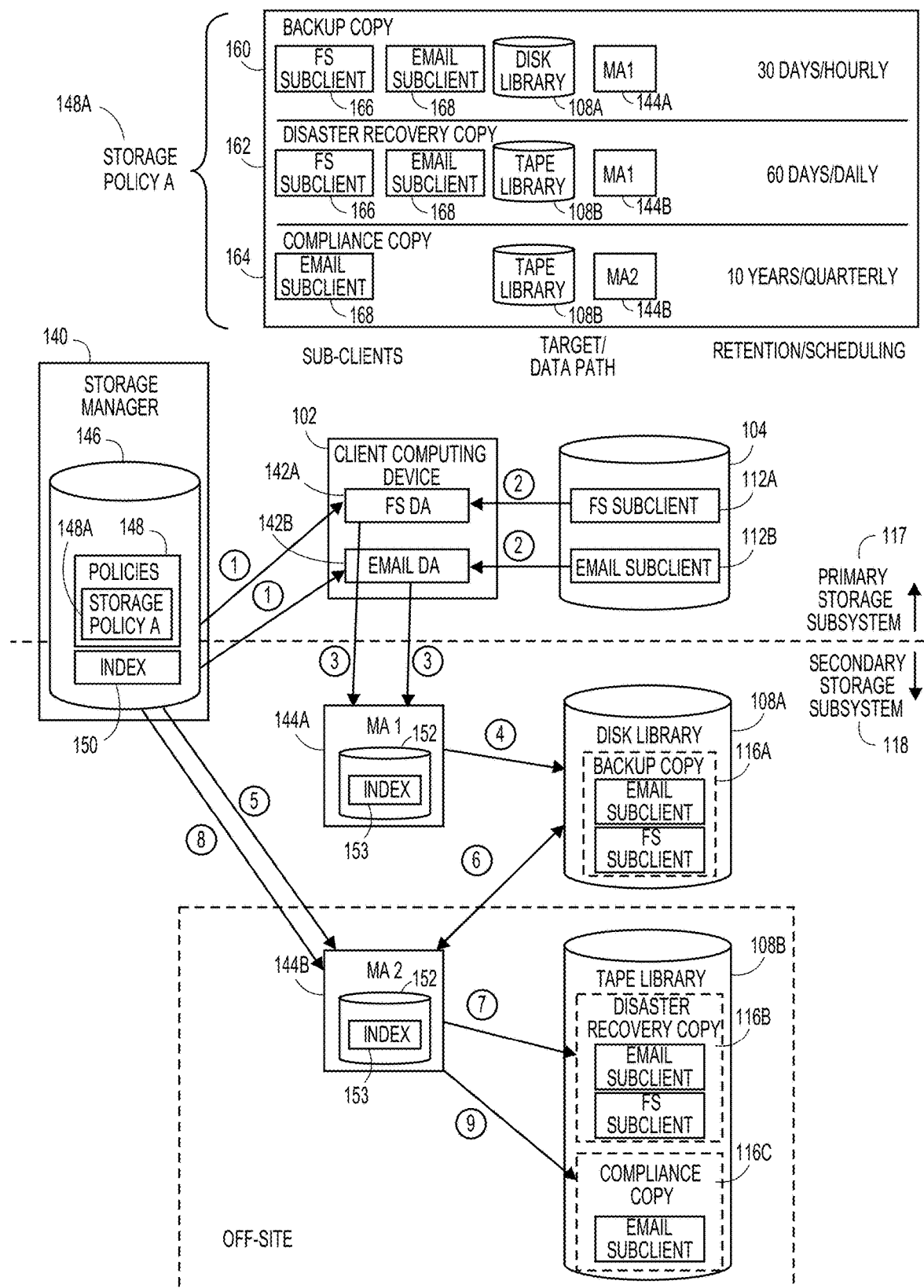
FIG. 1E illustrates certain secondary copy operations according to an exemplary storage policy.

FIG. 1E includes a data flow diagram depicting performance of storage operations by an embodiment of an information management system 100, according to an exemplary storage policy 148A. The information management system 100 includes a storage manger 140, a client computing device 102 having a file system data agent 142A and an email data agent 142B operating thereon, a primary storage device 104, two media agents 144A, 144B, and two secondary storage devices 108A, 108B: a disk library 108A and a tape library 108B. As shown, the primary storage device 104 includes primary data 112A, which is associated with a logical grouping of data associated with a file system, and primary data 112B, which is associated with a logical grouping of data associated with email. Although for simplicity the logical grouping of data associated with the file system is referred to as a file system sub-client, and the logical grouping of data associated with the email is referred to as an email sub-client, the techniques described with respect to FIG. 1E can be utilized in conjunction with data that is organized in a variety of other manners.

As indicated by the dashed box, the second media agent 144B and the tape library 108B are "off-site", and may therefore be remotely located from the other components in the information management system 100 (e.g., in a different city, office building, etc.). Indeed, "off-site" may refer to a magnetic tape located in storage, which must be manually retrieved and loaded into a tape drive to be read. In this manner, information stored on the tape library 108B may provide protection in the event of a disaster or other failure.

The file system sub-client and its associated primary data 112A in certain embodiments generally comprise information generated by the file system and/or operating system of the client computing device 102, and can include, for example, file system data (e.g., regular files, file tables, mount points, etc.), operating system data (e.g., registries, event logs, etc.), and the like. The e-mail sub-client, on the other hand, and its associated primary data 112B, include data generated by an e-mail application operating on the client computing device 102, and can include mailbox information, folder information, emails, attachments, associated database information, and the like. As described above, the sub-clients can be logical containers, and the data included in the corresponding primary data 112A, 112B may or may not be stored contiguously.

The exemplary storage policy 148A includes backup copy preferences (or rule set) 160, disaster recovery copy preferences rule set 162, and compliance copy preferences or rule set 164. The backup copy rule set 160 specifies that it is associated with a file system sub-client 166 and an email sub-client 168. Each of these sub-clients 166, 168 are associated with the particular client computing device 102. The backup copy rule set 160 further specifies that the backup operation will be written to the disk library 108A, and designates a particular media agent 144A to convey the data to the disk library 108A. Finally, the backup copy rule set 160 specifies that backup copies created according to the rule set 160 are scheduled to be generated on an hourly basis and to be retained for 30 days. In some other embodiments, scheduling information is not included in the storage policy 148A, and is instead specified by a separate scheduling policy.

The disaster recovery copy rule set 162 is associated with the same two sub-clients 166, 168. However, the disaster recovery copy rule set 162 is associated with the tape library 108B, unlike the backup copy rule set 160. Moreover, the disaster recovery copy rule set 162 specifies that a different media agent, namely 144B, will be used to convey the data to the tape library 108B. As indicated, disaster recovery copies created according to the rule set 162 will be retained for 60 days, and will be generated on a daily basis. Disaster recovery copies generated according to the disaster recovery copy rule set 162 can provide protection in the event of a disaster or other catastrophic data loss that would affect the backup copy 116A maintained on the disk library 108A.

The compliance copy rule set 164 is only associated with the email sub-client 168, and not the file system sub-client 166. Compliance copies generated according to the compliance copy rule set 164 will therefore not include primary data 112A from the file system sub-client 166. For instance, the organization may be under an obligation to store and maintain copies of email data for a particular period of time (e.g., 10 years) to comply with state or federal regulations, while similar regulations do not apply to the file system data. The compliance copy rule set 164 is associated with the same tape library 108B and media agent 144B as the disaster recovery copy rule set 162, although a different storage device or media agent could be used in other embodiments. Finally, the compliance copy rule set 164 specifies that copies generated under the compliance copy rule set 164 will be retained for 10 years, and will be generated on a quarterly basis.

At step 1, the storage manager 140 initiates a backup operation according to the backup copy rule set 160. For instance, a scheduling service running on the storage manager 140 accesses scheduling information from the backup copy rule set 160 or a separate scheduling policy associated with the client computing device 102, and initiates a backup copy operation on an hourly basis. Thus, at the scheduled time slot the storage manager 140 sends instructions to the client computing device 102 (i.e., to both data agent 142A and data agent 142B) to begin the backup operation.

At step 2, the file system data agent 142A and the email data agent 142B operating on the client computing device 102 respond to the instructions received from the storage manager 140 by accessing and processing the primary data 112A, 112B involved in the copy operation, which can be found in primary storage device 104. Because the operation is a backup copy operation, the data agent(s) 142A, 142B may format the data into a backup format or otherwise process the data.

At step 3, the client computing device 102 communicates the retrieved, processed data to the first media agent 144A, as directed by the storage manager 140, according to the backup copy rule set 160. In some other embodiments, the information management system 100 may implement a load-balancing, availability-based, or other appropriate algorithm to select from the available set of media agents 144A, 144B. Regardless of the manner the media agent 144A is selected, the storage manager 140 may further keep a record in the storage manager database 146 of the association between the selected media agent 144A and the client computing device 102 and/or between the selected media agent 144A and the backup copy 116A.

The target media agent 144A receives the data from the client computing device 102, and at step 4 conveys the data to the disk library 108A to create the backup copy 116A, again at the direction of the storage manager 140 and according to the backup copy rule set 160. The secondary storage device 108A can be selected in other ways. For instance, the media agent 144A may have a dedicated association with a particular secondary storage device(s), or the storage manager 140 or media agent 144A may select from a plurality of secondary storage devices, e.g., according to availability, using one of the techniques described in U.S. Pat. No. 7,246,207, which is incorporated by reference herein.

The media agent 144A can also update its index 153 to include data and/or metadata related to the backup copy 116A, such as information indicating where the backup copy 116A resides on the disk library 108A, data and metadata for cache retrieval, etc. The storage manager 140 may similarly update its index 150 to include information relating to the storage operation, such as information relating to the type of storage operation, a physical location associated with one or more copies created by the storage operation, the time the storage operation was performed, status information relating to the storage operation, the components involved in the storage operation, and the like. In some cases, the storage manager 140 may update its index 150 to include some or all of the information stored in the index 153 of the media agent 144A. After the 30 day retention period expires, the storage manager 140 instructs the media agent 144A to delete the backup copy 116A from the disk library 108A. Indexes 150 and/or 153 are updated accordingly.

At step 5, the storage manager 140 initiates the creation of a disaster recovery copy 116B according to the disaster recovery copy rule set 162.

At step 6, illustratively based on the instructions received from the storage manager 140 at step 5, the specified media agent 144B retrieves the most recent backup copy 116A from the disk library 108A.

At step 7, again at the direction of the storage manager 140 and as specified in the disaster recovery copy rule set 162, the media agent 144B uses the retrieved data to create a disaster recovery copy 116B on the tape library 108B. In some cases, the disaster recovery copy 116B is a direct, mirror copy of the backup copy 116A, and remains in the backup format. In other embodiments, the disaster recovery copy 116B may be generated in some other manner, such as by using the primary data 112A, 112B from the primary storage device 104 as source data. The disaster recovery copy operation is initiated once a day and the disaster recovery copies 116B are deleted after 60 days; indexes are updated accordingly when/after each information management operation is executed/completed.

At step 8, the storage manager 140 initiates the creation of a compliance copy 116C, according to the compliance copy rule set 164. For instance, the storage manager 140 instructs the media agent 144B to create the compliance copy 116C on the tape library 108B at step 9, as specified in the compliance copy rule set 164. In the example, the compliance copy 116C is generated using the disaster recovery copy 116B. In other embodiments, the compliance copy 116C is instead generated using either the primary data 112B corresponding to the email sub-client or using the backup copy 116A from the disk library 108A as source data. As specified, in the illustrated example, compliance copies 116C are created quarterly, and are deleted after ten years, and indexes are kept up-to-date accordingly.

While not shown in FIG. 1E, at some later point in time, a restore operation can be initiated involving one or more of the secondary copies 116A, 116B, 116C. As one example, a user may manually initiate a restore of the backup copy 116A by interacting with the user interface 158 of the storage manager 140. The storage manager 140 then accesses data in its index 150 (and/or the respective storage policy 148A) associated with the selected backup copy 116A to identify the appropriate media agent 144A and/or secondary storage device 108A.

In other cases, a media agent may be selected for use in the restore operation based on a load balancing algorithm, an availability based algorithm, or other criteria. The selected media agent 144A retrieves the data from the disk library 108A. For instance, the media agent 144A may access its index 153 to identify a location of the backup copy 116A on the disk library 108A, or may access location information residing on the disk 108A itself.

When the backup copy 116A was recently created or accessed, the media agent 144A accesses a cached version of the backup copy 116A residing in the index 153, without having to access the disk library 108A for some or all of the data. Once it has retrieved the backup copy 116A, the media agent 144A communicates the data to the source client computing device 102. Upon receipt, the file system data agent 142A and the email data agent 142B may unpackage (e.g., restore from a backup format to the native application format) the data in the backup copy 116A and restore the unpackaged data to the primary storage device 104.

Exemplary Applications of Storage Policies

The storage manager 140 may permit a user to specify aspects of the storage policy 148A. For example, the storage policy can be modified to include information governance policies to define how data should be managed in order to comply with a certain regulation or business objective. The various policies may be stored, for example, in the management database 146. An information governance policy may comprise a classification policy, which is described herein. An information governance policy may align with one or more compliance tasks that are imposed by regulations or business requirements. Examples of information governance policies might include a Sarbanes-Oxley policy, a HIPAA policy, an electronic discovery (E-Discovery) policy, and so on.

Information governance policies allow administrators to obtain different perspectives on all of an organization's online and offline data, without the need for a dedicated data silo created solely for each different viewpoint. As described previously, the data storage systems herein build a centralized index that reflects the contents of a distributed data set that spans numerous clients and storage devices, including both primary and secondary copies, and online and offline copies. An organization may apply multiple information governance policies in a top-down manner over that unified data set and indexing schema in order to permit an organization to view and manipulate the single data set through different lenses, each of which is adapted to a particular compliance or business goal. Thus, for example, by applying an E-discovery policy and a Sarbanes-Oxley policy, two different groups of users in an organization can conduct two very different analyses of the same underlying physical set of data copies, which may be distributed throughout the organization and information management system.

A classification policy defines a taxonomy of classification terms or tags relevant to a compliance task and/or business objective. A classification policy may also associate a defined tag with a classification rule. A classification rule defines a particular combination of criteria, such as users who have created, accessed or modified a document or data object; file or application types; content or metadata keywords; clients or storage locations; dates of data creation and/or access; review status or other status within a workflow (e.g., reviewed or un-reviewed); modification times or types of modifications; and/or any other data attributes in any combination, without limitation. A classification rule may also be defined using other classification tags in the taxonomy. The various criteria used to define a classification rule may be combined in any suitable fashion, for example, via Boolean operators, to define a complex classification rule. As an example, an E-discovery classification policy might define a classification tag "privileged" that is associated with documents or data objects that (1) were created or modified by legal department staff, or (2) were sent to or received from outside counsel via email, or (3) contain one of the following keywords: "privileged" or "attorney" or "counsel", or other like terms.

One specific type of classification tag, which may be added to an index at the time of indexing, is an entity tag. An entity tag may be, for example, any content that matches a defined data mask format. Examples of entity tags might include, e.g., social security numbers (e.g., any numerical content matching the formatting mask XXX-XX-XXX, credit card numbers (e.g., content having a 13-16 digit string of numbers), SKU numbers, product numbers, etc.

A user may define a classification policy by indicating criteria, parameters or descriptors of the policy via a graphical user interface, such as a form or page with fields to be filled in, pull-down menus or entries allowing one or more of several options to be selected, buttons, sliders, hypertext links or other known user interface tools for receiving user input, etc. For example, a user may define certain entity tags, such as a particular product number or project ID code that is relevant in the organization. In some implementations, the classification policy can be implemented using cloud-based techniques. For example, the storage devices may be cloud storage devices, and the storage manager 140 may execute cloud service provider API over a network to classify data stored on cloud storage devices.

Exemplary Secondary Copy Formatting

The formatting and structure of secondary copies 116 can vary, depending on the embodiment. In some cases, secondary copies 116 are formatted as a series of logical data units or "chunks" (e.g., 512 MB, 1 GB, 2 GB, 4 GB, or 8 GB chunks). This can facilitate efficient communication and writing to secondary storage devices 108, e.g., according to resource availability. For example, a single secondary copy 116 may be written on a chunk-by-chunk basis to a single secondary storage device 108 or across multiple secondary storage devices 108. In some cases, users can select different chunk sizes, e.g., to improve throughput to tape storage devices.

Generally, each chunk can include a header and a payload. The payload can include files (or other data units) or subsets thereof included in the chunk, whereas the chunk header generally includes metadata relating to the chunk, some or all of which may be derived from the payload. For example, during a secondary copy operation, the media agent 144, storage manager 140, or other component may divide the associated files into chunks and generate headers for each chunk by processing the constituent files. The headers can include a variety of information such as file identifier(s), volume(s), offset(s), or other information associated with the payload data items, a chunk sequence number, etc. Importantly, in addition to being stored with the secondary copy 116 on the secondary storage device 108, the chunk headers can also be stored to the index 153 of the associated media agent(s) 144 and/or the index 150. This is useful in some cases for providing faster processing of secondary copies 116 during restores or other operations. In some cases, once a chunk is successfully transferred to a secondary storage device 108, the secondary storage device 108 returns an indication of receipt, e.g., to the media agent 144 and/or storage manager 140, which may update their respective indexes 153, 150 accordingly. During restore, chunks may be processed (e.g., by the media agent 144) according to the information in the chunk header to reassemble the files.

Data can also be communicated within the information management system 100 in data channels that connect the client computing devices 102 to the secondary storage devices 108. These data channels can be referred to as "data streams", and multiple data streams can be employed to parallelize an information management operation, improving data transfer rate, among providing other advantages. Example data formatting techniques including techniques involving data streaming, chunking, and the use of other data structures in creating copies (e.g., secondary copies) are described in U.S. Pat. Nos. 7,315,923 and 8,156,086, and 8,578,120, each of which is incorporated by reference herein.

Figure 1F:
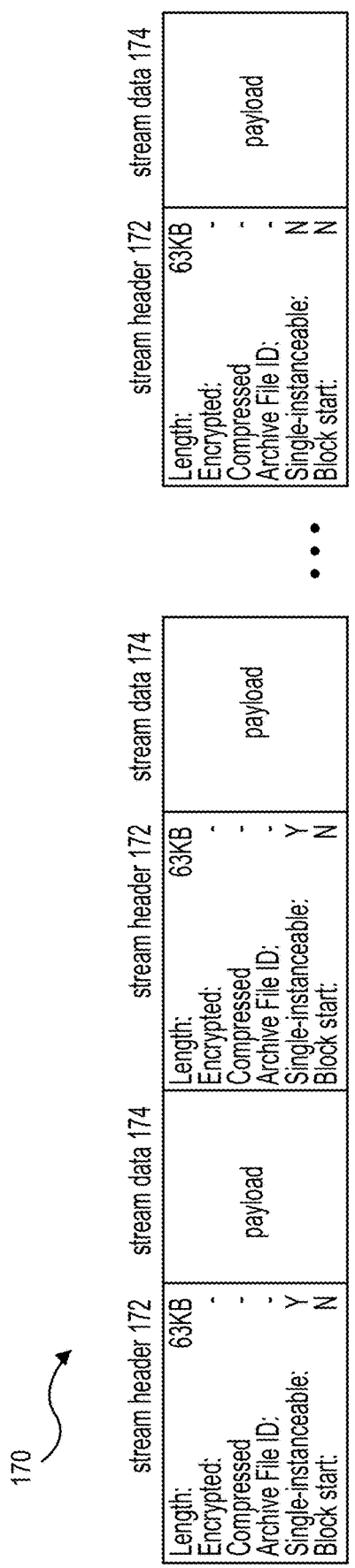
FIGS. 1F-1H are block diagrams illustrating suitable data structures that may be employed by the information management system.
Figure 1G:
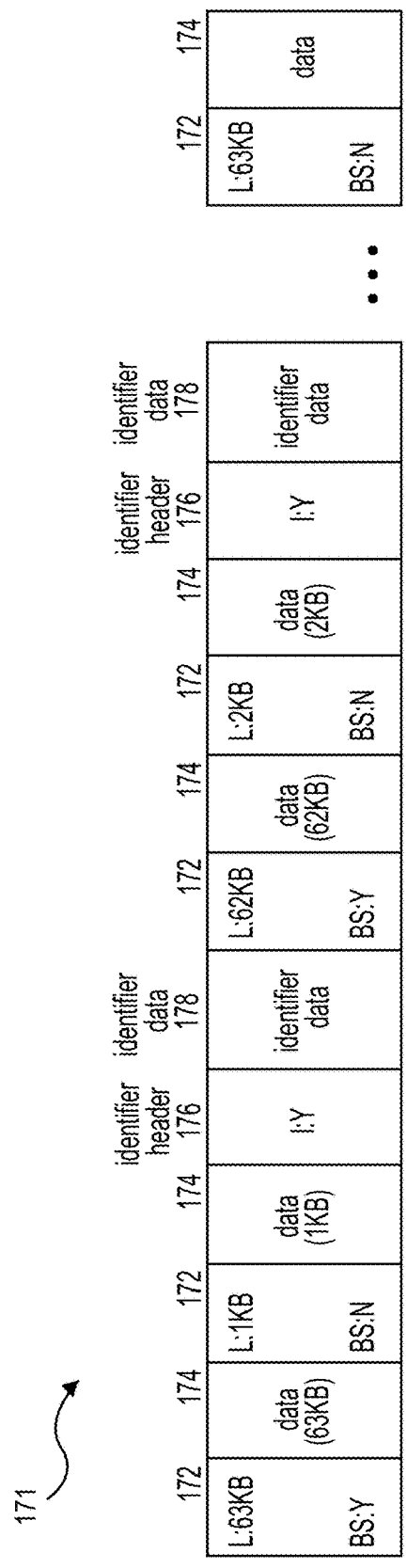

FIGS. 1F and 1G are diagrams of example data streams 170 and 171, respectively, which may be employed for performing data storage operations. Referring to FIG. 1F, the data agent 142 forms the data stream 170 from the data associated with a client computing device 102 (e.g., primary data 112). The data stream 170 is composed of multiple pairs of stream header 172 and stream data (or stream payload) 174. The data streams 170 and 171 shown in the illustrated example are for a single-instanced storage operation, and a stream payload 174 therefore may include both single-instance ("SI") data and/or non-SI data. A stream header 172 includes metadata about the stream payload 174. This metadata may include, for example, a length of the stream payload 174, an indication of whether the stream payload 174 is encrypted, an indication of whether the stream payload 174 is compressed, an archive file identifier (ID), an indication of whether the stream payload 174 is single instanceable, and an indication of whether the stream payload 174 is a start of a block of data.

Referring to FIG. 1G, the data stream 171 has the stream header 172 and stream payload 174 aligned into multiple data blocks. In this example, the data blocks are of size 64 KB. The first two stream header 172 and stream payload 174 pairs comprise a first data block of size 64 KB. The first stream header 172 indicates that the length of the succeeding stream payload 174 is 63 KB and that it is the start of a data block. The next stream header 172 indicates that the succeeding stream payload 174 has a length of 1 KB and that it is not the start of a new data block. Immediately following stream payload 174 is a pair comprising an identifier header 176 and identifier data 178. The identifier header 176 includes an indication that the succeeding identifier data 178 includes the identifier for the immediately previous data block. The identifier data 178 includes the identifier that the data agent 142 generated for the data block. The data stream 171 also includes other stream header 172 and stream payload 174 pairs, which may be for SI data and/or for non-SI data.

Figure 1H:
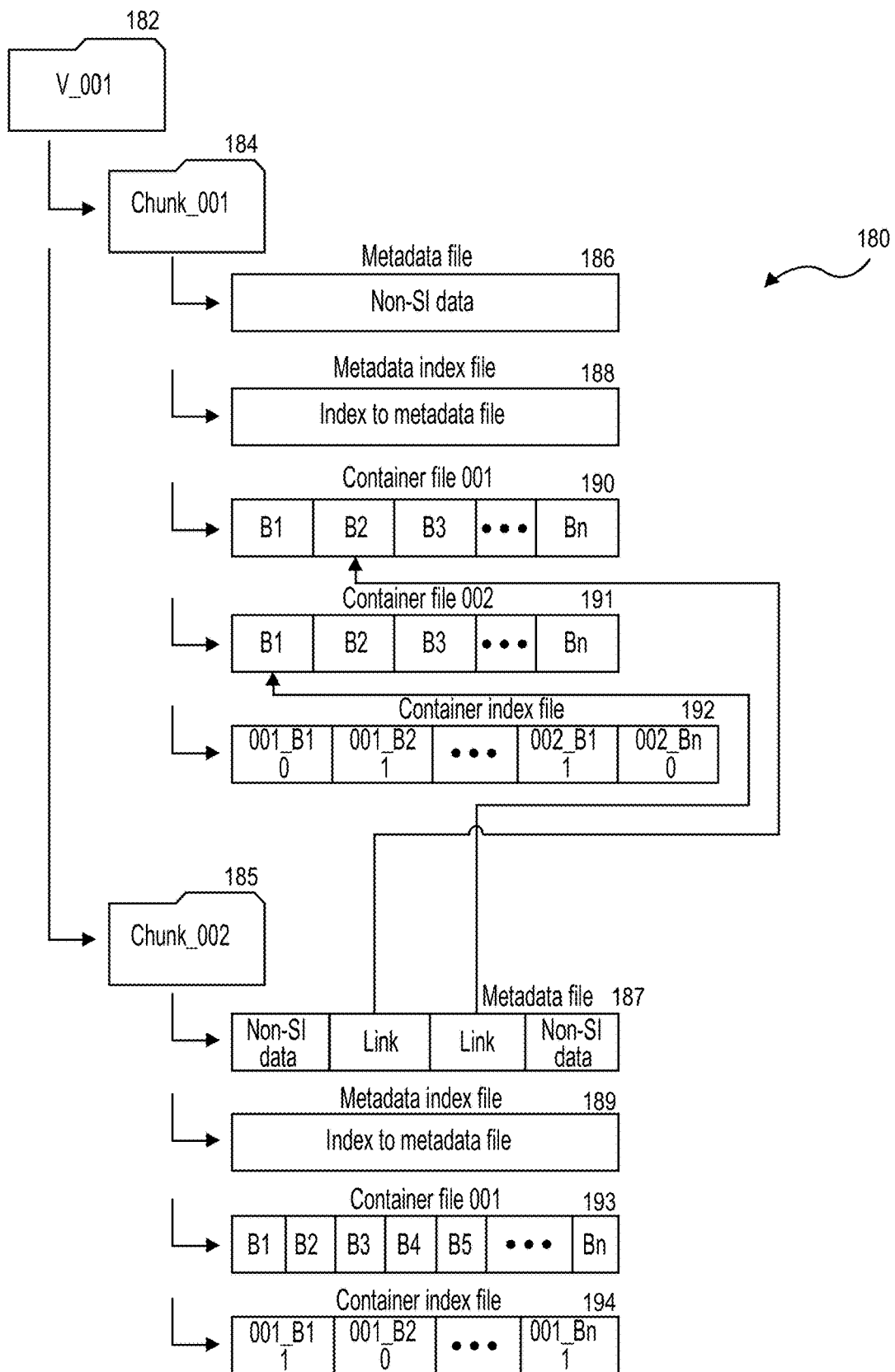

FIG. 1H is a diagram illustrating the data structures 180 that may be used to store blocks of SI data and non-SI data on the storage device (e.g., secondary storage device 108). According to certain embodiments, the data structures 180 do not form part of a native file system of the storage device. The data structures 180 include one or more volume folders 182, one or more chunk folders 184/185 within the volume folder 182, and multiple files within the chunk folder 184. Each chunk folder 184/185 includes a metadata file 186/187, a metadata index file 188/189, one or more container files 190/191/193, and a container index file 192/194. The metadata file 186/187 stores non-SI data blocks as well as links to SI data blocks stored in container files. The metadata index file 188/189 stores an index to the data in the metadata file 186/187. The container files 190/191/193 store SI data blocks. The container index file 192/194 stores an index to the container files 190/191/193. Among other things, the container index file 192/194 stores an indication of whether a corresponding block in a container file 190/191/193 is referred to by a link in a metadata file 186/187. For example, data block B2 in the container file 190 is referred to by a link in the metadata file 187 in the chunk folder 185. Accordingly, the corresponding index entry in the container index file 192 indicates that the data block B2 in the container file 190 is referred to. As another example, data block B1 in the container file 191 is referred to by a link in the metadata file 187, and so the corresponding index entry in the container index file 192 indicates that this data block is referred to.

As an example, the data structures 180 illustrated in FIG. 1H may have been created as a result of two storage operations involving two client computing devices 102. For example, a first storage operation on a first client computing device 102 could result in the creation of the first chunk folder 184, and a second storage operation on a second client computing device 102 could result in the creation of the second chunk folder 185. The container files 190/191 in the first chunk folder 184 would contain the blocks of SI data of the first client computing device 102. If the two client computing devices 102 have substantially similar data, the second storage operation on the data of the second client computing device 102 would result in the media agent 144 storing primarily links to the data blocks of the first client computing device 102 that are already stored in the container files 190/191. Accordingly, while a first storage operation may result in storing nearly all of the data subject to the storage operation, subsequent storage operations involving similar data may result in substantial data storage space savings, because links to already stored data blocks can be stored instead of additional instances of data blocks.

If the operating system of the secondary storage computing device 106 on which the media agent 144 operates supports sparse files, then when the media agent 144 creates container files 190/191/193, it can create them as sparse files. A sparse file is type of file that may include empty space (e.g., a sparse file may have real data within it, such as at the beginning of the file and/or at the end of the file, but may also have empty space in it that is not storing actual data, such as a contiguous range of bytes all having a value of zero). Having the container files 190/191/193 be sparse files allows the media agent 144 to free up space in the container files 190/191/193 when blocks of data in the container files 190/191/193 no longer need to be stored on the storage devices. In some examples, the media agent 144 creates a new container file 190/191/193 when a container file 190/191/193 either includes 100 blocks of data or when the size of the container file 190 exceeds 50 MB. In other examples, the media agent 144 creates a new container file 190/191/193 when a container file 190/191/193 satisfies other criteria (e.g., it contains from approximately 100 to approximately 1000 blocks or when its size exceeds approximately 50 MB to 1 GB).

In some cases, a file on which a storage operation is performed may comprise a large number of data blocks. For example, a 100 MB file may comprise 400 data blocks of size 256 KB. If such a file is to be stored, its data blocks may span more than one container file, or even more than one chunk folder. As another example, a database file of 20 GB may comprise over 40,000 data blocks of size 512 KB. If such a database file is to be stored, its data blocks will likely span multiple container files, multiple chunk folders, and potentially multiple volume folders. Restoring such files may require accessing multiple container files, chunk folders, and/or volume folders to obtain the requisite data blocks.

Protecting and Restoring Database Data Using Block-Level Mapping

Figure 2A:
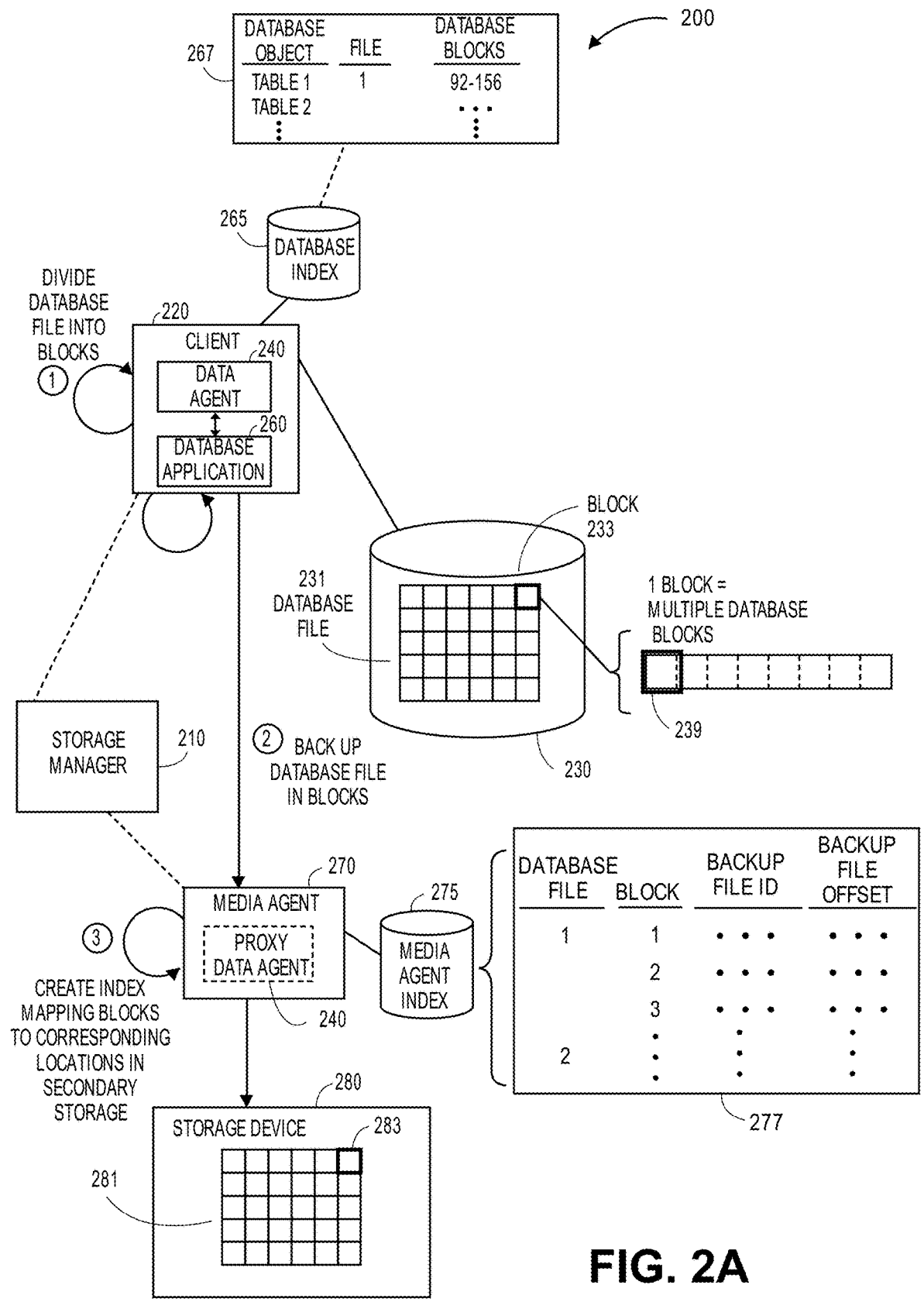
FIGS. 2A-2B are a data flow diagrams illustrative of the interaction between the various components of an exemplary information management system configured to implement database backup using block-level mapping, according to certain embodiments.

FIG. 2A is a data flow diagram illustrative of the interaction between the various components of an exemplary information management system 200 configured to implement database backup using block-level mapping, according to certain embodiments. As illustrated, the exemplary information management system 200 includes a storage manager 210, a client computing device or client 220, an information store or primary storage device 230, a data agent 240, a database application 260, a media agent 270, and a secondary storage device or storage device 280. The system 200 and corresponding components of FIG. 2A may be similar to or the same as the system 100 and similarly named (but not necessarily numbered) components of FIG. 1D.

Moreover, depending on the embodiment, the system 200 of FIG. 2 may additionally include any of the other components shown in FIG. 1D that are not specifically shown in FIG. 2A. The system 200 may include one or more of each component. All components of the system 200 can be in direct communication with each other or communicate indirectly via the client 220, the storage manager 210, the media agent 270, or the like. In certain embodiments, some of the components in FIG. 2A shown as separate components can reside on a single computing device, or vice versa.

In some cases, the system 200 backs up or otherwise protects a database file using a block-level backup technique. In some embodiments, block-level backup can refer to image-level backup. The system 200 can restore a desired database object (e.g., a table) contained in a backed up database file. And, instead of accessing the entire backup file, the system 200 restores the desired object by accessing a limited portion of the file. As will be discussed in further detail, the system 200 can implement database backup using a block-level mapping of database objects, thereby allowing a desired database object(s) to be restored without restoring the entire backup database file containing the object(s). Such a technique can save resources by reducing the amount of storage space, processing, time, etc. for restore, for example.

With further reference to FIG. 2A, the interaction between the various components of the exemplary information management system will now be described in greater detail with respect to data flow steps indicated by the numbered arrows. Certain details relating to database backup using block-level mapping are further explained with respect to FIGS. 2B and 2C.

At data flow step 1, the data agent 240 divides the database file 231 into granular units or blocks, which can each have the same size. A data agent 240 may be associated with a database application 260. For example, an Oracle data agent may be associated with the Oracle database application. Examples of database applications 260 can include Oracle, DB2, SQL Server, etc. A database application 260 may store data associated with it as one database file or as multiple database files, depending on the embodiment. Database file(s) 231 can be stored in the information store 230. To facilitate discussion, FIG. 2A will be explained in terms of one database file, but as explained above, a database application 260 may store its data in multiple files. The data agent 240 can divide the database into multiple blocks 233 of appropriate sizes. The block 233 can be different from application-level blocks which may be delineated and tracked by the database application 260 for its own purposes in creating and maintaining the database data. The blocks used by the database application 260 may be referred to as the "database blocks." For example, a block 233 can include multiple application-level blocks 239. The size of the block 233 can be different from the size of the application-level block 239. In one embodiment, the size of a block 233 can be 256 kilobytes (kB). In contrast, the size of the application-level block 239 may be 2 kB or 4 kB. The size of a block 233 by which the database file 231 is divided can be determined based on various factors (e.g., size of a read by a database application 260). For example, the size of a block 233 is determined based on the optimal size for each application 260, for example, as a multiple of the read size of the application 260. In one embodiment, the size of a block 233 is a parameter defined in the parameter file of the database application 260, and the database application 260 reads the block size when it is started and accesses data in multiples of block size. In some embodiments, a block 233 is also referred to as an extent.

The data agent 240 can divide the database file 231 into blocks 233 prior to backup or at the time a backup operation is performed. The system 200 may provide a default size for a block 233, and the data agent 240 can use the default size. The data agent 240 can also select or determine an appropriate block size and override the default size, based on an algorithm, for example. In some other cases, there are several pre-determined options for the size of the block 233, and the data agent 240 chooses one of the options. The data agent 240 may store the block size used to divide the database file 231, e.g., in application configurations or system configurations.

At data flow step 2, the system 200 creates a backup or other secondary copy of the database file 231 as the set of blocks 233. For example, the storage manager 210 can initiate a backup operation and instruct media agent(s) 270 to copy the set of blocks 233 to create a backup copy 281 of the database file 231. The media agent 270 can copy the blocks 233 to the storage device 280 and create a secondary copy 281 of the database file 231, including the copies 283 of the blocks 233. To facilitate discussion, copies 283 of the blocks 233 may also be referred to simply as blocks 283.

The secondary storage device(s) 280 may store secondary copy data as a plurality of backup files (or other types of secondary copy files, depending on the type of secondary copy). Each backup file may include copies of a number of database files 231 and/or copies of other types of files as well as metadata, such as is discussed in further detail above, such as with respect to FIGS. 1F-1H, and below with respect to FIG. 2D. For instance, the data agent(s) 240 and/or media agent(s) 270 may package the backup files together according to a backup format. In some embodiments, each backup file has a unique identifier associated therewith, which can be called a "backup file ID". And locations within an individual backup file can be identified with an offset value, which can be called a "backup file offset." Backup files, backup file IDs, and backup file offsets are discussed in further detail below with respect to FIG. 2D.

Each of the blocks 283 of the database backup file 281 will be stored in a particular backup file in the secondary storage device 280, and the media agent 270 can have a backup file ID and a backup file offset associated with it that is used to locate the block 283 in secondary storage. The backup copy 281 of the database file 231 can be stored in the native format of the database application 260, within the backup file. To facilitate discussion, a backup copy 281 of the database file 231 may also be referred to as a backup database file 281.

Backup may run according to any of the techniques described herein, such as according to a schedule defined by a storage policy, at user request, based on certain events, etc. In some embodiments, the system 200 may provide the block-level mapping backup feature as an option during backup. For example, the system administrator may select backup using block-level mapping as one of the backup parameters.

At data flow step 3, the media agent 270 creates an index or table 277 that maps blocks and corresponding locations in secondary storage. The media agent 270 can keep track of where the copies 283 of the blocks 233 are stored in secondary storage. For example, the media agent 270 has a table 277 of block locations in the media agent index 275. The table 277 can indicate the storage device 280 and/or location for each block 283 in secondary storage.

In one embodiment, the table 277 lists a backup database file 281, the blocks that belong to a backup database file 281 (e.g., identified by block number or by block ID), the backup file ID of the block 283, and the backup file offset of the block 283. The data agent 240 and/or the media agent 270 may refer to the table 277 at the time of restore to retrieve particular blocks 283 that correspond to a database object to be restored, such as a table. The mapping of blocks 283 to corresponding locations in secondary storage may be referred to as block-level mapping, and the table 277 may be referred to as the block-level mapping table.

The media agent 270 can copy a block 233 and create an entry for the block 283 in the table 277 on a block-by-block basis. For example, the media agent 270 writes Block 1 of File 1 and creates an entry for Block 1, adding the backup file ID of Block 1 and the backup file offset of Block 1. Or the media agent 270 creates the entry for Block 1 first, then writes Block 1 to the designated offset.

In certain embodiments, a proxy data agent 240 can be used to perform the functions relating to database backup using block-level mapping. For instance, using the data agent 240 on the client 220 to implement database backup using block-level mapping can consume resources of the database application 260 and the data agent 240, e.g., for database operations. Accordingly, a proxy data agent 240 can be used to perform data flow steps 1-3 above. A proxy data agent 240 can reside on a separate computing device from the client 220 on which the data agent 240 resides. For example, the proxy data agent 240 can reside on a secondary storage computing device which hosts the media agent 270.

The block-level mapping of blocks 283 and their locations in secondary storage can allow restore of a particular database object from the backup database file 281 without restoring the entire backup database file 281 to primary storage. Certain details relating to database restore using block-level mapping are explained further with respect to FIG. 2B below.

While described with respect to a backup operation for the purposes of illustration, the techniques described herein are compatible with other types of storage operations, such as, for example, archiving, replication, migration, and the like. A description of these and other storage operations compatible with embodiments described herein is provided above.

Figure 2B:
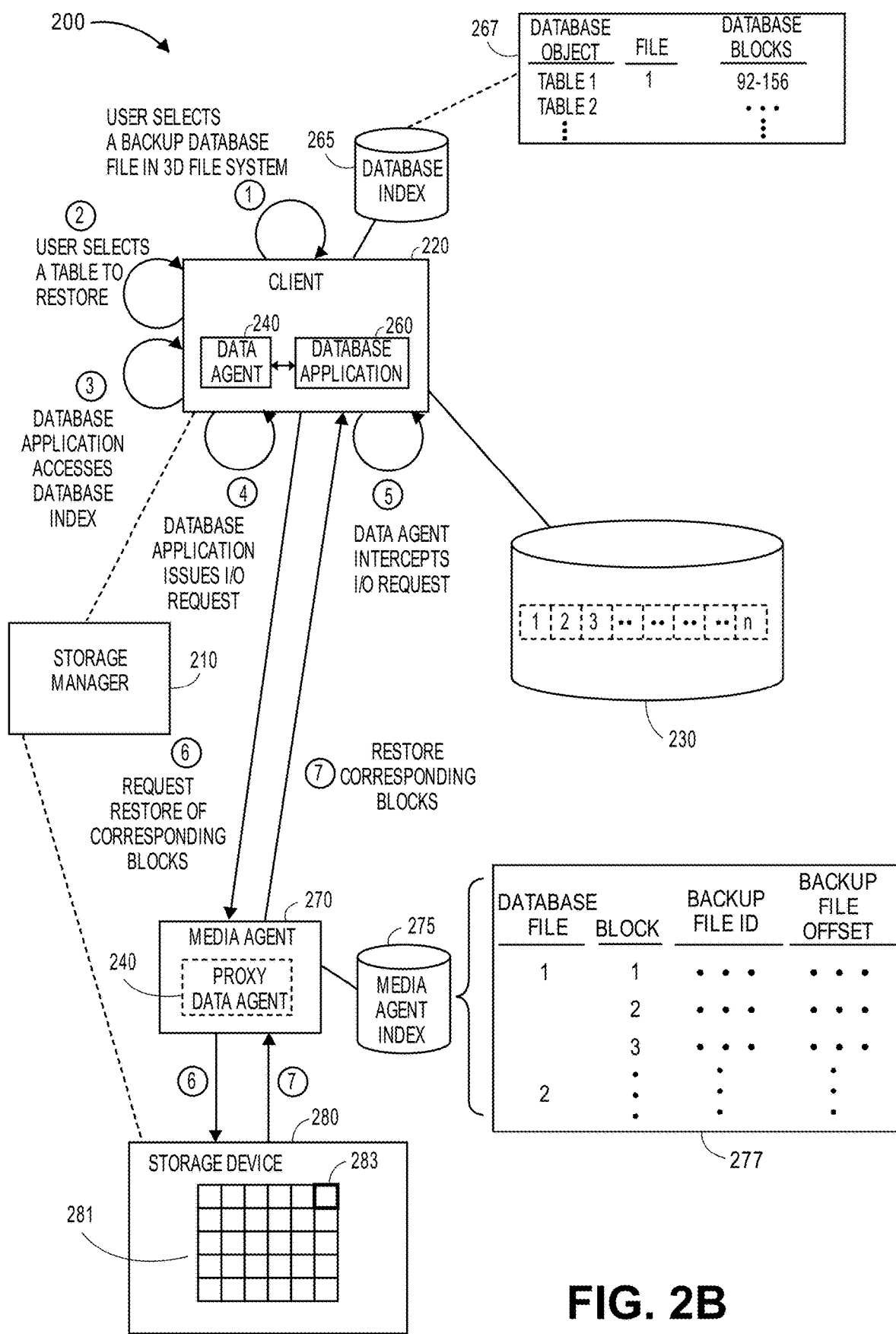

FIG. 2B is a data flow diagram illustrative of the interaction between the various components of the exemplary information management system 200 configured to implement database backup using block-level mapping, according to certain embodiments. The system 200 and corresponding components of FIG. 2B may be similar to or the same as the system 100, 200 and similarly named (but not necessarily numbered) components of FIGS. 1D and 2A.

With further reference to FIG. 2B, the interaction between the various components of the exemplary information management system will now be described in greater detail with respect to data flow steps indicated by the numbered arrows.

At data flow step 1, the user selects a backup database file 281 in a three-dimensional (3-D) file system. A backup database file 281 can be exposed as a file system to the user. A three-dimensional file system can refer to a file system that provides access to file systems at different points in time. Backup files corresponding to different points in time can be exposed as different file systems and/or volumes in the 3-D file system. A backup database file 281 can be mounted in the 3-D file system. The backup files 281 can be presented to the user in a user interface (e.g., the storage manager 210 console, etc.). The 3-D file system may be provided in a native format. For example, for Windows OS, each backup database file 281 can be accessed via Windows Explorer.

The backup database file 281 may be in the native format of the database application 260 that created it. And because the database application 260 can understand the format of the backup database file 281, the database application 260 can directly read the backup database file 281.

At data flow step 2, the user selects a database object (e.g., a table) to restore. The user can browse a backup database file 281 and select a database object for restore. For example, the user can access the hierarchy for the backup database file 281 in Windows Explorer. The user may expand the backup database file 281, view the database objects included in the backup file 281, and select one of the database objects. Selecting a database object can trigger the restore of the database object from secondary storage. In some embodiments, the database object to be restored may be selected by a query. In one embodiment, the database object to be restored can be a column(s) in a table. The database application 260 can refer to the database index 265 to interpret a backup database file 281. As explained above, the database index 265 can provide the mapping between database objects included in a database file and application-level blocks 239 that constitute the database objects. The database application 260 may refer to the database index 265 to display to the user the database objects included in a database backup file 281 or to select certain database objects using a query.

When the user selects the database object or enters a query, the database application 260 may access or read the corresponding database object(s) in the backup database file 281. As discussed in further detail below with respect to data flow step 5, the data agent 240 can intercept such operations and locate the corresponding blocks 283 in secondary storage so that the blocks 283 in the backup database file 281 can be forwarded to the database application 260 without restoring the entire backup database file 281. For instance, the data agent 240 determines blocks 233 that correspond to the selected database object. The database application 260 operations intercepted by the data agent 240 may be in the form of an I/O request for one or more application-level blocks in a database file. The I/O request can include an offset in the database file, include start and end offsets in the database file, etc.

At data flow step 3, the database application 260 accesses the database index 265 to determine the database file 231 offsets for the selected database object. The database index 265 can include a table 267 that indicates which application-level blocks 239 belong to a database object. In FIG. 2, the table 267 indicates that Table 1 includes application-level blocks 92-156. Using the table 267, the database application 260 can translate the application-level blocks 239 for the selected database object to one or more offsets within the database file 231. In one example, the database application 260 translates the beginning application-level block 239 to a start offset and the ending application-level block 239 to an end offset. For example, if an application-level block is 4 kB in size, application-level block 92 translates to offset 368 in the database file 231 and application-level block 156 translates to offset 624 in the database file 231, where each increment of the offset by one corresponds to an increment of 1 k in the database file 231.

At data flow step 4, the database application 260 then issues an I/O request to read the translated offsets in the backup database file 281. For instance, the database application 260 issues a request to read offsets 368-624 in the backup database file 281. In some embodiments, the I/O request includes an identifier for the requested backup database file 281 as well as the start offset and the end offset of the portion of the backup database file 281 to read. In other embodiments, the I/O request includes the start offset and the number of bytes to read from the start offset. Because the backup database file 281 is stored in the same format (e.g., the native format used by the database application 260) as the database file 231, the data agent 240 may use the offsets in the database file 231 and the backup database file 281 interchangeably; the data agent 240 can use the offsets in the database file 231 to access the same portion in the backup database file 281, and vice versa. Similarly, blocks 231 and blocks 283 can be used interchangeably for purposes of restoring a particular block 231 from secondary storage.

At data flow step 5, the data agent 240 intercepts the I/O request from the database application 260 and determines the blocks 283 in the backup database file 281 that include the offsets in the I/O request. For example, the data agent 240 obtains the file ID, start offset and/or the end offset from the I/O request and uses this information to determine which block(s) 233 in the database file 231 include the start offset and/or the end offset. For instance, the data agent 240 can divide the offsets by the block size to calculate which blocks 233 include the offsets in the I/O request. For instance, the data agent 240 can determine which blocks to access by evaluating the following equations:

$$\text{floor(start offset/block size)}+1 \qquad \text{(Equation 1)}$$

$$\text{floor(end offset/block size)}+1 \qquad \text{(Equation 2)}$$

As one illustrative example, if the block size is 256 kB, Block 1 of the database file 231 includes offsets 0-255; Block 2 of the database file 231 includes offsets 256-511; Block 3 of the database file 231 includes offsets 512-767, and so on. In the above example, where the start offset is 368 and the end offset is 624, the data agent 240 determines that the starting block is Block 2 by determining that offset 368 falls between offsets corresponding to Block 2 (offsets 256-511), such as by evaluating Equation 1 above (floor[368 kB/256 kB]+1=2]). The data agent 240 can further determine that the ending block is Block 3 by determining that offset 624 falls between offsets corresponding to Block 3 (offsets 512-767), such as by evaluating Equation 2 above (floor[624 kB/256 kB]+1). The data agent 240 then requests restore of Blocks 2 and 3 from the media agent 270. In some embodiments, the I/O request includes the start offset and the number of bytes to read, and the data agent 240 calculates the end offset from the start offset and the number of bytes. The data agent 240 may refer to the stored block size (e.g., stored during backup) in order to determine the blocks 283 to restore.

At data flow step 6, the data agent 240 requests restore of the corresponding blocks 283. Once the data agent 240 determines which blocks 233 and corresponding blocks 283 in the backup database file 281 should be retrieved, the data agent 240 may send a request to restore the blocks 283 to the media agent 270. The data agent 240 may send the database file ID for the requested database file 281 along with the block IDs for the identified blocks 283 to the media agent 270, and the media agent 270 can extract the blocks 283 from the backup database file 281 based on the block IDs. The media agent 270 may refer to the media agent index 275 (e.g., the block locations table 277) to determine where the blocks 283 are located in the storage device 280. The block locations table 277 can indicate the location of the blocks 283 for each backup database file 281.

At data flow step 7, the media agent 270 restores the corresponding blocks 283. After the media agent 270 determines which blocks 283 correspond to the blocks 233 requested by the data agent 240, the media agent 270 can restore the blocks 283 to primary storage, e.g., the information store 230. The database application 260 can access these blocks 283 and present them in the user interface. The user may then interact with the restored database object (e.g., select a column of a table, etc.). Because the blocks 283 include multiple application-level blocks, restored blocks 283 may include other application-level blocks that do not belong to the requested database object. In such case, the data agent 240 can extract the application-level blocks that correspond to the database object (e.g., the offsets in the I/O request) and pass them on to the database application 260. If the database object selected for restore is Table 1, the blocks 283 that correspond to Table 1 can be copied to the information store 230. In one example, Table 1 includes blocks 1, 2, 3, . . . , n, and FIG. 2B shows blocks 1, 2, 3, . . . , n to be restored in dashed lines.

As explained above, a proxy data agent 240 may be used to perform the functions relating to database backup using block-level mapping. Similarly, the proxy data agent 240 can be used to perform the functions relating to database restore using block-level mapping. Using the data agent 240 on the client 220 (e.g., production database server) for restore of database objects can divert resources from regular database operations since the data agent 240 needs to determine which blocks should be restored for the requested database object. Accordingly, the proxy data agent 240 can be used to perform data flow steps 1-5 above. The proxy data agent 240 can reside on a separate computing device from the client 220 or from the computing device on which the data agent 240 resides. In one embodiment, the proxy data agent 240 resides on the media agent 270. Using a proxy data agent 240 can prevent block-level mapping features from interfering with regular database operations.

In this manner, the system 200 can keep track of blocks 283 and their locations in secondary storage, allowing for granular restore of a backup database file 281. The block-level mapping allows the database application 260 to access a particular block 283 in a backup database file 281 without restoring the entire backup database file 281 first. With the block-level mapping, the data agent 240 can intercept a read from the database application 260, locate the corresponding block(s) 283 for the read from the storage device 280, and restore only the desired block(s) 283 to primary storage. Use of block-level mapping can reduce the amount of resources used to restore a backup database file 281 by reducing the amount of storage space, processing, time, etc. involved in restoring database objects. Moreover, in this way, the database application 260 can access the backup database file 281 in secondary storage in the native format of the database application 260. Backup and restore using block-level mapping can be especially useful when tapes are used to back up data; the offsets in the backup database file 281 may not correspond exactly to locations on tape media, and by implementing block-level mapping, the system 200 can restore data from a backup database file 281 in a more granular manner.

While described with respect to a backup operation for the purposes of illustration, the techniques described herein are compatible with other types of storage operations, such as, for example, archiving, replication, migration, and the like. A description of these and other storage operations compatible with embodiments described herein is provided above.

Figure 2C:
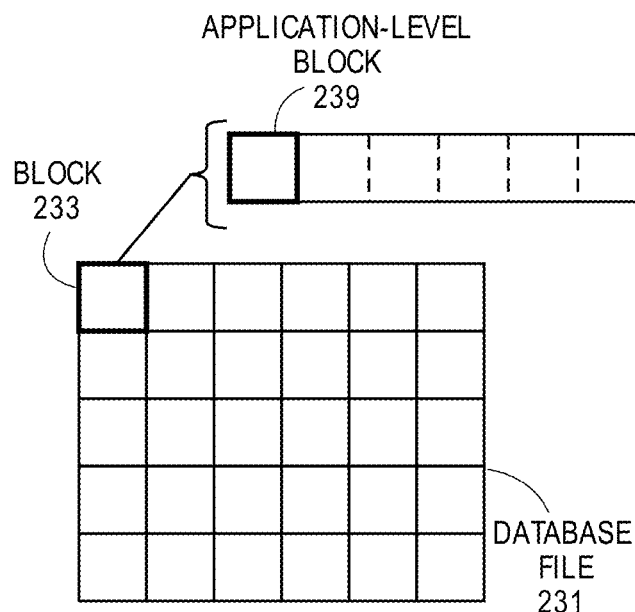
FIG. 2C is a block diagram illustrative of database application data, block-level mapping, and associated data structures, according to certain embodiments.

FIG. 2C is a block diagram illustrative of database application data, block-level mapping, and associated data structures, according to certain embodiments. Certain details relating to FIG. 2C are further explained with respect to FIGS. 2A and 2B. The database application 260 data such as the example database file 231 can be organized by the source database application 261 into many application-level blocks 239. The database application 260 can include a database index or mapping 267, which maintains a mapping of database objects and application-level blocks 239.

The data agent 240 can divide the database file 231 into multiple blocks 233, and each block 233 can include multiple application-level blocks 239. The size of a block 233 can be selected to optimize restore of the database objects. For example, the size can be chosen by considering the size of a typical read by the database application 260. The size of a typical read can vary depending on the database application 260, and the data agent 240 can select an appropriate block 233 size for different database applications 260. In certain embodiments, the data agent 240 maintains a table to keep track of which application-level blocks 239 belong to which block 233. In other embodiments, the data agent 240 doesn't keep track of which application-level blocks 239 belong to a block 233, but instead stores the size of a block 233, e.g., in configuration settings. As explained above, the data agent 240 can use the stored size to determine which blocks 283 should be restored from the storage device(s) 280. Generally, the size of a block 233 will be larger than the size of an application-level block 239.

The media agent 270 may maintain a table 277 of blocks 283 in a backup database file 281 and the locations of the blocks 283 in secondary storage. In one embodiment, the table 277 lists the database backup file 281, the blocks 283 included in the database backup file 281, the backup file ID of the file that includes the blocks 283, and the offset of the blocks 283 within the file. The table 277 can refer to a database backup file 281 and a block 283 by a number. For instance, the database backup file has a file number, and a block 283 has a block number. The data agent 240 can instruct restore of blocks 283 using block numbers.

Figure 2D:
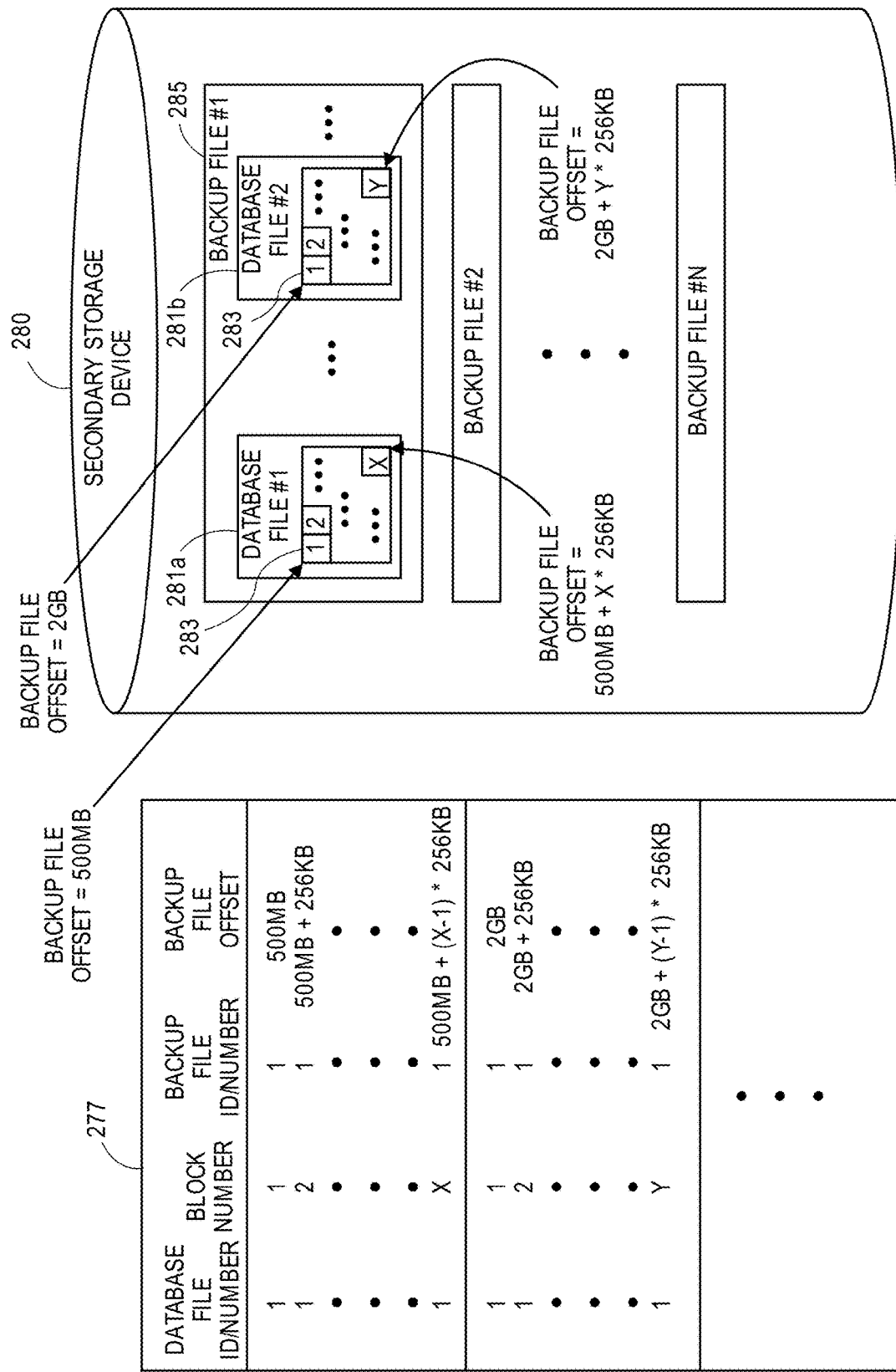
FIG. 2D shows an example of a block location table and a corresponding secondary storage device.

FIG. 2D shows an illustrative example of a partial block locations table 277 as well as a corresponding secondary storage device 280, where the block size is 256 kB. As shown, the block locations table 277 includes four columns. The left-most column gives the database file ID/#, and the next three columns provide corresponding block #, backup file ID/#, and backup file offset. For instance, the example table 277 indicates that database file #1 has x blocks and is entirely stored within backup file #1. Moreover, Block #1 of database file #1 begins at a backup file offset of 500 MB into backup file #1, and the last block x of the database backup file #1 begins at an offset of 500 MB+(x−1)*256 kB. Thus, first database file #1 ends at an offset of 500 MB+x*256 kB. The table 277 also shows that a second database file #2 is also stored completely within backup file #1. The second database #2 begins at a backup file offset of 2 gigabytes (2 GB) into backup file #2, and the last block y of the database file #2 begins at an offset of 2 GB+(y−1)*256 kB. Thus, the second database file #2 ends at an offset of 2 GB+y*256 kB.

While FIG. 2D only shows two first and second database files 281*a*, 281*b* stored in backup file #1 285, more than two database files can be stored in a single backup file. As shown, additional backup files 2-N may reside on the secondary storage device 280. In addition, while not shown in FIG. 2D, one or more additional database files may reside in some or all of the additional backup files 2-N. While the database files 281*a*, 281*b* shown in FIG. 2D reside entirely within backup file #1 285, in other embodiments a single database file may span multiple backup files, such as where a first set of blocks 283 reside on a first backup file, and a second set of blocks 283 reside on a second different backup file.

Figure 3:
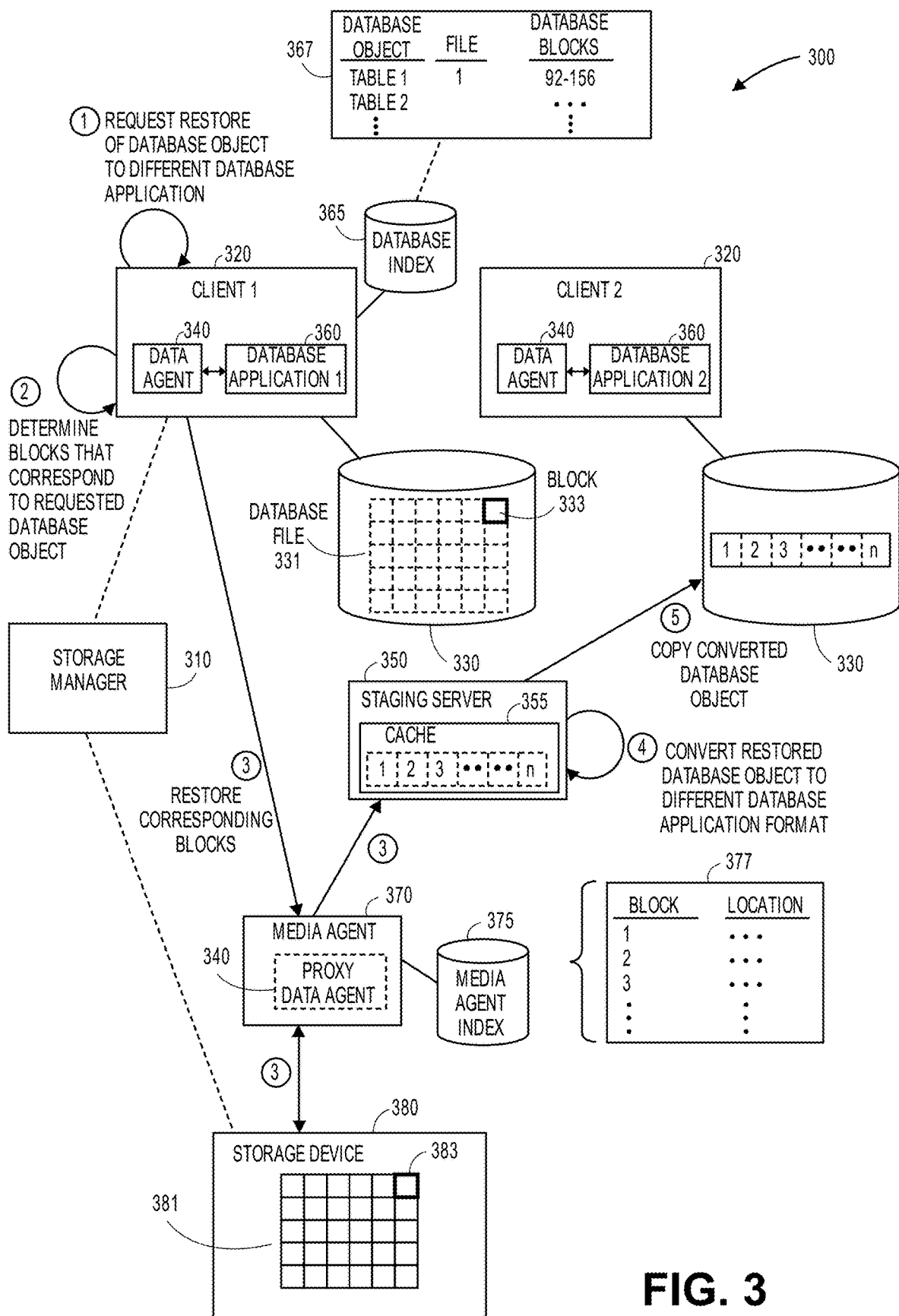
FIG. 3 is a data flow diagram illustrative of the interaction between the various components of the exemplary information management system configured to convert database objects to a database application format that is different than that of the source database application used to generate the objects, according to certain embodiments.

An Exemplary System for Implementing Conversion of a Database Object to a Format Different than the Source Database Application FIG. 3 is a data flow diagram illustrative of the interaction between the various components of the exemplary information management system 300 configured to convert database objects to a database application format that is different than that of the source database application used to generate the objects, according to certain embodiments. As illustrated, the exemplary information management system 300 includes a storage manager 310, a client computing device or client 320, an information store or primary storage device 330, a data agent 340, a staging server 350, a database application 360, a media agent 370, and a secondary storage device or storage device 380. The system 300 and corresponding components of FIG. 3 may be similar to or the same as the system 100, 200 and similarly named (but not necessarily numbered) components of FIGS. 1D and 2A-2C.

Moreover, depending on the embodiment, the system 300 of FIG. 3 may additionally include any of the other components shown in FIGS. 1D and 2A-2C that are not specifically shown in FIG. 3. The system 300 may include one or more of each component. All components of the system 300 can be in direct communication with each other or communicate indirectly via the client 320, the storage manager 310, the media agent 370, or the like. In certain embodiments, some of the components in FIG. 3 shown as separate components can reside on a single computing device, or vice versa.

In some cases, it may be desirable to restore database application to a database application of a different type than the source database application that generated the data and/or to restore the database application data in a way that enables a different database application to access and/or manipulate the restored data. For example, a user may want to restore an Oracle database or a portion thereof to an SQL Server. There may be various reasons why it would be desirable to restore database data for use by a database application different than the source application, such as where there are a limited number of licenses available for the source application, where reporting uniformity is desirable, for quality assurance (QA) purposes, for the purpose of migrating the data (e.g., to different database application, cloud, etc.), etc. In many such cases, a user may want to restore only a portion of a database file. For example, only a table or a few tables may need to be restored to generate a report. Accordingly, the information management system 300 can restore database data from backups or other secondary copies at a more granular level. For example, the information management system 300 can extract a database object from a backup database file and convert the database object to the format of a different database application.

With further reference to FIG. 3, the interaction between the various components of the exemplary information management system will now be described in greater detail with respect to data flow steps indicated by the numbered arrows. Certain details relating to conversion of a database object to a different database application format are explained above with respect to FIGS. 2A-2C.

At data flow step 1, the data agent 340 or another component of the system 300 requests restore of a database object in a backup database file 381 to a different database application 360. The user may browse through a list of backup database files 381 (e.g., in the 3-D file system) and select a particular backup database file 381. Backup database files 381 may be secondary copies of database files 331 each representing the database files 331 at different corresponding points in time. The backup database files 381 can be similar to the backup database files 281 described with respect to FIGS. 2A-2C. The user can then select a database object (e.g., a table) to restore from the backup database file 381. For example, the user may select a database object to restore and the type of target or destination database application 360 that the restored data will be used with. In the example of FIG. 3, the user may select a database object in a backup database file 381 of Database Application 1 and request restore of the database object to Database Application 2. The request can be sent from a client 320 on which Database Application 1 is installed, and the converted database object can be sent to a client 320 on which Database Application 2 is installed. In some embodiments, the restore request may not originate from the user, but instead be triggered by the system 300. For example, the system 300 may generate a report and instruct the data agent 340 to restore a particular database object from backup database files 381. In one embodiment, the system 300 can instruct restore of a database object through the database application 360 that generated the database object, for example, by using an API of the database application 360.

At data flow step 2, the data agent 340 determines the blocks 333 that correspond to the requested database object. Data flow step 2 can be similar to data flow steps 3-5 of FIG. 2B, and the system 300 can use the block-level mapping features and the data structures explained in connection with FIGS. 2A-2C, for example, in order to determine which blocks 333 correspond to the requested database object. For instance, Database Application 1 accesses the database index 365 (e.g., table 367) to look up the application-level blocks for the requested database object and translates the application-level blocks to offsets in the database file 231. Then, Database Application 1 issues a conversion request, which includes the translated offsets. The data agent 340 can intercept the conversion request and determine which blocks 333 in the database file 331 include the offsets in the conversion request. Then, the data agent 340 issues a request to restore blocks 383 corresponding to blocks 333. At data flow step 3, the media agent 370 restores the corresponding blocks 383 to the staging server 350. The staging server 350 can include a cache 355. After the media agent 370 determines which blocks 383 correspond to the blocks 333 requested by the data agent 340, the media agent 370 can restore the blocks 383 to the cache 355 of the staging server 350. The system 300 can use the block-level mapping and the data structures explained in connection with FIGS. 2A-2C in order to restore the blocks 383 that correspond to the requested database object. For example, the media agent 370 can reference the block-level mapping table 377 to locate the relevant blocks 383 in the storage device 380.

At data flow step 4, the staging server 350 converts the restored database object to the format of the destination database application 360. In the example of FIG. 3, the staging server 350 can convert the restored database object in the cache 355 from the format of Database Application 1 to Database Application 2. For example, although a variety of techniques can be used for converting the data, according to one embodiment the staging server 350 accesses a repository including first database schema associated with Database Application 1 and second database schema associated with Database Application 2, and consults the first and/or schema in performing the conversion. Then, at data flow step 5, the staging server 350 can copy the converted database object to the information store 330 associated with the destination client 320.

In certain embodiments, the staging server 350 does not convert the restored database object, but instead forwards the restored database objects to another computing device for conversion. For example, the computing device may have the destination database application 360 installed and can convert the forwarded restored database object to the format of the destination database application 360. In these embodiments, the staging server 350 serves as a temporary location to which database objects are restored prior to being forwarded for conversion.

In this manner, block-level mapping can be used to convert a single database object to another database application format. The ability to extract and convert a single database object from a backup file without restoring the entire file can save a significant amount of resources, given the large sizes of many database files. Also, the conversion can be performed on the database object from a backup database file 381, so the database production server does not need to be involved in conversion and/or migration of the database object.

Using block-level mapping to convert all database objects of a database application to another database application format can also be useful. For example, a backup database file 381 can be restored and converted in a pipelined fashion, e.g., on an object-by-object basis, where some objects are being accessed from the cache 355 and converted by the staging server 350 in parallel with the restoration of other objects to the cache 355. For each database object, the blocks for that database object database object can be restored from the backup database file 381 into the cache 355, converted to the other database application format, and forwarded to the client 320 and/or the information store 330 associated with the other database application 360. In such cases, some of the database objects and corresponding blocks are restored to the cache 355, converted to the desired format, and/or forwarded to the client 320 before others of database objects and corresponding blocks have been restored to the cache 355. This is in contrast to some other embodiments where an entire backup database file 381 is restored prior to beginning to convert the data to the destination format, requiring large amounts of storage space and resulting in time delays associated with restoring the entire database file 381 prior to conversion, since the size of a backup database file 381 can be quite large (e.g., on the order of terabytes (T)). Restoring and converting on an object-by-object or other pipelined basis can significantly reduce the amount of storage space needed for conversion. Also, the amount of time for conversion is significantly reduced since the restore and conversion can operate in parallel, where each database object can be converted and forwarded to the destination database without having to wait for the entire database file 381 to be restored.

As explained above, the ability convert database objects to a different database application format can be useful in various situations. For instance, a company may have a limited number of licenses for the production database application 360, so generating reports may be performed using a different database application 360. Only a few tables from the production database application 360 may be needed for the reporting, and the corresponding tables can be extracted from the backup database file 381 and converted. The tables could also be converted directly from the information store 330, but doing so will take up some of the resources of the production database application 360. Instead, by converting the database objects directly from the backup database file 381, the system 300 can avoid utilizing resources of the production database application 360. Converting database objects to a different database format can also be useful for other situations, such as migration, QA, etc.

Figure 4:
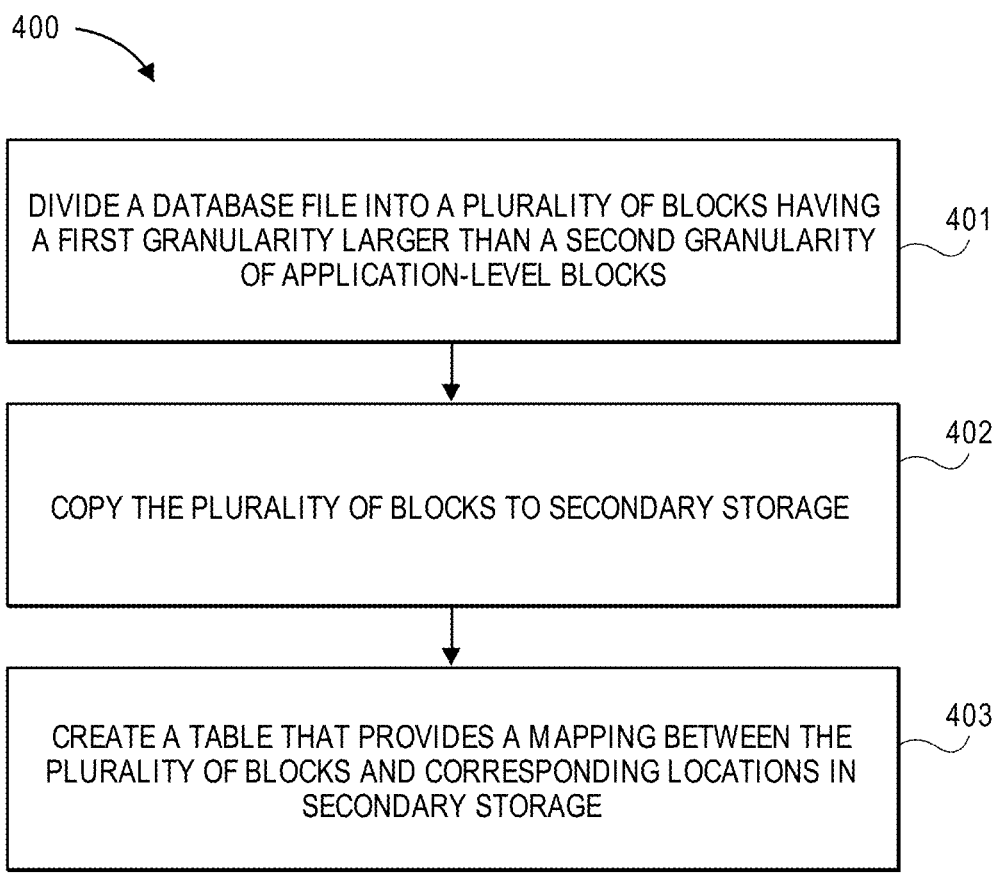
FIG. 4 is a flow diagram illustrative of one embodiment of a routine for database backup using block-level mapping.

FIG. 4 is a flow diagram illustrative of one embodiment of a routine 400 for database backup using block-level mapping. The routine 400 is described with respect to the system 200 of FIG. 2A. However, one or more of the steps of routine 400 may be implemented by other information management systems, such as those described in greater detail above with reference to FIGS. 1D and 2B. The routine 400 can be implemented by any one, or a combination of, a client, a storage manager, a data agent, a media agent, and the like. Moreover, further details regarding certain aspects of at least some of steps of the routine 400 are described in greater detail above with reference to FIGS. 2A, 2B, and 2C. Although described in relation to backup operations for the purposes of illustration, the process of FIG. 4 can be compatible with other types of storage operations, such as, for example, archiving, migration, snapshots, replication operations, and the like.

At block 401, the data agent 240 divides a database file 231 into a plurality of blocks 233. The database application 260 may output the database file 231 for storage in one or more primary storage devices (e.g., the information store 230) as a series of application-level blocks 239. The database file 231 can include a plurality of database objects. The plurality of blocks 233 may have first granularity larger than a second granularity of the application-level blocks such that each of the blocks 233 spans a plurality of the application-level blocks 239. In one embodiment, the size of a block 233 is based on the size of a read operation by the database application 260. For instance, the size of a block 233 is a multiple of the size of an application-level block 239. In certain embodiments, the data agent 240 resides on a computing device that is different from one or more computing devices on which the database application 260 executes, such as a computing device on which the media agent 270 resides. In some embodiments, the system 200 includes a proxy data agent 240, which executes on a computing device that is different from the client computing device 220 on which the database application 260 executes, and the proxy data agent divides the database file 231 into the plurality of blocks 233. The system 200 may include both a data agent 240 on the client computing device 220 and a proxy data agent 240 installed on a different computing device from the client computing device.

At block 402, the media agent(s) 270 copies the plurality of blocks 233 to one or more storage devices 280 to create a secondary copy 281 of the database file 231. Each copied block 283 can have a unique identifier (ID) associated with the block 283. The block ID can be used to restore a particular block 283. For example, the data agent 240 can request restore of a particular database object from the secondary copy 281 of the database file 231. In one embodiment, the secondary copy 281 of the database file 231 is provided as a file system in a user interface (e.g., GUI), and the database object is accessed through the file system.

At block 403, the media agent(s) 270 creates a table 277 that provides a mapping between the plurality of blocks 283 and corresponding locations on the one or more storage devices 280. In some embodiments, the table 277 is stored in one or more indexes associated with the media agent(s) 270 (e.g., the media agent index 275). In certain embodiments, the table 277 includes columns relating to at least: the secondary copy 281 of the database file 231, a block 283 in the secondary copy 281 of the database file 231, a backup file identifier for a location of the block 283 in the storage device(s) 280, and a backup file offset for the location of the block 283 in the storage device(s) 280, etc.

The routine 400 can include fewer, more, or different blocks than those illustrated in FIG. 4 without departing from the spirit and scope of the description. Moreover, it will be appreciated by those skilled in the art and others that some or all of the functions described in this disclosure may be embodied in software executed by one or more processors of the disclosed components and mobile communication devices. The software may be persistently stored in any type of non-volatile and/or non-transitory storage.

Figure 5:
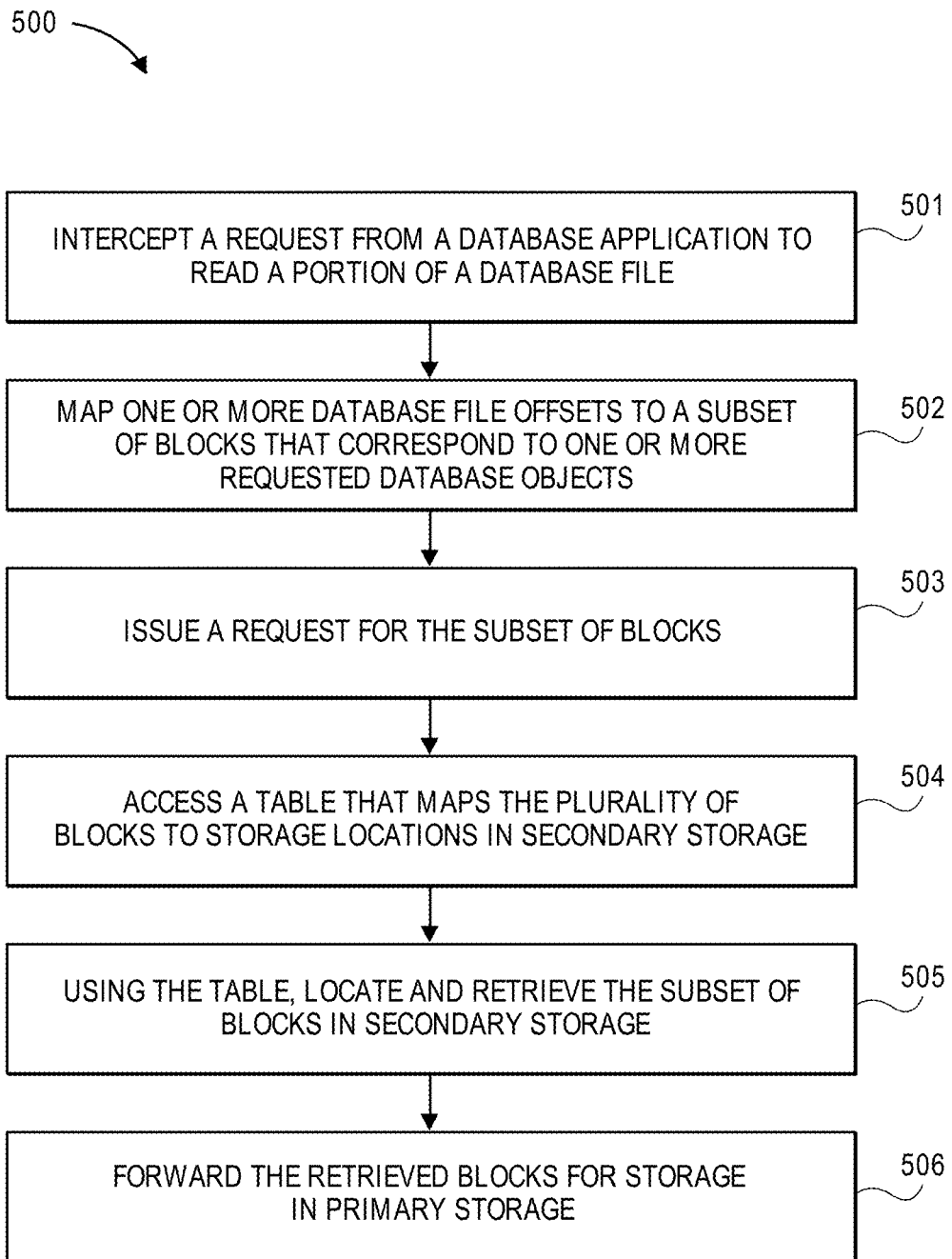
FIG. 5 is a flow diagram illustrative of another embodiment of a routine for database restore using block-level mapping.

FIG. 5 is a flow diagram illustrative of another embodiment of a routine 500 for database restore using block-level mapping. The routine 500 is described with respect to the system 200 of FIG. 2B. However, one or more of the steps of routine 500 may be implemented by other information management systems, such as those described in greater detail above with reference to FIGS. 1D and 2A. The routine 500 can be implemented by any one, or a combination of, a client, a storage manager, a data agent, a media agent, and the like. Moreover, further details regarding certain aspects of at least some of steps of the routine 500 are described in greater detail above with reference to FIGS. 2A, 2B, and 2C. Although described in relation to backup operations for the purposes of illustration, the process of FIG. 5 can be compatible with other types of storage operations, such as, for example, archiving, migration, snapshots, replication operations, and the like.

At block 501, the data agent 240 intercepts a request from the database application 260 to read a portion of the secondary copy 281 of a database file. The secondary copy 281 of the database file may reside one or more storage device(s) 280 and may be organized on the storage device(s) 280 as a plurality of blocks 283. The portion may correspond to a subset of one or more database objects represented by the database file. The request can include one or more database file offsets corresponding to the requested portion. The data agent 240 may reside on a computing device such as the client computing device 220. In one embodiment, the data agent 240 resides on the same computing device as the media agent 270.

In some embodiments, the database file is organized by the database application 260 as a plurality of application-level blocks, and each block 283 includes multiple application-level blocks. The size of a block 283 may be based on the size of a read operation by the database application 260. For example, the size of a block 283 can be a multiple of the size of an application-level block.

In certain embodiments, the secondary copy 281 of the database file is presented as a file system in a user interface, and the request to read the portion is generated in response to selection of the one or more database objects that correspond to the portion within the user interface. The secondary copy 281 is browsed using the database application 260 that generated the database file. The one or more database objects that correspond to the portion may be selected by a query.

At block 502, the data agent 240 maps the one or more database file offsets to a subset of blocks 283 that correspond to the one or more requested database objects. In some embodiments, the data agent 240 maps the one or more database file offsets to the subset of the blocks 283 that correspond to the one or more requested database objects at least in part by dividing the one or more database file offsets by the size of a block 283.

At block 503, the data agent 240 issues a request for the subset of the blocks 283. Each block 283 may have a unique identifier (ID) associated with the block 283. The request can include the unique IDs of at least some blocks 283 in the subset of the blocks 283.

In response to the request for the subset of the blocks 283, at block 504, the media agent(s) 270 accesses a table 277 that maps the plurality of blocks 283 to storage locations on the storage device(s) 280. In one embodiment, the table 277 is stored in one or more indexes associated with the media agent(s) 270 (e.g., the media agent index 275). The table 277 may include the unique IDs of the plurality of blocks 283.

At block 505, the media agent(s) 270, using the table 277, locates and retrieves the subset of blocks 283 from the storage device(s) 280. At block 506, the media agent(s) 270 forwards the retrieved blocks 283 for storage in primary storage (e.g., to the information store 230). In certain embodiments, the data agent 240 extracts application-level blocks corresponding to the requested portion from the retrieved blocks based on the one or more database file offsets, and forwards the extracted application-level blocks to the database application 260.

The routine 500 can include fewer, more, or different blocks than those illustrated in FIG. 5 without departing from the spirit and scope of the description. Moreover, it will be appreciated by those skilled in the art and others that some or all of the functions described in this disclosure may be embodied in software executed by one or more processors of the disclosed components and mobile communication devices. The software may be persistently stored in any type of non-volatile and/or non-transitory storage.

Figure 6:
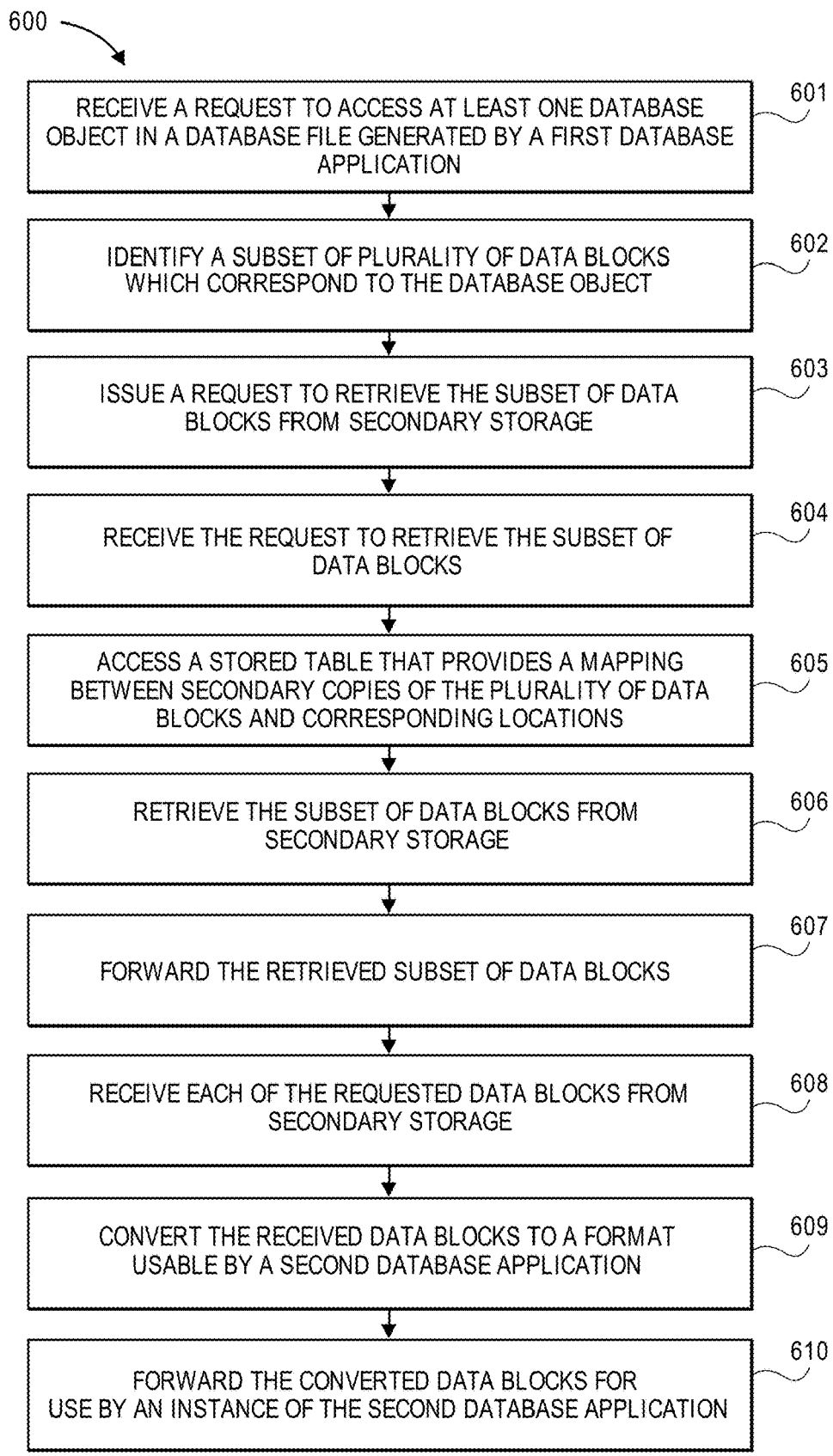
FIG. 6 is a flow diagram illustrative of one embodiment of a routine for conversion of a database object to a different database application format.

FIG. 6 is a flow diagram illustrative of one embodiment of a routine 600 for conversion of a database object to a different database application format. The routine 600 is described with respect to the system 300 of FIG. 3. However, one or more of the steps of routine 600 may be implemented by other information management systems, such as those described in greater detail above with reference to FIGS. 1D, 2A, and 2B. The routine 600 can be implemented by any one, or a combination of, a client, a storage manager, a data agent, a media agent, and the like. Moreover, further details regarding certain aspects of at least some of steps of the routine 600 are described in greater detail above with reference to FIGS. 2A, 2B, 2C, and 3. Although described in relation to backup operations for the purposes of illustration, the process of FIG. 6 can be compatible with other types of storage operations, such as, for example, archiving, migration, snapshots, replication operations, and the like.

At block 601, the data agent 340 receives a request to access at least one database object of a plurality of database objects represented by a database file generated by a first database application 360. The database file is organized by the first database application as a plurality of application-level blocks, and each data block includes multiple application-level blocks. The database file may have been backed up to secondary storage, and the accessed database object may be a database object in the secondary copy 381 of the database file. For example, the database application 360 presents the secondary copy 381 of the database file as a file system in the user interface, and the request to access the at least one database object is generated in response to selection of the at least one database object in the user interface. The first database application 360 may reside on a computing device in primary storage, such as the client computing device 320.

In one embodiment, an index 365 associated with the first database application 360 provides a mapping between the plurality of database objects and corresponding application-level blocks (e.g., in the table 367). The database application 360 generates the request to access the at least one database object by consulting the index 365, and the request includes one or more offsets in the database file corresponding to the at least one database object.

At block 602, in response to the request, the data agent 340 identifies a subset of a plurality of data blocks 383 which correspond to the database object. At block 603, the data agent 340 issues a request for the subset of data blocks 383.

At block 604, the media agent(s) 370 receives the request to retrieve the subset of data blocks 383. At block 605, the media agent(s) 370 accesses a stored table 377 that provides a mapping between secondary copies 383 of the plurality of data blocks and corresponding locations on the storage device(s) 380. The table 377 can be similar to the table 277 described with respect to FIGS. 2A-2D. The table 377 can be stored in an index associated with the media agent(s) 370 (e.g., the media agent index 375). At block 606, the media agent(s) 370 retrieves the subset of data blocks 383 from the storage device(s) 380. At block 607, the media agent(s) 370 forwards the retrieved subset of data blocks 383 to the staging server 350.

At block 608, the staging server 350 receives the requested data blocks 383, where the received data blocks 383 are retrieved from one or more storage devices 380 in secondary storage that store the secondary copy 381 of the database file. In one embodiment, the one or more storage devices 380 include one or more tapes, and the secondary copy 281 of the database file is stored on the one or more tapes. The staging server 350 may have a staging memory, such as a cache 355, for receiving and storing the requested data blocks prior to their conversion.

At block 609, the staging server 350 converts the received data blocks 383 to a format usable by a second database application 360 that is different than the first database application 360. The staging server 350 can be in communication with the staging memory and access data blocks 383 directly from the staging memory for performing the conversion. Or in some embodiments, the staging server 350 forwards data blocks 383 from the staging memory to another computing device for performing the conversion.

In one embodiment, the staging server 350 converts the received data blocks 383 to the format usable by a second database application 360 by extracting application-level blocks included in the received data blocks which correspond to the database object based on the one or more offsets indicating the database object and converting the identified application-level blocks to the format usable by the second database application 360.

In certain embodiments, the at least one database object includes multiple database objects, and at least some of the requested data blocks 383 are accessed from the staging memory for conversion before others of the requested data blocks 383 are received and stored by the staging memory. In this way, the staging server 350 restores and converts database objects on an object-by-object basis. The restore and conversion of database objects can occur in parallel, reducing the amount of time for conversion. The entire database may be converted to the format of the second database application 360 on an object-by-object basis.

At block 610, the staging server 350 forwards the converted database blocks for use by an instance of the second database application 360. The instance of the second database application 360 may be executing on a separate computing device from the first database application 360 (e.g., Client 2 in FIG. 3). The second database application 360 can store the converted database blocks in one or more primary storage devices (e.g., the information store 330 associated with Client 2).

The routine 600 can include fewer, more, or different blocks than those illustrated in FIG. 6 without departing from the spirit and scope of the description. Moreover, it will be appreciated by those skilled in the art and others that some or all of the functions described in this disclosure may be embodied in software executed by one or more processors of the disclosed components and mobile communication devices. The software may be persistently stored in any type of non-volatile and/or non-transitory storage.

Figure 7:
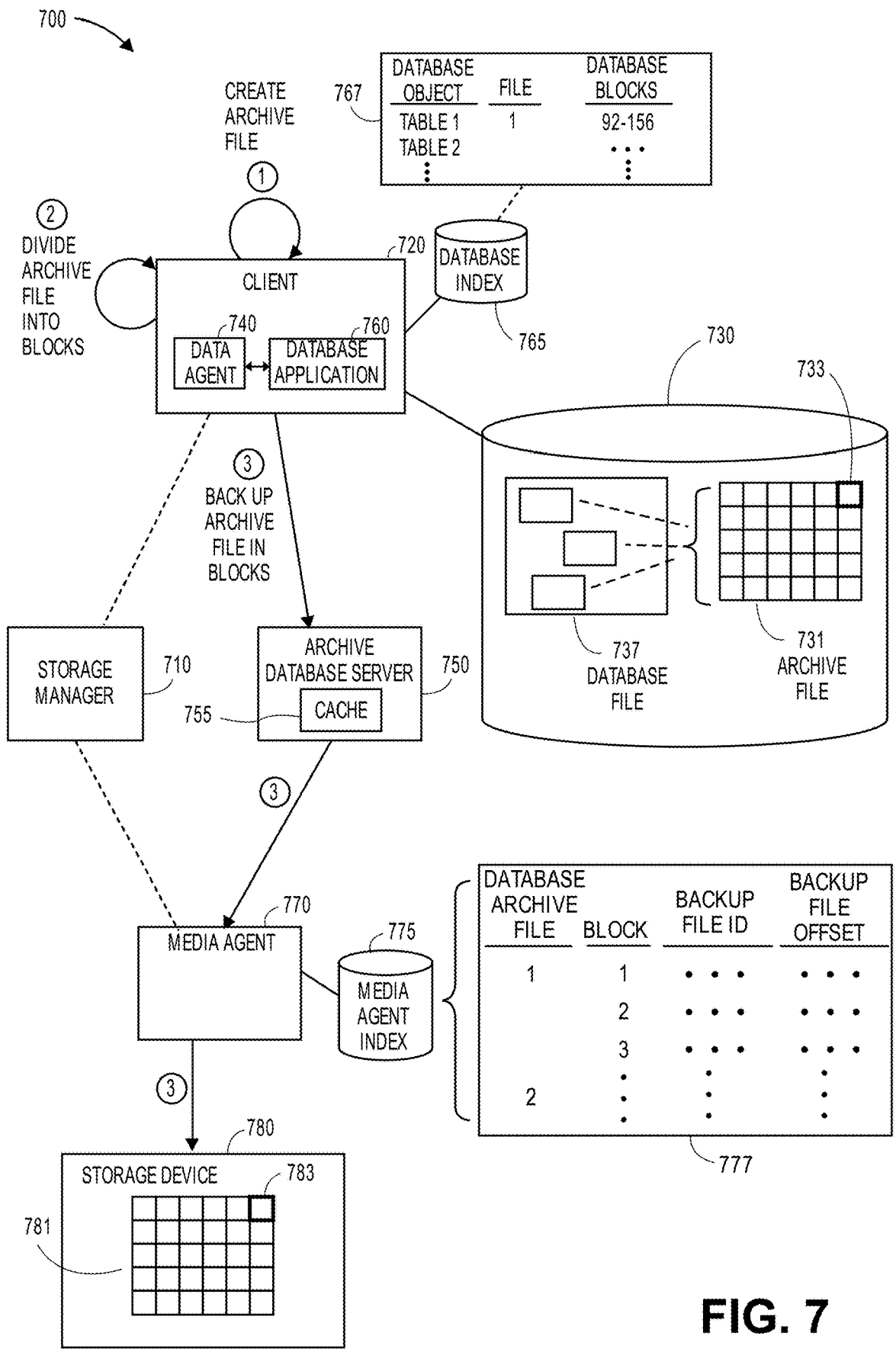
FIGS. 7, 7A, and 7B are data flow diagrams illustrative of the interaction between the various components of the exemplary information management system configured to implement object-level restore of database data, according to certain embodiments.

An Exemplary System for Implementing Restore of Database Object in Database Archiving Using Blocks FIG. 7 is a data flow diagram illustrative of the interaction between the various components of the exemplary information management system 700 configured to implement object-level restore of database data, according to certain embodiments. As illustrated, the exemplary information management system 700 includes a storage manager 710, a client computing device or client 720, an information store or primary storage device 730, a data agent 740, an archive database server 750, a database application 760, a media agent 770, and a secondary storage device 780. The system 700 and corresponding components of FIG. 7 may be similar to or the same as the system 100, 200, 300 and similarly named (but not necessarily numbered) components of FIGS. 1D, 2A-2C, and 3.

Database data including portions of database files stored in the primary storage device(s) 730 may be archived from the primary storage device(s) to the one or more secondary storage devices 780 to make more storage space available in the primary storage device(s) 730. Archiving can include pruning select database data from the primary storage device(s) 730. In some existing systems, when the user tries to access an object from an archived database file (e.g., a particular table or record), the entire archive file is restored in order to recover the archived database data the user is trying to access. The information management system 700 according to certain aspects implements object-level database restore using blocks, where only a subset of data corresponding to one or more user-selected database object(s) is restored instead of restoring the entire archive file. For example, the information management system 700 restores a particular database object from an archive file that is stored across multiple blocks. At the time of archiving, the system 700 can store the database data across one or more blocks and archive to secondary storage on a block-by-block basis. This can allow the information management system 700 to restore only the block(s) that include the data corresponding to the requested database object(s), instead of restoring the entire archive file. Then, the information management system 700 can return data that corresponds to the database object from the restored block(s) to the database application. Certain details relating to archiving using blocks are explained above.

The database application 760 executing on the client computing device 720 creates a database file 737, which is stored on a primary storage device 730 associated with the client computing device 720. At data flow step 1, the data agent 740 or the database application 760 creates an archive file 731 containing a number of database objects to be archived from the primary storage device(s) 730 to the secondary storage device(s) 780. The archive file 731 according to certain embodiments is a temporary file for use in the archiving process that is constructed from the source database file 737 stored in the primary storage device(s) 730. The data agent 740 can flag select portions of the database file for archiving according to an archiving policy and package those into the temporary archive file 731 for use in the archive process, as will now be described in further detail. During a subsequent archiving operation, the data agent 740 associated with the database application 760 may determine which database objects (e.g., tables) need to be archived (e.g., according to a least recently used or other policy) and also determine relationships between database objects to be archived and other database objects. For example, the data agent 740 can determine what other database objects are referenced by the database objects to be archived and flag the referenced database objects for archiving as well. Similarly, the data agent 740 can determine what other database objects reference the database objects to be archived and flag the referencing database objects for archiving. In this way, the data agent 740 can archive database objects and their linked database objects as a unit. The database application 760 data may be stored in the information store 730. The database application 760 or the data agent 740 can export the flagged database objects as an archive file 731. The archive file 731 may be created locally to the client computing device 720, e.g., in the information store 730 associated with the client computing device 720. While only one archive file 731 is shown, an archive file 731 can be created for each archive operation, and can be a temporary file that is deleted following the archive operation. Examples of some techniques for archiving database data are found in U.S. Patent Application Publication No. 2014/0025641, titled "System and Methods for Database Archiving," the entire disclosure of which is incorporated by reference herein.

Archiving may run according to a schedule defined by a storage policy, at user request, based on certain events, etc. The storage manager 710 may instruct the data agent 740 to start an archiving operation. Or the data agent 740 may initiate an archiving operation, e.g., according to a schedule. In some embodiments, the system 700 may allow a user to select from between configuring the system 700 to organize the archive file 731 as a set of granular blocks to track archived database data during archiving, as a first option, and not using blocks, as a second option. For instance, the use of blocks can have a number of advantages including allowing for restore of object-level data, and users desiring such a feature may select the first option. On the other hand, the user may configure the system 700 not to use blocks in order to reduce overhead associated with managing and tracking the blocks. A user may be likely to select this option where restoring object-level database data is not a priority, for example.

At data flow step 2, the data agent 740 divides the archive file 731 and allocates the archive file 731 across one or more blocks 733. In one embodiment, the size of a block 733 is 4 megabytes (MB). In some embodiments, a proxy data agent 740 may perform the functions of the data agent 740 with respect to database archiving and/or restore using blocks, for example, in order to reduce the use of resources of the production database server. The proxy data agent 740 may reside on a different computing device from the production database server, such as the media agent 770 or the archive database server 750.

In certain embodiments, the database application 760 may export the data to be archived as one or more archive files 731 prior to an archive operation. Similarly, the data agent 740 may also divide the archive files 731 into one or more blocks 733 prior to an archive operation. The client 720, the database application 760, and/or the data agent 740 can determine the data to be archived and prepare the data for archiving ahead of time, e.g., in order to make the archiving process faster. The client 720, the database application 760, and/or the data agent 740 may prepare for archiving in advance, e.g., according to a schedule.

At data flow step 3, the media agent(s) 770 backs up the archive file 731 in blocks. The media agent(s) 770 copies the blocks 733 to one or more secondary storage devices 780 to create a secondary copy 781 of the archive file 731, including secondary copies 783 of the corresponding blocks 733. To facilitate discussion, the secondary copy 781 of the archive file 731 may be referred to as archive file 781, and the secondary copy 783 of a block 733 may also be referred to as block 783. Archive files 781 can be stored on various types of media in secondary storage, e.g., disk, tape, etc.

For restore, the user may access an archive file 781 in secondary storage through the three-dimensional (3-D) file system, similar to backup database files 281, 381 described above. In order to allow access to an archive file 781 through the 3-D file system, the data agent 740 or another component of the system 700 may rename or change the filepath of the exported archive file 731, e.g., prior to dividing into one or more blocks 733. Certain details relating to restore of archive files 781 are explained below, e.g., in connection with FIG. 7A.

Figure 7A:
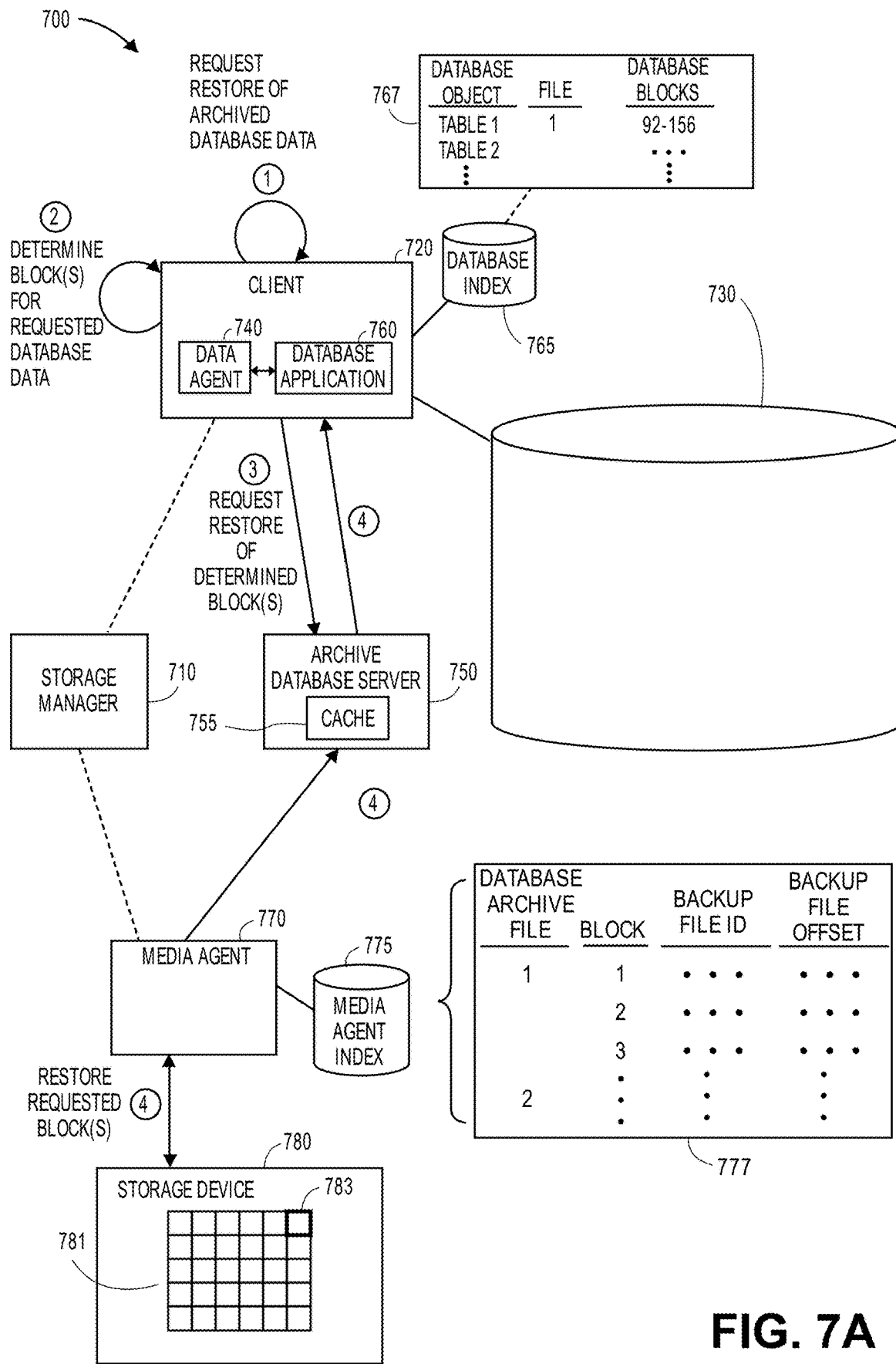

FIG. 7A is a data flow diagram illustrative of the interaction between the various components of the exemplary information management system 700 configured to implement object-level restore of database data, according to certain embodiments. As illustrated, the exemplary information management system 700 includes a storage manager 710, a client computing device or client 720, an information store or primary storage device 730, a data agent 740, an archive database server 750, a database application 760, a media agent 770, and a secondary storage device 780. The system 700 and corresponding components of FIG. 7A may be similar to or the same as the system 100, 200, 300, 700 and similarly named (but not necessarily numbered) components of FIGS. 1D, 2A-2C, 3, and 7.

With further reference to FIG. 7A, the interaction between the various components of the exemplary information management system will now be described in greater detail with respect to data flow steps indicated by the numbered arrows. Certain details relating to restore of a database object using blocks are explained above with respect to FIGS. 2A-2C, 3, and 7.

At data flow step 1, the database application 760 requests restore of archived database data. For example, the user may try to access archived database data, and the database application 760 may try to read an archive file 781 in secondary storage corresponding to the requested data. The archive file 781 may have been stored in secondary storage in multiple blocks at the time of archiving as explained above in connection with FIG. 7, and the data agent 740 can intercept the read and restore the block(s) of the archive file 781 that corresponds to the requested archived database data.

Since archived database data may be pruned from the production database server, the archived database data may be accessed through an archive database server 750. The archive database server 750 can provide access to database data that has been recently archived. For example, the archive database server 750 may store archived database data for the most recent 6 months. The recent archived database data may be stored in secondary storage as well as the archive database server 750. Archived database data that is not directly available from the archive database server 750 may need to be restored from secondary storage. The user may connect to the archive database server 750, e.g., from the client 720, to browse archived database data. The user can directly access the archived database data that is stored on the archive database server 750 itself. The user may also browse and access the archive files 781 in secondary storage through the 3-D file system. The user may access and/or interact with the archived database data on the archive database server 750 and/or in the secondary storage through a user interface (e.g., database application 760 GUI, etc.). The archive database server 750 can also have the database application 760 installed.

Similar to backup database files 281, 381 explained above, archive files 781 for different points in time can be exposed as different file systems and/or volumes in the 3-D file system. For example, an archive file 781 can be mounted in the 3-D file system. The 3-D file system can be accessed through the archive database server 750. For example, the 3-D file system can run on the media agent 770 and expose the archive files 781 to the archive database server 750 using the Network File System (NFS) protocol. The NFS protocol may refer to a distributed file system protocol that allows a user on a client computer to access remote storage and files over a network in a way that is similar to how local storage and files are accessed. The 3-D file system and/or the media agent 770 can retrieve any requested archived database data in the archive files 781 from secondary storage. The 3-D file system may be provided in a native format. For example, for Windows OS, each archive file 781 can be accessed via Windows Explorer. The archive file 781 may be in the native format of the database application 760 that created it. And because the database application 760 can understand the format of the archive file 781, the database application 760 can directly read the archive file 781.

As explained above, the database application 760 can export the database data to be archived in an archive file 731. The archive file 731 can be divided into one or more blocks and copied to the storage device 780 to create the archive file 781. In order to allow access to an archive file 781 through the 3-D file system, the data agent 740 or another component of the system 700 can rename or change the filepath of the exported archive file 731, e.g., prior to archiving. For example, an archive file 731 may have the filepath "/export/db1/archive/job1/exp.data," and the data agent 740 can change the file path to "/3dfs/export/db1/archive/exp.data." The original filepath of the archive file 731 may be referred to as the "first filepath." The filepath to be changed to may be referred to as the "second filepath." The second filepath may be provided by the 3-D file system or the NFS server. The first filepath can be mapped to the second filepath. The 3-D file system and/or the NFS server may run on the media agent 770. The database application 760 can recognize where the archive file 781 is located from the second filepath.

At data flow step 2, the data agent 740 determines the block(s) 783 for the requested database data. Data flow step 2 can be similar to data flow steps 3-5 of FIG. 2B and data flow step 2 of FIG. 3, and the system 700 can use the block-level mapping features and the data structures explained in connection with FIGS. 2A-2C and 3, for example, in order to determine which blocks 733 correspond to the requested database data.

The archive files 781 can be presented to the user in a user interface, and the user can browse an archive file 781 and select a database object included in the archive file 781. Selection of database object can trigger restore of the database object from the archive file 781. The user can also run a query on the archived database data, and the query can trigger restore of database objects that are included in the result of the query. The 3-D file system may request the media agent 770 to retrieve the blocks 783 that include the selected database object from secondary storage.

As explained above, the database application 760 can have a database index 765 that maps database objects to database blocks. For example, the database index 765 can include one or more tables 767 that indicate which database blocks belong to a database object. When a read operation comes in, the database application 760 can determine which portion of the archive file 781 is being accessed (e.g., which database block(s)) by referring to the indexing information in the database index 765. For example, the database application 760 can determine the offset for the read. The data agent 740 can intercept the read operation and obtain the offset information from the database application 760. The data agent 740 can then determine which block(s) 733 correspond to the offset. The process of identifying the blocks 733 can be generally similar to the process described above with respect to FIG. 2B. For instance, the blocks 733 corresponding to requested database objects can be determined based on one or more calculations involving the block size (e.g., 256 kB) and one or more of a start offset value and an end offset value intercepted from the database application 760. The calculations can be similar to the calculations set forth in Equations 1 and 2 above.

At data flow step 3, the data agent 740 requests restore of the determined block(s) 783. After determining which block 733 includes database block(s) that correspond to the offset, the data agent 740 can request restore of the corresponding block(s) 783 from secondary storage. Since the read can continue across multiple blocks (e.g., when reading a table), the data agent 740 can continue restoring the subsequent block(s) in order to service the read. The media agent 770 can have information (e.g., in the media agent index 775) on where the blocks 783 for an archive file 781 are located in secondary storage. The data agent 740 can instruct the media agent 770 to restore the determined block(s) 783, and the media agent 770 can restore the block(s) 783 by referring to the information. The information may be stored in a table 777. The table 777 can be similar to or the same as the table 277, 377 explained in connection with FIGS. 2A-2D and 3.

At data flow step 4, the media agent 770 restores the requested block(s) 783. The archive database server 750 can include a cache 755, and the media agent 770 can retrieve the requested block(s) from the secondary storage device 780 and forward the requested block(s) to the cache 755, which in turn can forward the requested block(s) to the destination client 720. Any existing block(s) in the cache 755 can be removed as desired, on a least recently used (LRU) or other appropriate basis, for example, to make space available for newly restored block(s). In one embodiment, the data agent 740 can be on the same computing device as the media agent 770. Having the data agent 740 and the media agent 770 on the same device can make queries and/or reads faster, for example, since the mapping information between blocks 733 and database blocks can be accessed more quickly. For example, the mapping information may have been created and/or copied to the media agent index 775 at the time of archiving, and may be accessible from the media agent index 775.

In this manner, the system 700 can allow access to database objects in an archive file 781 of a database application 760 without having to restore the entire archive file 781. The system 700 can store the archive file 781 in blocks 783 in secondary storage and map which blocks 733 include which database blocks in the archive file 781. The mapping information can be used at the time of restore to determine which block 733 corresponds to the current read offset and retrieve the corresponding block 783 from secondary storage.

While described with respect to an archive operation for the purposes of illustration, the techniques described herein are compatible with other types of storage operations, such as, for example, backup, replication, migration, and the like. A description of these and other storage operations compatible with embodiments described herein is provided above.

In FIG. 7A, the archive files 781 are exposed to the database application 760 and the user through the 3-D file system using the NFS protocol. However, in some cases, the database application 760 may not want to access data using the NFS protocol (e.g., due to delay in access time, etc.).

Figure 7B:
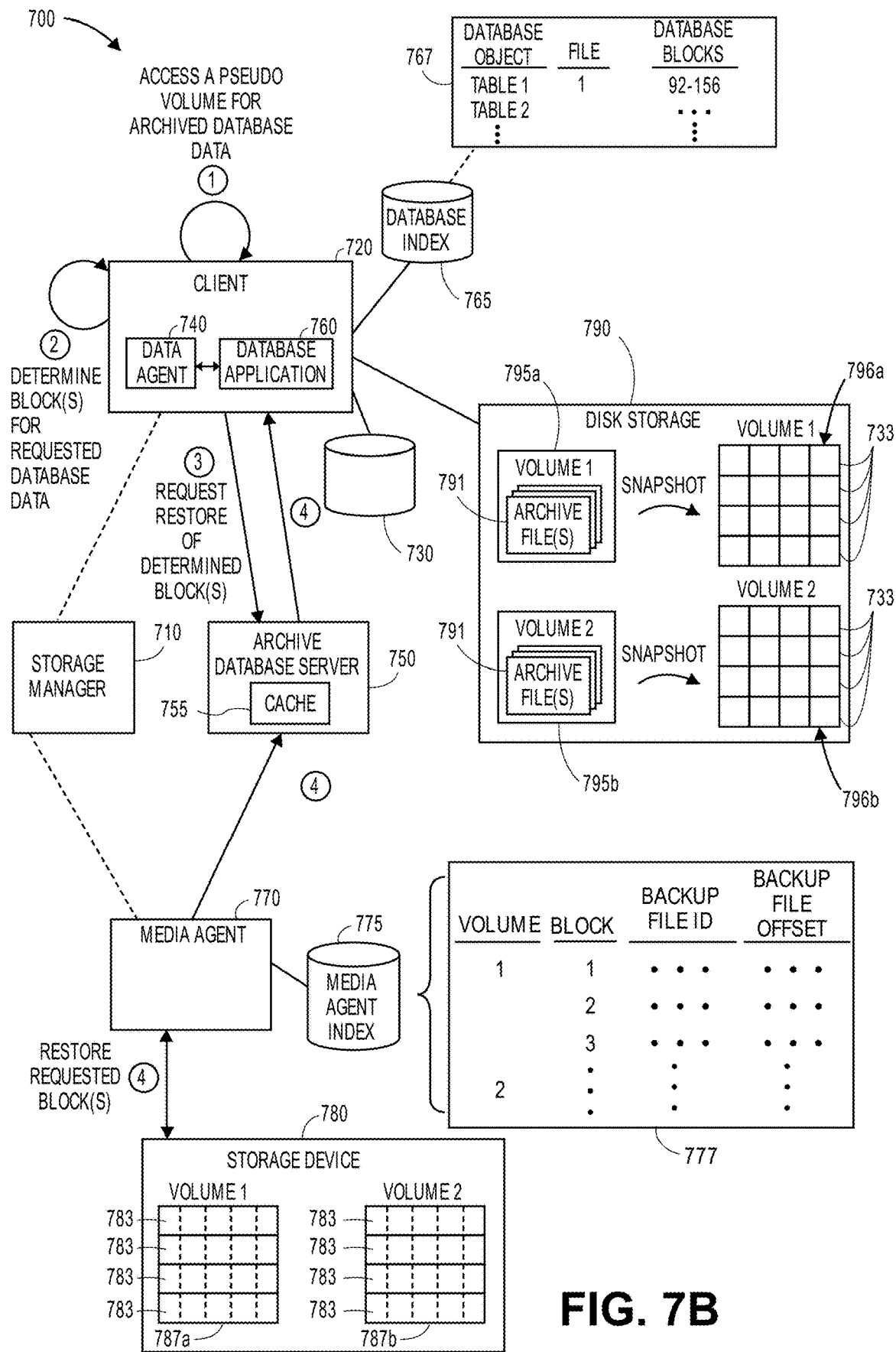

In such cases, the system 700 can use another technique to allow access to archived database data using blocks. For example, the system 700 can allocate disk storage for archive files 731 and perform volume-level backup of the whole volume (e.g., obtain a snapshot of the volume). The volume-level backup files can be stored in secondary storage in relatively large blocks. The system 700 can then allow the volume-level backup files to be mounted locally to the database application 760 as pseudo volumes. When the database application 760 accesses the data in a volume-level backup file, the system 700 can restore the block(s) that include the accessed data to the database archive server 750. FIG. 7B shows an embodiment which uses block-level data to protect archive files 791 in association with volume-level backup.

As illustrated, the exemplary information management system 700 includes a storage manager 710, a client computing device or client 720, an information store or primary storage device 730, a data agent 740, an archive database server 750, a database application 760, a media agent 770, a secondary storage device 780, and disk storage 790. Although any type of storage may be used, the disk storage 790 in some embodiments is a snapshot-capable array of magnetic or solid state memory, such as a storage array capable of creating and managing snapshots. The system 700 and corresponding components of FIG. 7B may be similar to or the same as the system 100, 200, 300, 700 and similarly named (but not necessarily numbered) components of FIGS. 1D, 2A-2C, 3, 7, and 7A.

With further reference to FIG. 7B, the interaction between the various components of the exemplary information management system will now be described in greater detail with respect to data flow steps indicated by the numbered arrows. Certain details relating to restore of a database object using blocks are explained above with respect to FIGS. 2A-2C, 3, and 7A.

At data flow step 1, the database application 760 accesses a pseudo volume for archived database data. The database application 760 can export data to be archived as an archive file 791. The archive file 791 can be stored in disk storage 790 in a volume 795 of a file system. In some embodiments, the disk storage 790 is associated with a client 720; in other embodiments, the disk storage 790 may be associated with the archive database server 750. A volume 795 may be organized as a plurality of data units, which can each have the same size and may be referred to as "volume blocks," which may be maintained by volume management software or firmware executing on the storage device 790, for example. For an archive operation, volume-level backup can be performed. The system 700 may obtain a snapshot of the volume 795 in disk storage 790. The archive database server 750 may divide the volume-level file 795 up into one or more blocks for storage in the secondary storage device(s) 780. The individual blocks created by the archive database server 750 may have a common size larger than the volume level block size, such that each block includes multiple volume blocks. The size of a volume can be quite large, and accordingly, the block size for blocks used in volume-level backup of archive files 791 shown in FIG. 7B can be much larger than the block size used for the blocks 733 used in association with the archive files 731 shown in FIG. 7A. For example, the entire volume may 5 terabytes (TB) in size, and the volume can be divided into and stored in 200 GB blocks.

In one specific, illustrative example, archive jobs 1 and 2 run at different points in time. For each job, the data agent 740 exports an archive file 791 that includes the database data to be archived. The archive file 791 can be stored and/or copied to disk storage 790. Archive job 1 runs, and the archive file 791 for job 1 is created. For example, the archive file 791 for job 1 can be named or have the filepath "/export/db1/archive/job1/exp.data." Volume-level backup is performed by taking a snapshot of the volume 795a in disk storage 790. For instance, as shown in FIG. 7B, the disk storage device 790 can create a volume snapshot 796a by taking a snapshot or other type of image or copy of the volume 795a. The data agent 740 or another component of the system 700 may divide the snapshot 796a (or other type of copy) for job 1 into multiple blocks 733 for storing on the secondary storage device(s) 780, facilitating object level restore as will be described further. At a later point in time, archive job 2 runs, and the archive file 791 for job 2 is created. The archive file 791 for job 2 can be named or have the filepath "/export/db1/archive/job2/exp.data." Volume-level backup is performed by taking a snapshot of the second volume 795b to create a volume-level snapshot 796b of the second volume 795b. The volume-level backup can be incremental backup and capture only the changed volume blocks. As shown, the volume-level snapshot file 796b for job 2 can be divided into multiple blocks 783 and stored in secondary storage.

The media agent 770 can copy the volume-level snapshot file 796a for the first volume 795a to the secondary storage device(s) 780 to create a secondary copy 787a of the volume-level snapshot file 796a. The secondary copy 787a of the volume-level snapshot file 796a can include secondary copies 783 of the corresponding blocks 733 of the volume-level snapshot file 796a. To facilitate discussion, the secondary copy 787a of the volume-level snapshot file 796a may be referred to as volume-level backup file 787a, and the secondary copy 783 of a block 733 may be referred to simply as a block 783. As shown, the media agent 770 can also copy the volume-level snapshot file 796b for the second volume 795b to the secondary storage device(s) 780 to create a secondary copy 787b of the volume level snapshot file 796b. Volume-level backup files 787a-787b can be stored on various types of media in secondary storage, e.g., disk, tape, etc.

In some embodiments, the data agent 740 or another component of the system 700 can maintain mapping information between the volume-level backup files 787a-787b and the constituent blocks 783, for example, in a table or file 777. The table 777 can include information relating to which blocks belong to which volume-level backup file, which volume blocks belong to which block, which blocks have been changed since last backup (e.g., whether blocks are dirty), etc. For example, the table includes columns "volume", "block", "backup file ID", and "backup file offset", where each row generally specifies sufficient information to locate the block 783 specified in the "block" column on the secondary storage device(s). In one embodiment, the volume column can indicate a volume 795 in disk storage 790 (e.g., either 795a or 795b) and the block column can indicate one or more blocks 783 associated with the volume 795 specified in the volume column. Regarding the backup file column, although not shown in FIG. 7B, the volume-level backup copies 787a-787b may themselves each be stored a particular backup file in the secondary storage device(s) 780, where each backup file can include multiple volume-level backup copies 787a-787b. And the backup file ID for a particular row can specify the backup file that the block 783 identified in the block column for that row resides in. The backup file offset column can specify an offset into the backup file at which the block 783 can be found. The mapping information may be stored in the disk storage 790 and/or the media agent index 775, depending on the embodiment. The mapping information can be used at the time of backup, for example, to determine which blocks should be backed up to secondary storage. By keeping track of which blocks have changed, the system 700 can perform incremental backup of the volume 795. Certain details relating to performing incremental backup using blocks are explained in U.S. application Ser. No. 14/598,100, filed on Jan. 15, 2015, entitled "MANAGING STRUCTURED DATA IN A DATA STORAGE SYSTEM"; which is incorporated by reference in its entirety.

The data agent 740 or another component (e.g., a proxy data agent 740) may perform the functions relating to restore of a database object using blocks, depending on the embodiment. Certain details relating to blocks are explained above, for example, in connection with FIG. 7A.

A volume-level backup file 787 can be mounted to the database application 760 such that the database application 760 considers the data to be local. The mounted volume-level backup file 787 may be referred to as a pseudo volume. A pseudo volume may appear to be accessible locally, but data of the pseudo volume may not exist and need to be restored from secondary storage as needed. When archived database data in a pseudo volume is accessed, the data agent 740 or another component of the system 700 may restore the block(s) 783 that store the corresponding volume block(s).

Data flow steps 2, 3, and 4 can be similar to data flow steps 2, 3, and 4 of FIG. 7A. At data flow step 2, the data agent 740 determines the block(s) 783 for the accessed data. For example, the data agent 740 can determine the offset for the accessed data. As explained above, when a read operation comes in, the database application 760 can determine which portion of the volume-level backup file 787 is being accessed. For example, the database application 760 can determine the offset for the read. The data agent 740 can intercept the read operation and obtain the offset information from the database application 760. The data agent 740 can then determine which block includes volume block(s) that correspond to the offset. The process of identifying the blocks 733 can be generally similar to the process described above with respect to FIG. 2B. For instance, the blocks 733 corresponding to requested database objects can be determined based on one or more calculations involving the block size (e.g., 256 kB) and one or more of a start offset value and an end offset value intercepted from the database application 760. The calculations can be similar to the calculations set forth in Equations 1 and 2 above.

At data flow step 3, the data agent 740 requests restore of the determined block(s) 783. After determining which block includes volume block(s) that correspond to the offset, the data agent 740 can request restore of the corresponding block 783 from secondary storage. The media agent 770 can have information (e.g., in the media agent index 775) on where the blocks 783 for 787a volume are located in secondary storage. The data agent 740 can instruct the media agent 770 to restore the determined block(s) 783, and the media agent 770 can restore the block(s) 783 by referring to the information. The information may be stored in the table 777, as described. For instance, the media agent 770 can locate the requested blocks 783 on the storage devices 780 using the information provided in the table 777.

At data flow step 4, the media agent 770 restores the requested block(s) 783. As explained above, the requested block(s) can be restored to the cache 755.

In this manner, the system 700 can use blocks to archive and restore database data without using the NFS protocol to allow access to the archived data. A pseudo volume for archived data can be created and locally mounted to the database application 760. When the database application 760 accesses a portion of the pseudo volume, corresponding block(s) can be restored from secondary storage.

While described with respect to an archive operation for the purposes of illustration, the techniques described herein are compatible with other types of storage operations, such as, for example, backup, replication, migration, and the like. A description of these and other storage operations compatible with embodiments described herein is provided above.

Figure 8:
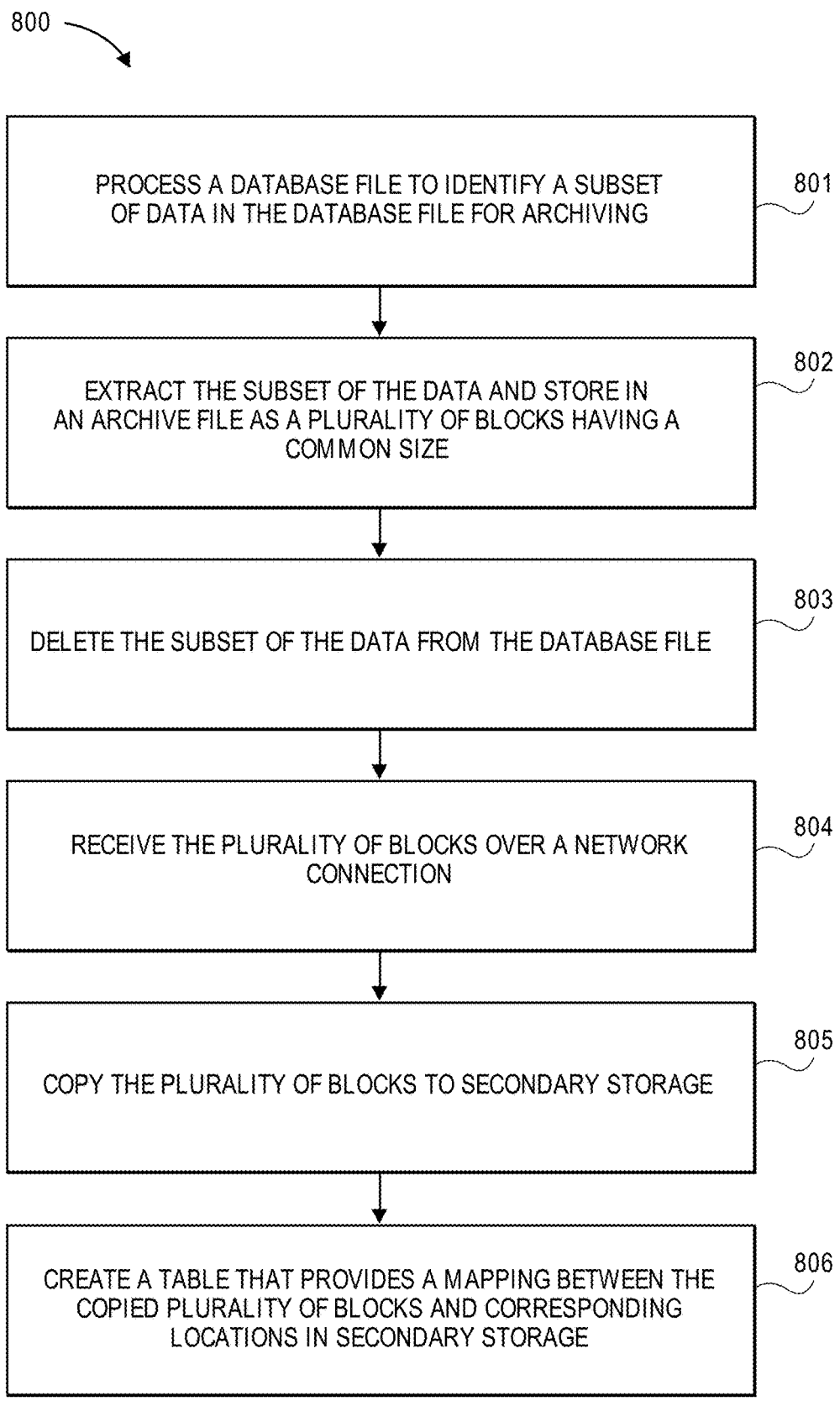
FIG. 8 is a flow diagram illustrative of one embodiment of a routine for restoring a database object.

FIG. 8 is a flow diagram illustrative of one embodiment of a routine 800 for restoring a database object. The routine 800 is described with respect to the system 700 of FIG. 7. However, one or more of the steps of routine 800 may be implemented by other information management systems, such as those described in greater detail above with reference to FIGS. 1D, 2A, 2B, 3, 7A, and 7B. The routine 800 can be implemented by any one, or a combination of, a client, a storage manager, a data agent, a media agent, and the like. Moreover, further details regarding certain aspects of at least some of steps of the routine 800 are described in greater detail above with reference to FIGS. 7A and 7B. Although described in relation to archiving operations for the purposes of illustration, the process of FIG. 8 can be compatible with other types of storage operations, such as, for example, backup operations, migration, snapshots, replication operations, and the like.

At block 801, the data agent 240 processes a database file 737 to identify a subset of data in the database file 737 for archiving. The database file 737 may reside on one or more primary storage devices (e.g., the information store 730). The database file 737 may be generated by a database application 740, which may be executing on a client computing device 720.

At block 802, the data agent 240 extracts the subset of the data from the database file 737 and stores in an archive file 731 as a plurality of blocks 733 having a common size. The archive file 731 may be organized as one or more database blocks, and a block 733 can include multiple database blocks. The data agent 740 may instruct the database application 760 to extract the subset of the data and create the archive file 731. At block 803, the data agent 740 or the database application 760 deletes the subset of the data from the database file 731.

As part of a secondary copy operation in which the archive file 731 is copied to the storage device(s) 780, at block 804, the media agent(s) 770 receives the plurality of blocks 733 over a network connection. At block 805, the media agent(s) 770 copies the plurality of blocks 733 to the storage device(s) 780. At block 806, the media agent(s) 770 creates a table 777 that provides a mapping between the copied plurality of blocks 783 and corresponding locations in the storage device(s) 780. The archive file 731 may be deleted from the primary storage devices (e.g., the information store 730) subsequent to the creation of the secondary copy 781 of the archive file 731.

In some embodiments, the data agent 740 intercepts a read operation by the database application 760 to access one or more database blocks in the secondary copy 781 of the archive file 731. The database application 760 may try to access the secondary copy 781 of the archive file 731 subsequent to the creation of the secondary copy 781. The data agent 740 determines an offset of the one or more database blocks 783 accessed by the read operation. The data agent 740 identifies a block 783 that corresponds to the offset. The data agent 740 sends a request to the media agent(s) 770 to restore the identified block 783 from the storage device(s) 780. In response to receiving the request to restore the identified block, the media agent(s) 770 accesses the table 777 to determine the location of the identified block 783 in the storage device(s) 780, and restores the requested block 783 from the storage device(s) 780 to a primary storage device(s) (e.g., the information store 730).

In certain embodiments, the system 700 includes a database archive server 750. The database archive server may be executing on a second computing device that is different from the client computing device 720 on which the database application 760 executes. The database archive server 750 can include a staging memory (e.g., a cache 755). The secondary copy 781 of the archive file 731 can be accessed through the user interface of the database archive server 750 for the read operation. The media agent(s) 770 may restore the requested block 283 at least in part by storing the requested block 783 in the staging memory of the database archive server 750 and forwarding the stored block in the staging memory to at least one primary storage device associated with the client computing device 720 (e.g., the information store 730).

In one embodiment, the secondary copy 781 of the archive file 731 is provided as a file system in the user interface of the database archive server 750 and the one or more database blocks in the read operation are accessed through the file system. The secondary copy 781 of the archive file 731 may be provided as a file system in the user interface of the database archive server 750 using the Network File System (NFS) protocol.

In some embodiments, a Network File System (NFS) server may assign a second filepath for accessing the secondary copy 781 of the archive file 731 using the NFS protocol (e.g., at the time of creating the secondary copy 781 of the archive file 731). The second filepath may be different from a filepath of the archive file 731. The NFS server may be executing on a media agent(s) 770. In certain embodiments, the data agent 740 executes on the same media agent(s) 770 as the NFS server. For example, the proxy data agent 740 runs on the same machine as the NFS server.

The routine 800 can include fewer, more, or different blocks than those illustrated in FIG. 8 without departing from the spirit and scope of the description. Moreover, it will be appreciated by those skilled in the art and others that some or all of the functions described in this disclosure may be embodied in software executed by one or more processors of the disclosed components and mobile communication devices. The software may be persistently stored in any type of non-volatile and/or non-transitory storage.

Terminology

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

Depending on the embodiment, certain operations, acts, events, or functions of any of the algorithms described herein can be performed in a different sequence, can be added, merged, or left out altogether (e.g., not all are necessary for the practice of the algorithms). Moreover, in certain embodiments, operations, acts, functions, or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described herein. Software and other modules may reside and execute on servers, workstations, personal computers, computerized tablets, PDAs, and other computing devices suitable for the purposes described herein. Software and other modules may be accessible via local memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, the processing of the various components of the illustrated systems can be distributed across multiple machines, networks, and other computing resources. In addition, two or more components of a system can be combined into fewer components. Various components of the illustrated systems can be implemented in one or more virtual machines, rather than in dedicated computer hardware systems and/or computing devices. Likewise, the data repositories shown can represent physical and/or logical data storage, including, for example, storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks.

These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded onto a computing device or other programmable data processing apparatus to cause a series of operations to be performed on the computing device or other programmable apparatus to produce a computer implemented process such that the instructions which execute on the computer or other programmable apparatus provide steps for implementing the acts specified in the flow chart and/or block diagram block or blocks.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates the various aspects of the invention in any number of claim forms. For example, while only one aspect of the invention is recited as a means-plus-function claim under 35 U.S.C sec. 112(f) (AIA), other aspects may likewise be embodied as a means-plus-function claim, or in other forms, such as being embodied in a computer-readable medium. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application, in either this application or in a continuing application.

What is claimed is:

1. A system for retrieving and converting database data from one database application format to another database application format, the system comprising:
   one or more computing devices comprising computer hardware configured to:
      identify a subset of database data blocks which correspond to a first database object in a database file by consulting an index,
         wherein the index compromises mapping information between database objects and corresponding application-level blocks;
      issue a data retrieval request to retrieve a secondary copy of the subset of database data blocks from one or more secondary storage devices;
      receive a request to forward the subset of database data blocks in a second database application format,
         wherein the request includes one or more offsets in a database file corresponding to the database data blocks,
         wherein the subset of database data blocks is stored in a first application database format on one or more secondary storage devices,
         wherein the first application database format is different than the second database application format;
      access a table that maps where the subset of database data blocks are located in the one or more secondary storage devices;
      from the one or more secondary storage devices, retrieve the subset of database data blocks; and
      forward the retrieved subset of data blocks to a computing device; the computing device configured to:
         receive each of the retrieved subset of data blocks;
         store the retrieved subset of data blocks in a staging memory;
         convert at least some of the retrieved subset of data blocks to a second database application format before receiving other blocks of the retrieved subset of data blocks; and
         forward the converted data blocks in a second database application format to a requester.

2. The system of claim 1, wherein the retrieved subset of data blocks comprises multiple database objects.

3. The system of claim 1, wherein converting the at least some of the retrieved subset of data blocks comprises the computing device forwarding the retrieved subset of data blocks from the staging memory to a second computing device to perform the converting.

4. The system of claim 1, wherein the table is stored in an index associated with one or more secondary storage controller computers.

5. The system of claim 1, wherein the system further comprises:
   a first computing device comprising computer hardware and configured to:
      receive an access request to access the first database object in the database file to use in a second database application.

6. The system of claim 5, wherein the computing device is further configured to convert the at least some of the retrieved subset of data blocks to the second database application format at least in part by:
   extracting application-level blocks included in the at least some of the retrieved subset of data blocks which correspond to the first database object based on the one or more offsets indicating the first database object; and converting the identified application-level blocks to format usable by the second database application.

7. The system of claim 5, wherein the first computing device is further configured to present the secondary copy of the database file as a file system in a user interface, and wherein the request to access the first database object is generated in response to selection of the first database object in the user interface.

8. The system of claim 1, wherein the one or more secondary storage devices include one or more tapes.

9. A method of converting database data from one database application format to another database application format, the method comprising:
using one or more computing devices comprising computer hardware:
identifying a subset of database data blocks which correspond to a first database object in a database file by consulting an index,
wherein the index compromises mapping information between database objects and corresponding application-level blocks;
issuing a data retrieval request to retrieve a secondary copy of the subset of database data blocks from one or more secondary storage devices;
receiving a request to forward a subset of database data blocks in a second database application format,
wherein the request includes one or more offsets in a database file corresponding to the database data blocks,
wherein the subset of database data blocks is stored in a first application database format on one or more secondary storage devices,
wherein the first application database format is different than the second database application format;
accessing a table that maps where the subset of database data blocks are located in the one or more secondary storage devices;
from the one or more secondary storage devices, retrieving the subset of database data blocks;
forwarding the retrieved subset of data blocks to a computing device; using the computing device:
receiving each of the retrieved subset of data blocks;
storing the retrieved subset of data blocks in a staging memory;
converting at least some of the retrieved subset of data blocks to a second database application format before receiving other blocks of the retrieved subset of data blocks; and
forwarding the converted data blocks in a second database application format to a requester.

10. The method of claim 9, wherein the retrieved subset of data blocks comprises multiple database objects.

11. The method of claim 9, wherein converting the at least some of the retrieved subset of data blocks comprises the computing device forwarding the retrieved subset of data blocks from the staging memory to the second computing device to perform the converting.

12. The method of claim 9, wherein the table is stored in an index associated with one or more secondary storage controller computers.

13. The method of claim 9, wherein the method further comprises:
using a first computing device comprising computer hardware:
receiving an access request to access the first database object in the database file to use in a second database application.

14. The method of claim 13, wherein the computing device is configured to convert the at least some of the retrieved subset of data blocks to the second database application format at least in part by:
extracting application-level blocks included in the at least some of the retrieved subset of data blocks which correspond to the first database object based on the one or more offsets indicating the first database object; and
converting the identified application-level blocks to format usable by the second database application.

15. The method of claim 13, wherein the first computing device is further configured to present the secondary copy of the database file as a file system in a user interface, and wherein the request to access the first database object is generated in response to selection of the first database object in the user interface.

16. The method of claim 9, wherein the one or more secondary storage devices include one or more tapes.

* * * * *